United States Patent
Henricks et al.

(10) Patent No.: US 8,059,005 B2
(45) Date of Patent: *Nov. 15, 2011

(54) CIRCUIT PROTECTOR MONITORING ASSEMBLY KIT AND METHOD

(75) Inventors: Michael Craig Henricks, Ballwin, MO (US); Robert Stephen Douglass, Wildwood, MO (US); Joan Leslie Winnett Bender, Chesterfield, MO (US); Matthew R. Darr, Godfrey, IL (US)

(73) Assignee: Cooper Technologies Company, Houston, TX (US)

( * ) Notice: Subject to any disclaimer, the term of this patent is extended or adjusted under 35 U.S.C. 154(b) by 1736 days.

This patent is subject to a terminal disclaimer.

(21) Appl. No.: 11/223,385

(22) Filed: Sep. 9, 2005

(65) Prior Publication Data

US 2006/0077607 A1 Apr. 13, 2006

Related U.S. Application Data

(60) Provisional application No. 60/608,580, filed on Sep. 10, 2004.

(51) Int. Cl.
*G08B 1/08* (2006.01)
*G08B 13/14* (2006.01)
*G08B 17/10* (2006.01)

(52) U.S. Cl. .......... 340/635; 340/539.1; 340/572.1; 340/572.7; 340/636.12; 340/636.15

(58) Field of Classification Search .......... 340/635–639, 340/539.1, 572.1, 572.7; 337/206, 208, 227, 337/231, 241, 255, 265
See application file for complete search history.

(56) References Cited

U.S. PATENT DOCUMENTS

| | | | |
|---|---|---|---|
| 4,081,853 A | 3/1978 | Wickson | |
| 4,263,589 A | 4/1981 | Lewiner et al. | |
| 4,281,322 A | 7/1981 | Nasu et al. | |
| 4,307,369 A * | 12/1981 | Jackson, Jr. | 337/282 |
| 4,344,100 A * | 8/1982 | Davidson et al. | 361/45 |
| 4,349,813 A | 9/1982 | Ishibashi et al. | |
| 4,514,723 A * | 4/1985 | Leal | 340/638 |
| 4,554,607 A | 11/1985 | Mora | |
| 4,556,874 A | 12/1985 | Becker | |
| 4,635,044 A | 1/1987 | South | |
| 4,635,045 A | 1/1987 | Miller et al. | |
| H248 H | 4/1987 | Middlebrooks | |
| 4,661,807 A * | 4/1987 | Panaro | 340/638 |
| 4,691,197 A | 9/1987 | Damiano et al. | |
| 4,837,520 A | 6/1989 | Golke et al. | |
| 4,875,232 A | 10/1989 | Shumway | |
| 4,952,915 A | 8/1990 | Jenkins et al. | |
| 5,093,657 A | 3/1992 | Bishop et al. | |
| 5,121,318 A | 6/1992 | Lipner et al. | |
| 5,182,547 A | 1/1993 | Griffith | |
| 5,233,330 A | 8/1993 | Hase | |
| 5,247,454 A | 9/1993 | Farrington et al. | |
| 5,291,139 A | 3/1994 | Fruhauf et al. | |

(Continued)

FOREIGN PATENT DOCUMENTS

EP 1 258 838 A2 11/2002

(Continued)

*Primary Examiner* — Benjamin C Lee
*Assistant Examiner* — Lam Pham
(74) *Attorney, Agent, or Firm* — Armstrong Teasdale LLP

(57) ABSTRACT

Monitoring assemblies, kits and methods for determining an operational state of a circuit protector in an electrical circuit.

51 Claims, 40 Drawing Sheets

U.S. PATENT DOCUMENTS

| | | | |
|---|---|---|---|
| 5,343,192 A | 8/1994 | Yenisy | |
| 5,347,418 A | 9/1994 | Ando et al. | |
| 5,378,931 A | 1/1995 | Bolda et al. | |
| 5,404,049 A | 4/1995 | Canada et al. | |
| 5,515,023 A * | 5/1996 | Marach et al. | 337/213 |
| 5,561,580 A | 10/1996 | Pounds et al. | |
| 5,585,554 A | 12/1996 | Handfield et al. | |
| 5,731,760 A | 3/1998 | Ramirez | |
| 5,859,596 A | 1/1999 | McRae | |
| RE36,317 E | 9/1999 | Arratia | |
| 5,973,418 A | 10/1999 | Ciesielka et al. | |
| 5,973,899 A | 10/1999 | Williams et al. | |
| 6,025,783 A | 2/2000 | Steffens, Jr. | |
| 6,038,516 A | 3/2000 | Alexander et al. | |
| 6,104,302 A | 8/2000 | Vuong | |
| 6,175,780 B1 | 1/2001 | Engel | |
| 6,192,325 B1 | 2/2001 | Peity et al. | |
| 6,271,759 B1 | 8/2001 | Weinbach et al. | |
| 6,289,267 B1 | 9/2001 | Alexander et al. | |
| 6,292,717 B1 | 9/2001 | Alexander et al. | |
| 6,366,208 B1 | 4/2002 | Hopkins et al. | |
| 6,429,662 B1 * | 8/2002 | Cuk et al. | 324/547 |
| 6,434,715 B1 | 8/2002 | Andersen | |
| 6,437,692 B1 * | 8/2002 | Petite et al. | 340/540 |
| 6,549,137 B1 | 4/2003 | Bruchmann | |
| 6,566,996 B1 | 5/2003 | Douglass et al. | |
| 6,597,179 B2 | 7/2003 | St-Germain | |
| 6,624,638 B2 | 9/2003 | St-Germain | |
| 6,633,475 B2 | 10/2003 | Thiele | |
| 6,671,148 B2 * | 12/2003 | Evans et al. | 361/64 |
| 6,691,064 B2 | 2/2004 | Vroman | |
| 6,696,969 B2 | 2/2004 | Torrez et al. | |
| 6,745,151 B2 | 6/2004 | Marko et al. | |
| 6,757,714 B1 | 6/2004 | Hansen | |
| 6,806,808 B1 | 10/2004 | Watters et al. | |
| 6,825,771 B2 | 11/2004 | Bruno et al. | |
| 6,839,597 B2 | 1/2005 | Hattori et al. | |
| 6,859,131 B2 | 2/2005 | Stanek et al. | |
| 6,892,107 B2 | 5/2005 | Baba et al. | |
| 6,895,368 B2 | 5/2005 | Murakami | |
| 7,078,982 B2 * | 7/2006 | Bertrand | 332/106 |
| 7,109,877 B2 * | 9/2006 | Cuk | 340/638 |
| 7,369,029 B2 * | 5/2008 | Ackermann | 337/206 |
| 2002/0021226 A1 | 2/2002 | Clement et al. | |
| 2005/0017908 A1 | 1/2005 | Saegrov | |
| 2005/0024218 A1 | 2/2005 | Cuk | |

FOREIGN PATENT DOCUMENTS

| | | |
|---|---|---|
| WO | WO 99/05761 | 7/1998 |

* cited by examiner

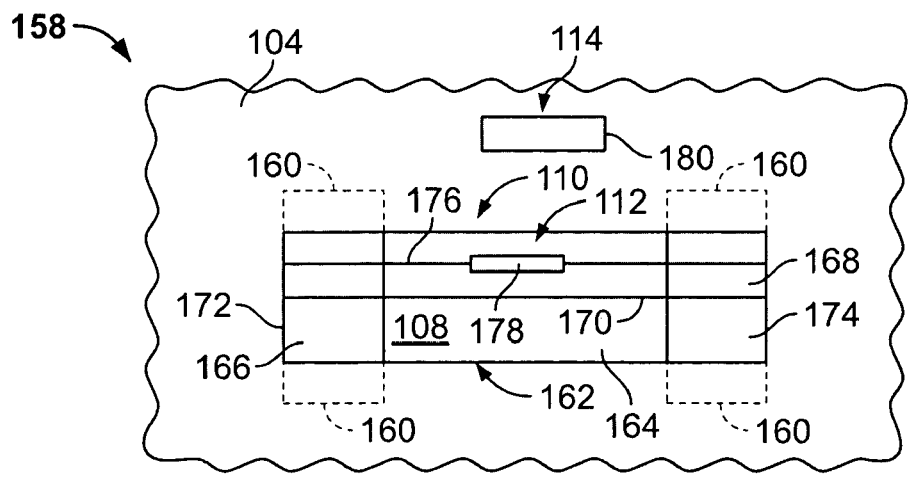
FIG. 3
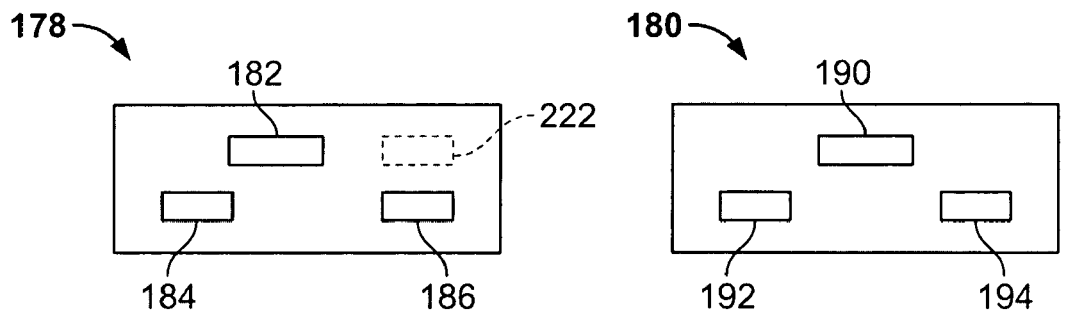
FIG. 4  FIG. 5
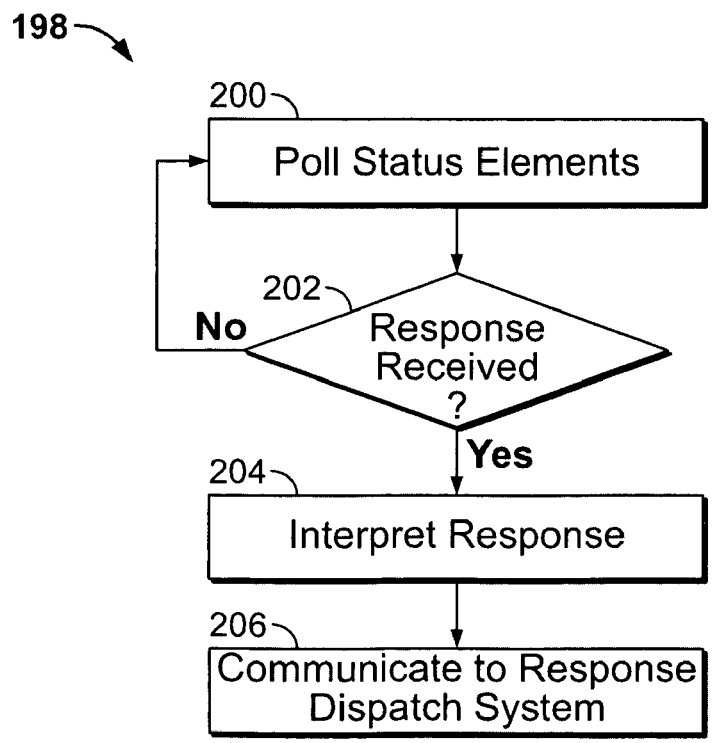
FIG. 6

FIG. 45

CIRCUIT PROTECTOR MONITORING ASSEMBLY KIT AND METHOD

This application claims the benefit of U.S. Provisional Patent Application Ser. No. 60/608,580 filed Sep. 10, 2004 and entitled Methods and System for Circuit Protection, the entire disclosure of which is hereby incorporated by reference in its entirety.

This application also relates to U.S. application Ser. No. 11/223,702 filed Sep. 9, 2005 and entitled System and Method for Circuit Protector Monitoring and Management, now issued U.S. Pat. No. 7,612,654; U.S. application Ser. No. 11/224,586 filed Sep. 12, 2005 and entitled Circuit Protector Signal Transmission, Methods and System, now issued U.S. Pat. No. 7,576,635; U.S. application Ser. No. 11/223,618 filed Sep. 9, 2005 and entitled Circuit Protector Monitoring and Management System User Interface Method, System, and Program, now issued U.S. Pat. No. 7,391,299; U.S. application Ser. No. 11/223,484 filed Sep. 9, 2005 and entitled Multifunctional Handheld Response Tool, Method and System for Circuit Protector Management; and U.S. application Ser. No. 10/828,048, filed Apr. 20, 2004 and entitled Wireless Fuse State Indicator System and Method, now issued U.S. Pat. No. 7,369,029; and U.S. application Ser. No. 10/973,628 filed Oct. 26, 2004 and entitled Fuse State Indicating and Optical Circuit and System, the complete disclosures of which are hereby incorporated by reference in their entirety.

BACKGROUND OF THE INVENTION

This invention relates generally to circuit protection devices, and more particularly to systems for managing electrical systems including circuit protection devices.

Electrical systems typically include a number of circuit protection devices that protect electrical circuitry, equipment, and components from damage. Overcurrent protection devices, for example, are constructed to physically open or interrupt a circuit path and isolate electrical components from damage upon the occurrence of specified overcurrent conditions in the circuit. Known circuit protection devices include devices such as fuses, circuit breakers, and limiters, which may address overcurrent, overload, and short circuit conditions in an electrical system, and other switching devices. As the size and complexity of electrical systems increase, the number of associated circuit protection devices also typically increases. Managing a complex electrical system having a large number of circuit protective devices, any one of which may operate at any given time to isolate portions of the circuitry in the electrical system, is challenging.

BRIEF DESCRIPTION OF THE DRAWINGS

FIG. 3 is a schematic block diagram of an exemplary embodiment of a circuit protector and panel for the circuit protector management system shown in FIG. 1.

FIG. 4 is a schematic block diagram of the status element shown in FIG. 3.

FIG. 5 is a schematic block diagram of the reader element shown in FIG. 3.

FIG. 6 is method flow chart of a first method of determining an operation state of a circuit protector for the circuit protector and panel shown in FIG. 3.

FIG. 45 is an example embodiment of a user interface displaying a circuit protector alarm summary.

DETAILED DESCRIPTION OF THE INVENTION

Exemplary embodiments of systems and processes that facilitate monitoring and management of circuit protection devices in electrical systems, referred to herein as "circuit protectors", and systems and processes that facilitate rapid response to specified operating conditions of the circuit protectors and associated circuitry are described below in detail. The systems and processes facilitate, for example, detection of operated circuit protectors, notification to responsible personnel of operated circuit protectors and their location in the system for response and attention by authorized personnel, diagnostics and troubleshooting of circuit protectors and electrical systems, and circuit protector inventory control and management for facilities management. A technical effect of the systems and processes described herein include at least one of organization and presentation of circuit protector information and electrical system data for facilities management and system oversight, real time alarm condition detection and notification for circuit protector operation, automated alert notification and summoning of personnel or site technicians to quickly reset and re-store downed circuitry due to operation of one or more circuit protectors, archived installation and performance data of the circuit protectors and associated electrical system for diagnostics and troubleshooting of electrical system perturbation events, and proactive management of electrical systems in anticipation of potential circuit perturbations.

A. Introduction

Figure 1:
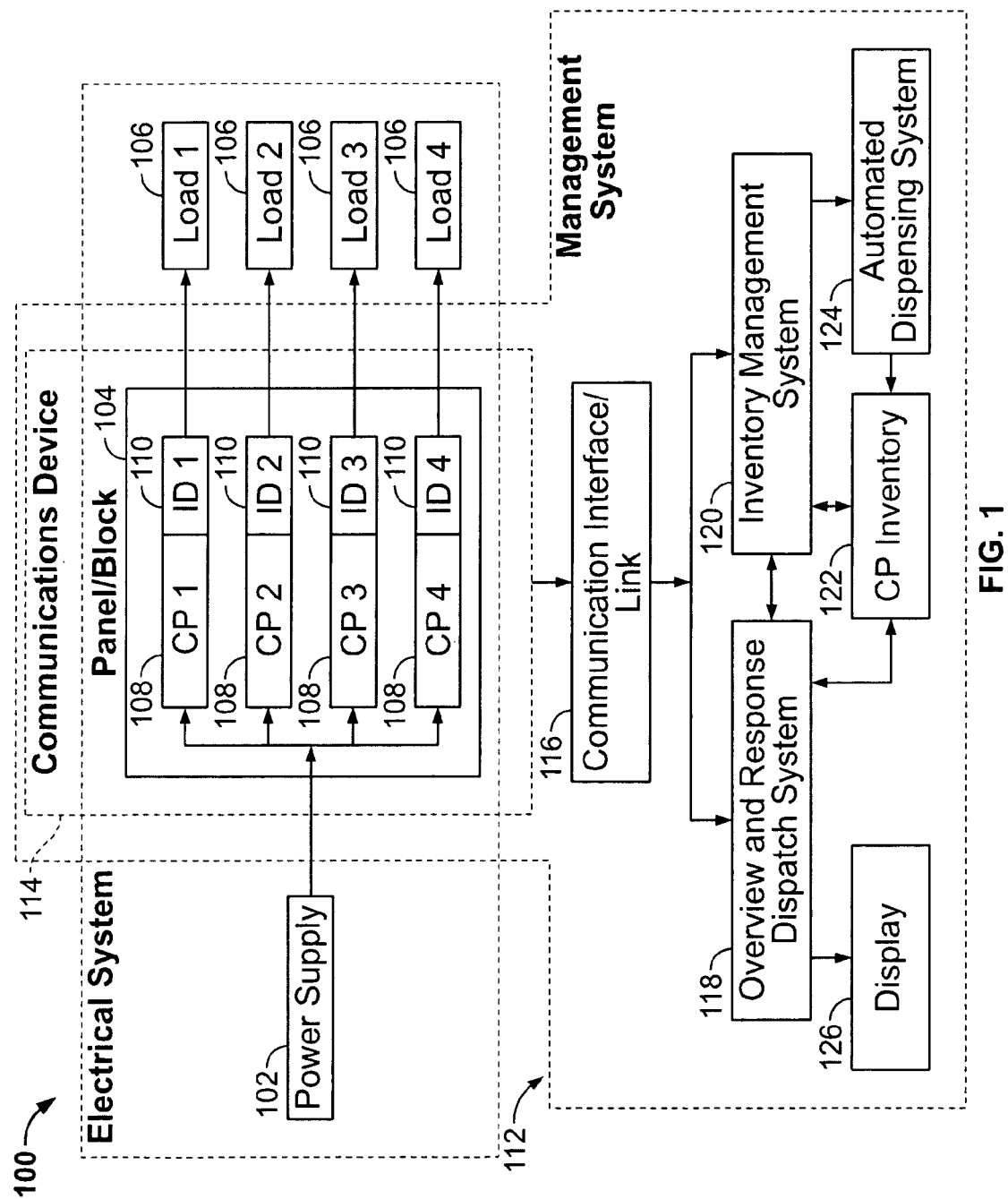
FIG. 1 is a schematic block diagram of an exemplary circuit protector management system coupled to an electrical system.

FIG. 1 is a schematic block diagram of an exemplary electrical system 100 representative of the type of system that utilizes circuit protectors. In different embodiments, and as a few examples, the electrical system 100 could be implemented as a battery powered electrical system for a vehicle, an AC or DC power distribution system for a building, industrial plant and/or control system, a communications network, other system as those in the art will appreciate.

In the illustrated embodiment, the electrical system 100 includes a power supply or power supply circuitry 102, a circuit protector panel, a circuit protector holder, a circuit protector block or a circuit protector cabinet (collectively referred to herein as "the panel 104") coupled to the power supply 102 by a line L, and a number of electrical loads 106 operatively connected to the panel 104. The panel 104 includes one or more circuit protectors 108 that interconnect the power supply 102 to the respective loads 106.

In various embodiments, the loads 106 may include electrical components such as transformers, inductors, integrated circuits; equipment such as machines, electrical motors and drive components, computers, programmable logic control systems; and sub-circuitry of the larger electrical system 100. Additionally, the loads 106 may serve as a secondary power source to additional loads of the same or different electrical systems.

The circuit protectors 108 in an exemplary embodiment are overcurrent protection devices, such as, for example, fuses, circuit breakers and/or switches. Each circuit protector 108 is constructed to physically break, open, or interrupt a circuit path or current path between line and load circuitry and isolate the loads 106, for example, from the power supply circuitry 102 to prevent damage to the loads 106 upon the occurrence of specified current conditions in the circuit, such as overcurrent, overload, and short circuit conditions. When such conditions occur, the circuit protectors 108 prevent current flow between the power supply circuitry 102 and the respective loads 106, protecting them from potential damage attributable to current flow in such conditions. That is, in normal current conditions the circuit protectors 108 are in a current carrying or unopened condition completing an electrical connection through between the power supply 102 and the loads 106, and in response to abnormal or unacceptable current conditions in the circuit, the circuit protectors 108 change or operate to a non-current carrying state, sometimes referred to as an opened or tripped condition breaking the electrical connection between the power supply 102 and the loads 106.

While one circuit protector panel 104 is illustrated in FIG. 1, it is understood that the electrical system 100 may include a plurality of circuit protector panels 104 in different embodiments. The panels 104 may be located in the same or different physical locations, and each of the circuit protectors 108 is associated with specific electrical loads 106 of the system. While four circuit protectors 108 are illustrated in the panel 104 for ease of illustration, it is contemplated that greater or fewer circuit protectors 108, including a single circuit protector 108, may be employed in the panel 104. That is, the circuit protector panel 104 may be configured or adapted to connect a single circuit protector 108 to the system 100, or alternatively may be adapted to connect a plurality of circuit protectors 108 as those in the art will appreciate.

In complex electrical systems, many circuit protectors 108 are typically required in different panels 104 of various sizes and configurations. Also, complex electrical systems typically include various types and configurations of circuit protectors 108 to meet particular needs of the loads 106 and associated electrical subsystems. The combination of large numbers of circuit protectors 108, assorted numbers of panels 104 in different locations, and various types of circuit protectors 108 in the electrical system 100 presents difficult problems in locating operated circuit protectors 108 and resetting or restoring the circuitry when one or more of the circuit protectors 108 in the electrical system 100 operates to protect the associated loads 106 in the system 100.

As the size and complexity of electrical system 100 increases, the potential locations of circuit protectors 108 in the system 100 increases too. The panels 104 containing the circuit protectors 108 may be located in different places in the electrical system 100, including different buildings, areas, compartments and portions of the electrical system site or facility. Therefore, when one or more circuit protectors 108 operate to open a portion of the circuitry in the electrical system 100, it can be a daunting task to locate which of the circuit protector devices 108 has operated, and to take corrective action to reset or restore affected circuitry and loads 106.

An elapsed time between operation of one or more circuit protectors 108 and re-energizing of the associated circuitry to restore full operation of the electrical system 100 is significant in many applications. For example, in an industrial plant control system or office building, the time in which affected machines or computers are unavailable due to operated circuit protection devices amounts to lost productivity and economic loss. For virtually any electrical system, and especially for critical electrical systems, minimizing the time and effort required to locate operated circuit protectors 108 and to take corrective action is desired.

When the circuit protectors 108 are circuit breakers, once the appropriate location of an operated circuit breaker has been identified, the breaker or breakers can generally be quickly reset. Locating the correct breakers, however, is not always a quick or easy task when there are a large number of breakers in different locations or panels 104 in the electrical system 100. To locate the operated breakers quickly, downed circuitry or equipment typically is matched with the appropriate breakers of the system 100, which requires some detailed knowledge of the electrical system 100 that maintenance personnel may or may not have at any given time. Alternatively, and probably more likely in most cases, maintenance personnel systematically inspect all of the circuit protector breakers in the electrical system to locate tripped breakers. Such an exercise is usually inefficient, except perhaps in situations where by mere chance the personnel starts the inspection in the area of the operated breakers. Also, locating tripped breakers can be complicated when breakers in more than one location are tripped, and in the case of faulty or inoperative breakers which are not tripped, restoring the circuitry of the electrical system 100 when one or more of the circuit protectors 108 operates can be extremely difficult and time intensive.

When the circuit protectors 108 include fuses, operated fuses must be located, replacement fuses must be obtained, and the operated fuses must be replaced to reset the circuitry of the electrical system 100. If a replacement fuse is on hand and the location of the operated fuse is known, the fuse can typically be quickly replaced to restore the circuitry. Locating which fuse or fuses has opened, however, and obtaining the proper replacement fuses, is not always easy. Fuses of different types may be located in various places throughout the electrical system 100, and locating the proper replacement fuse from a large inventory of different fuse types, whether on site or at a remote location, can be time intensive. As with circuit breakers, locating operated fuses can be complicated when more than one fuse operates, and locating faulty fuses or improperly installed fuses in the electrical system 100 can be extremely difficult. Additionally, properly managing, maintaining, and replenishing a replacement fuse inventory to meet actual and anticipated needs of the electrical system 100 can be difficult.

In addition, circuit protectors 108 tend to operate with little or no advanced warning. Thus, troubleshooting the electrical system 100 and/or taking preemptive action before the circuit protectors 108 operate is difficult, if not impossible, in many electrical systems. Additionally, diagnosing the electrical system 100 to determine why or how certain circuit protectors 108 operated is often an after-the-fact analysis and can be speculative in nature.

B. The Circuit Protector Management System.

In an exemplary embodiment, and to alleviate these and other difficulties, each of the circuit protectors 108 is associated with a status element 110 located internal or external to the circuit protector 108. That is, the status element 110 may be located interior to or inside the circuit protector 108, on an external surface of or otherwise outside of the circuit protector 108, or even at another location at a distance from the circuit protector 108. As described further below, in different embodiments the status elements 110 may be implemented in electronic form or be mechanically actuated to interface the status elements 110 to the circuit protector management system 112. When a circuit protector 108 operates to open a circuit path in the electrical system 100, the associated status element 110 aids in identifying the circuit protector so that the circuitry can be efficiently re-energized with minimal time delay.

Each of the status elements 110 of the circuit protectors 108 is responsive to operation of the respective circuit protector 108, and in exemplary embodiments the status elements 110 transmit or communicate signals or data to an circuit protector management system 112. The status elements 110 in some embodiments may be used as data collectors regarding operating conditions of the circuitry in the electrical system 100, as explained further below.

In an exemplary embodiment, the circuit protector management system 112 may include in whole or in part a communications device 114 in communication with the status elements 110 of the circuit protectors 108, a communications interface or link 116, an overview and response dispatch system 118 in communication with the link 116, and an inventory management system 120 in communication with the link 116 and/or the overview and response dispatch system 118.

During operation of the electrical system 100, signals are sent from the status elements 110 of the circuit protectors 108, through the communications device 114 and the communication link 116, to the overview and response dispatch system 118. The communications device 114 allows the status elements 110 associated with the circuit protectors 108 to communicate with the overview and response dispatch system 118 and the inventory management system 120 via the communications interface 116. In particular, when any of the circuit protectors 108 operates to interrupt, break, or open a circuit path to one or more of the loads 106, a signal is communicated from the respective identification element 112 via the communications device 114 and the communication link 116 to the overview and response dispatch system 118 and/or to the inventory management system 120.

The overview and response dispatch system 118 and/or the inventory management system 120 are, in turn, associated with an inventory 122 of circuit protectors and an automated or manual dispensing system 124 for stocking and replenishing the inventory 122 as the inventory is used. The inventory 122 may be located on site or at another location from the electrical system 100.

In an exemplary embodiment, the communications device 114 is located proximate to the circuit protectors 108, either integrated into the construction of the panel 104 or in a location proximate to the panel 104. The communications interface or link 116 may be a hard-wired communications link, optical link, wireless communications link, satellite link, and equivalents thereof as explained further below. Additionally, the communications interface or link 116 may utilize existing infrastructure in the electrical system 100, and may operate, for example, using known power line frequency carrier technology or equivalents thereof over existing wires and conductors in the electrical system 100. Combinations of such communications links may likewise be provided in different embodiments of the management system 112.

The communications link 116 may be a dedicated interface or link used only for circuit protector management purposes by the management system 112, or may also serve other unrelated purposes and be used for transmission of other signals, data and communications as desired. Communication between the communications device 114 and the overview and response dispatch system 118 may be established using known data transmission protocols and network communication technologies such as DeviceNet and Datahiway protocols. Ethernet connections multiplexing communication schemes, wireless technologies, satellite transmission schemes, equivalents thereof, and the like may also be used as those in the art will appreciate.

While one communications device 114 is illustrated in FIG. 1, it is contemplated that more than one communications device 114 may be employed in the circuit protector management system 112. Multiple communication devices 114 may furthermore be employed in the same panel 104 depending upon the number of circuit protectors 108 in the panel 104 and the sophistication of the management system 112. In exemplary embodiments, as further explained below, one communication device 114 may be used to monitor multiple circuit protectors 108 and transmit information to the overview and response dispatch system 118.

In various embodiments, the overview and response dispatch system 118 may be a network-based system, a personal computer, a computer workstation, a programmable logic controller or other electronic controller, a processor-based hand held device or another electronic device or equivalent that may receive and process or interpret signals from the link 116. In one embodiment, the overview and response dispatch system 118 may include a user display 126 to alert an operator or maintenance personnel of an issue with the electrical system 100, such as an operated circuit protector 108 which has broken a circuit path in the electrical system 100.

In different embodiments, the inventory management system 120 is a network-based computer system, a personal computer, a computer workstation, a processor-based hand held device, a programmable logic controller or an electronic controller or other electronic device which receives signals from the link 116 and/or the overview and response dispatch system 118 and is capable of responding appropriately. The inventory management system 120 may be integrated into the overview and response dispatch system 118 as desired, or may be a separate device in the same or different location from the overview and response dispatch system 118. The inventory management system 120 is associated, directly or indirectly, with the inventory 122, and is in communication with the automated dispensing system 124. The automated dispensing system 124 may be of a known type currently used in industrial and business facilities to provide uninterrupted access to supplies. Such automated dispensing systems are commercially available and sometimes referred to as Smart Inventory Systems. The automated dispensing system 124 electronically receives and processes orders for circuit protection products so that the product orders are filled and the circuit protection products are delivered to the inventory 122 with minimal delay. Alternatively, a manual inventory system may be employed to dispense and replenish the circuit protection devices.

While one automated dispensing system 124 is shown in FIG. 1, it is appreciated that the overview and response dispatch system 118 and inventory management system 120 may communicate with more than one automated dispensing system 124 to obtain inventory products from the same or different circuit protection product vendors, distributors or suppliers as desired. Additionally, the overview and response dispatch system may communicate with known computerized maintenance management system (CMMS), supervisory control and data acquisition (SCADA) systems, industrial control and automation systems, enterprise resource planning (ERP) systems, Electronic Data Interchange (EDI) systems, Manufacturing Resources Planning (MRP) systems, and supply chain management systems in addition to or in lieu of the inventory management system 120.

By virtue of the status elements 110 associated with the fuses 108, and as further explained below, the overview and response dispatch system 118 may direct an operator or maintenance personnel to a precise location and to one or more specific circuit protectors 108 in the electrical system 100 for resetting or restoring the circuitry. Additionally, the overview and response dispatch system 118 may locate proper replacement circuit protectors in the inventory 122 and direct personnel to a precise location to obtain the proper replacement circuit protectors, while contemporaneously ordering additional circuit protectors via the manual or automated dispensing system 124 to replenish the inventory 122 as it is used. Thus, the electronic management system 112 can provide precise instruction to personnel regarding the circuit protectors 108 to minimize down time of the associated load 106 for the operated circuit protector 112. The circuit protectors 108 may therefore be attended to as efficiently as possible, and automated ordering of replacement parts for the circuit protector inventory 122 ensures prompt replenishing of the inventory and eliminates error in inventory management. Factory automation technologies and equivalents thereof may be used to ensure that replacement circuit protectors are available for use and pinpoint their location in a physical plant for retrieval by maintenance personnel, and inventory management is accomplished in an automated manner without human intervention or action by maintenance personnel.

Figure 2:
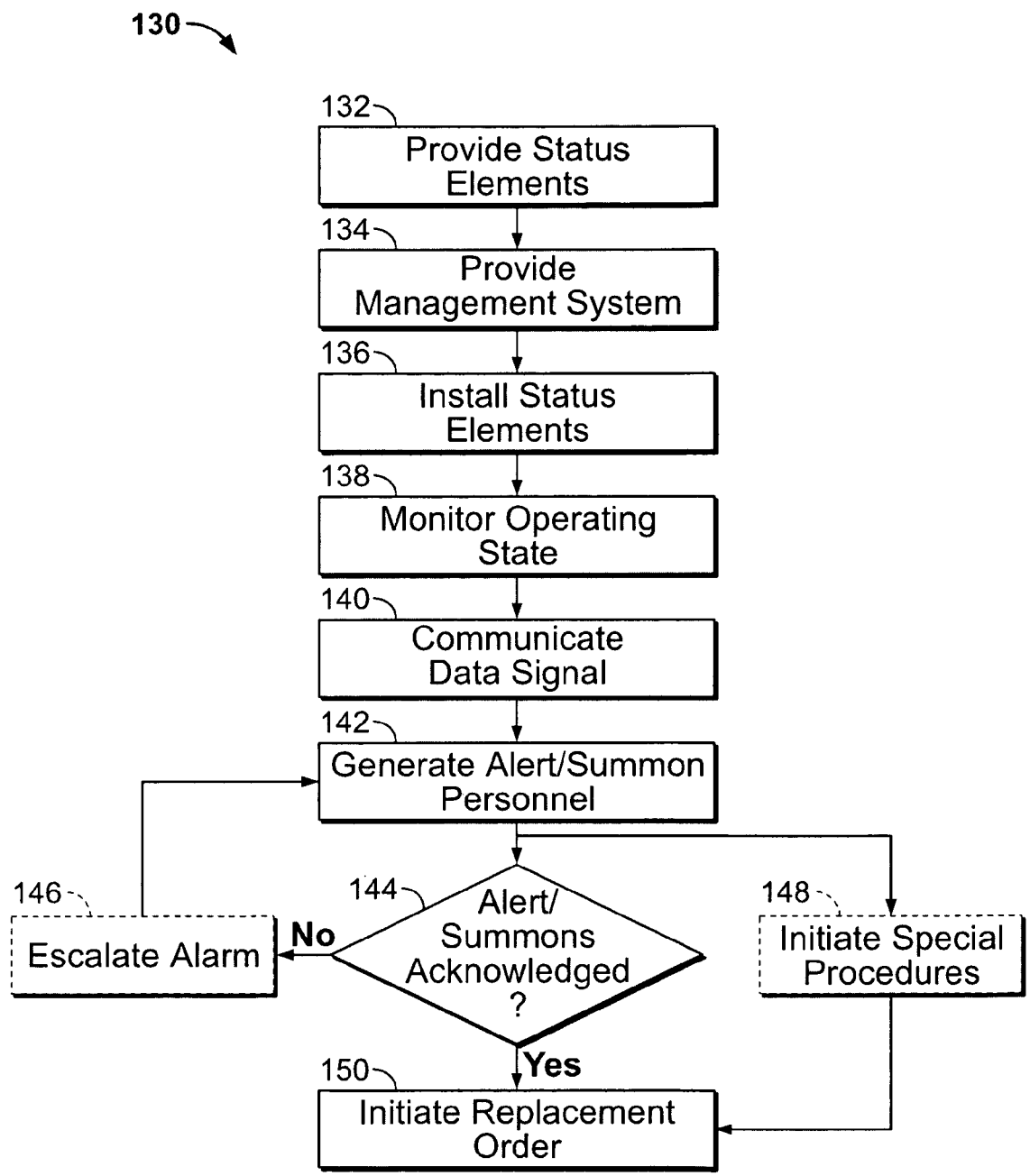
FIG. 2 is a method flowchart for the circuit protector management system shown in FIG. 1.

FIG. 2 is a flowchart of an exemplary method 130 for monitoring circuit protectors 108 utilized the circuit protector management system 112 shown in FIG. 1. The method 130 facilitates efficient re-energizing affected circuitry in an electrical system 100 when one or more of the circuit protectors 108 operates to isolate one portion of an electrical system 100 from another portion of the electrical system 100, such as isolating one or more of the loads 106 from the power supply 102.

In an exemplary embodiment, the method 130 includes providing 132 status elements, embodiments of which are explained below, proximate to the respective circuit protectors of interest in the electrical system, and providing 134 the electronic overview and response dispatch system responsive to the status elements. Once the status elements are installed 136, they may be used to monitor 138 an operating state of the circuit protectors.

Based upon the sensed state of the circuit protectors, a data signal may be transmitted 140 from at least one of the status elements to a remote device or location when one of the circuit protectors has operated to isolate a portion of the electrical system. The data signal, may include, for example, an identification code and an address code to identify the location of the operated circuit protector, and detailed information and instruction to appropriate personnel to reset or restore the circuitry quickly and efficiently. When interpreted at the remote location by the overview and response dispatch system, the data signal may be converted to an instruction to an operator or technician that may include, for example, information regarding the location of operated circuit protectors, information needed to properly reset or restore the circuitry affected by the operated circuit protectors, inventory information for replacement circuit protectors needed to properly restore the circuitry, and information pertaining to operating conditions of the circuitry for diagnostic and troubleshooting purposes. The instruction to personnel may further include specific information regarding potential hazards in the location of the circuit protector, and information regarding precautions that should be taken and personal protection equipment that should be utilized when responding to an operated circuit protector.

In response to the data signals communicated 140 to the overview and response dispatch system, the overview and response dispatch system generates 142 an alert and summons to responsible personnel, informing them of the operated circuit protector and the location of the operated circuit protector. For example, the overview and response dispatch system may directly communicate with an operator, maintenance personnel, or others via a remote device such as a computer, pager, dispatcher, a hand-held device such as a personal digital assistant (PDA), personal information manager (PIM), or electronic organizer, cellular phone or equivalent device which is either networked with the overview and response dispatch system or in communication with the overview and response dispatch system and capable of reaching appropriate personnel. That is, the overview and response dispatch system may be active instead of passive, and instead of simply providing an alert and waiting for human response, the overview and response dispatch system is capable of actually seeking and directly contacting specific persons in multiple ways, and summoning them to respond and intervene as needed to properly manage the electrical system.

The alert and summons may be provided, for example, in an email notification, a fax notification, a pager notification, a web page notification, a voice notification, or other means. The overview and response dispatch system may wait 144 for acknowledgment of the alert and summons by one or more of the designated personnel, and if no acknowledgement is received, another alert and summons is sent. Optionally, the overview and response dispatch system may escalate 146 the frequency or intensity of the alerts and summons depending upon responsiveness of the designated personnel or actual operating conditions of the electrical system. For example, if multiple circuit protectors open at about the same time, a larger problem with the electrical system could be implicated and the management system may more urgently generate alarms, alerts and summons to address potential problems.

Optionally, the overview and response dispatch system may also automatically undertake and initiate 148 other desired actions without human intervention, such as activating auxiliary power to the affected loads corresponding to specific machines or equipment, shutting down at risk systems or loads corresponding to specific machines or equipment, saving key circuit data for analysis, etc. when the circuit protectors 108 operate to open portions of the electrical system 100, and communicating such undertakings and actions to designated personnel for further evaluation and response.

More than one person may be contacted by the overview and response dispatch system and summoned to help re-energize affected circuitry, for example, by replacing operated fuses. Alerts and requests for action by designated personnel may be sent repeatedly from the overview and response dispatch system within specified time periods until acknowledged by appropriate personnel, and escalated alerts and summons may be generated and special procedures implemented as appropriate to deal with different situations depending upon the sophistication of the circuit protector management system 112.

Because the alert and notifications are sent more or less contemporaneously with the operation of the circuit protectors, and because the overview and response dispatch system actively attempts to find, contact and summon personnel and provides complete information needed to re-energize affected circuitry, including at least the type and location of operated circuit protectors, downed circuitry may be quickly re-energized and the full electrical system restored in as quick a time as possible. Automated alerts and summons may be sent around the clock without human intervention as needs arise. The information pertaining to operated circuit protectors can be presented to the end user in an easy to use tabular or graphical form in real time as the circuit protectors operate, and the end recipient of the information need not gather additional information to complete the task of re-energizing circuitry.

By actively seeking and contacting appropriate personnel, as opposed to a reactive system that is dependent upon human response, the overview and response dispatch system is not dependent upon specific persons and designated personnel being in any specific location, such as a workstation, terminal, or working area to receive an alert notification of an operated circuit protector. Rather, the overview and response dispatch system directly seeks out designated persons and contacts them wherever they may be found. Thus, should the persons or personnel be away from a desk, workstation, terminal or working area during working or non-working hours, the overview and response dispatch system is capable of reaching them by other means and instantly notifying them of operated circuit protectors, rather than having to wait for them to return to receive an alert message at their desk, workstation, terminal or working area.

When used as data collectors, the status elements may facilitate monitoring, troubleshooting, and diagnosis of the electrical system as the circuit protectors are monitored 138 and signals are communicated 140 to the overview and response dispatch system. Through monitoring and analysis of such data, potential problems in the system may be more accurately identified and resolved, and more reliable operation of the electrical system may be achieved. In such an embodiment, the alert or summons generated 142 by the overview and response dispatch system may include a warning or alarm to system operators or personnel to anticipate potential circuit opening events and circuit perturbations that may otherwise cause the circuit protectors to operate, potentially providing time for preemptive measures to be taken before one or more of the circuit protectors operate to break the associated circuit paths in the electrical system. The associated time, cost, expense and inconvenience of opened circuitry in the electrical system and the associated time, cost, expense and inconvenience involved in resetting, restoring or re-energizing the circuitry due to operated circuit protectors may therefore potentially be avoided in the first instance with proactive management of the electrical system.

The overview and response dispatch system may further initiate 150 a replacement order to replenish, for example, a fuse inventory when the operated fuse or fuses in the electrical system has been replaced.

C. The Status Elements and Circuit Protector Monitoring

It is contemplated that many different status elements and circuit protector monitoring assemblies may be provided in the circuit protector management system 112. Exemplary embodiments will now be described for illustrative purposes only. It is understood that other monitoring assemblies may be used in addition to the examples set forth below with equal effect.

1. Reader/Interrogator Monitoring Systems

FIGS. 3-8 illustrate exemplary embodiments of a first type of status element and circuit protector monitoring assembly 158 that may be used in the circuit protector management system 112 and the method 130.

FIG. 3 is a schematic block diagram of the monitoring assembly 158 including the circuit protector panel 104 and an exemplary circuit protector 108. The panel 104 includes an area dimensioned to accommodate the circuit protector 108, and conductive terminals 160. In the embodiment of FIG. 3, the circuit protector 108 is a fuse 162 and the terminals 160 are conductive fuse clips or equivalents thereof for establishing line and load connections to the fuse 162.

In accordance with known fuses, the fuse 162 includes a protective body or housing 164 fabricated from an insulative or non-conductive material, conductive terminal elements 166, 168 coupled to the body 164, and a primary fuse element 170 extending within the body 164 and electrically connected between the terminal elements 166, 168 to define a conductive current path therebetween. The primary fuse element 170 is constructed, sized, and dimensioned to melt, disintegrate, vaporize, or otherwise structurally open or interrupt upon the occurrence of a predetermined overcurrent condition, such as an overload, overcurrent or short circuit condition, to break or open the conductive current path and electrical connection through the fuse 162 by preventing current flow between the terminal elements 166, 168. Opening of the primary fuse element 170 in such a manner isolates one portion of an electrical system from another portion of an electrical system as explained above and protects electrical components and equipment associated with the fuse 162 from damage which may otherwise result. Various types of fuse elements, fusible links, and assemblies are known that provide such overcurrent protection, and the invention is not limited to any particular type or configuration of the primary fuse element.

In an illustrative embodiment, the fuse 162 is a cylindrical cartridge fuse including a cylindrical body 164 having a first end 172, a second end 174, and a bore extending therebetween. The primary fuse element 170 extends through the bore and is connected to the terminal elements 166 and 168 in a known manner such as via conductive washers, soldering, welding, brazing, equivalents thereof or other acceptable mechanical and electrical connection methods. In one embodiment, the terminal elements 166, 168 are conductive ferrules or end caps and are attached to the respective ends 172, 174 of the body 164 in a known manner, such as with crimping techniques. When the terminal elements 166, 168 are connected to line-side and load-side electrical circuitry, such as the power supply 102 and a load 108 as shown in FIG. 1, a current path is formed through the primary fuse element 170. While a cylindrical or tubular body 164 is illustrated in FIG. 3, it is understood that other shapes and configurations of bodies or housings may be employed in alternative embodiments, including but not limited to rectangular fuse modules. Likewise, a variety of terminal elements may be used in lieu of the end caps illustrated in FIG. 3.

The status element 110 is electrically connected in parallel with or attached to the primary fuse element 170 and in one embodiment is interior to the fuse body 164, although it is understood that in an alternative embodiment the status element 110 may be located on an outer surface of the body 164 or elsewhere. In the illustrated embodiment, the status element 110 is connected to the terminal elements 166, 168 in a known manner through a fine fuse wire 176 or other conductive material having a much greater electrical resistance than the primary fuse element 170. As such, only a very small portion of the current flowing through the fuse 162 flows through the status element 110, and the status element 110 may therefore monitor a relatively small current to indicate the state of the fuse 162 as described below.

In an exemplary embodiment, the status element 110 is a known transponder device 178, which communicates wirelessly with the communication device 114. In an exemplary embodiment, the communication device 114 is also a transponder which functions as a reader or interrogator device 180 as explained below.

The transponder device 178 and the reader device 180 communicate with one another to determine whether the fuse 162 is in an operational state or whether the fuse 162 is in an operated state. As used herein, the operational state refers to a current carrying or unopened condition completing an electrical connection through the fuse, and the operated state refers to an opened condition breaking the electrical connection through the fuse. Still further, the transponder device 178 may communicate, in addition to the opened or unopened state of the fuse, other data and information of interest regarding the operation of the electrical system 100.

For example, in one embodiment, the transponder device 178 collects current, temperature and/or voltage data over time experienced by the fuse 162. Current and voltage readings, for example, may be obtained with known sensor elements measured across, for example, a shunt within the fuse 162 or by other equivalent techniques known in the art. Alternatively, temperature sensors may also be used to monitor operating temperatures of the fuse housing 164, terminal elements 166 and 168, or the fuse clips 160. By comparing sensed temperature readings or temperature determinations of conductive portions of the fuse 162 or the fuse clips 160 to empirically determined temperatures corresponding to predetermined current levels and intensities, the operating current through the fuse 162 may be deduced and communicated to the overview and response dispatch system 118 via the reader device 180. Current, voltage and temperature readings may be input to the transponder device 178 for communication to the reader device 180.

In an exemplary embodiment, the transponder device 178 and reader device 180 communicate wirelessly via radio frequency and the system operates in accordance with known radio frequency identification (RFID) or equivalent systems. As such, and as those in the art may appreciate, the transponder device 178 may be an RFID identification tag or equivalent, sometimes referred to as an RF chip, and the reader or interrogator device 180 is an RFID reader or an interrogator. Thus, the RF transponder device 178 and reader device 180 operate on close proximity electromagnetic or inductive coupling of the transponder device 178 and the reader device 180 to communicate with one another, or alternatively operates using propagating electromagnetic waves. It is contemplated, however, that other forms and types of wireless communication may be utilized in lieu of RFID communication, including but not limited to infrared communication.

In an exemplary embodiment, the transponder device 178 and the interrogator device 180 communicate via an air interface over a predetermined radio frequency carrier, for example, 100-500 kHz, and more particularly, at about 125 kHz. It is understood, however, that other frequency carriers may be employed per applicable RFID standards. Also, it is recognized that data transmission rates between the transponder device 178 and the reader device 180 are impacted by the selected carrier frequency for signal transmission. That is, the higher the frequency, the higher the transmission rate between the devices.

The operating range or distance of communication between the reader device 180 and the transponder device 178 is dependent upon the power level of the devices, which may be, for example from 100-500 mW or as dictated by applicable regulations. The range is principally affected by the power available at the reader device 180 to communicate with the transponder device 178, the power available within the transponder device 178 to respond, and environmental conditions and the presence of structures in the operating environment. In one embodiment the power level of the transponder device 178 is much less than the power level of the reader device 180. Generally, the transponder device 178 is selected to meet desired specifications and objectives for a particular operating environment.

Referring now to FIG. 4, the transponder device 178 is schematically illustrated. The transponder device 178 may include a processor 182, a memory 184 which in various embodiments may be read-only memory (ROM), random access memory (RAM), or a non-volatile programming memory, such as electrically erasable programmable memory (EEPROM), or equivalents thereof depending on the sophistication of the transponder device 178, and an antenna 186. In one embodiment, the processor 182 communicates, via radio frequency, with the reader device 180 when interrogated by the reader device 180, and the antenna 186 senses a data field generated by the reader device 180 in operation. The antenna 186 also communicates or transmits a response to the reader device 180 in a known manner. The memory 184 is used for data storage of, voltage, current and/or temperature readings for example, and storage for executable instructions and responses to the reader device 180.

Referring now to FIG. 5, the reader device 180 is schematically illustrated. The reader device 180 includes a processor 190, an antenna 192, and a memory 194. The processor 190 communicates, via radio frequency, with the transponder device 178 and the antenna 192 is used to send signals to the transponder device 178 and receive signals from the transponder device 178 in operation. The memory 194 may be read-only memory (ROM), random access memory (RAM), or non-volatile programming memory, such as electrically erasable programmable memory (EEPROM), and their equivalents depending on the sophistication of the reader device 180. The memory 194 may include executable instructions and control routines for execution by the processor 190.

Referring now to FIGS. 3-5, the reader device 180 may mounted to the panel 104 in the vicinity of the fuse 162. Periodically, the reader device 180 sends a signal, sometimes referred to as an interrogation, to the transponder device 178 associated with the fuse 162. Specifically, the reader device 180 interrogates the transponder device 178 via wireless communication over an air interface such that a transmission data field of the antenna 192 of the reader device 180 interacts with a transmission data field of the transponder device antenna 186. In response to the interrogation, the transponder device 178 answers the reader device 178. Depending upon the sophistication of the communication protocol and the relation of the transponder device to the primary fuse element 170 of the fuse 162, the operational state of the fuse 162 may be determined in a variety of ways by the processor based reader device 180. The operational state of the fuse 162 may be determined by a response, or lack of response, from the transponder device 178 to an interrogation by the reader device 180.

For example, and in an exemplary embodiment, the transponder device 178 is a passive radio frequency transmitter, and relies upon a transmission data field generated by the reader device 180 for power to respond to the reader device 180. FIG. 6 illustrates an exemplary method 198 for such an embodiment to determine the operation state of the circuit protectors.

Referring now to FIG. 6, the processor based reader device may be programmed to poll 200 the circuit protector status elements in the system and await 202 a response from the transponder devices. Responses received to interrogations in the polling process may be interpreted 204 and provided, output or communicated 206 to the overview and response dispatch system. For example, in one embodiment any signal received 202 from a transponder device in response to an interrogation by the reader device may be taken as an indication that the primary fuse element of the associated fuse is operational. In an embodiment similar to FIG. 3, when the primary fuse element 170 opens the entire current would be directed to the transponder device 178, and if the transponder device 178 is selected so that the current destroys or renders the transponder device 178 inoperable, the transponder device 178 could not function to respond after the fuse 162 has opened. Thus, the fact that a response was received in such a scenario indicates that the primary fuse element 170 has not opened, and the operational status of the fuse 162 may be accordingly provided 206 to the overview and response dispatch system. The status elements may be polled repeatedly in such a system and responses collected to monitor the larger electrical system.

The method 198 may be employed in an embodiment where, through strategic selection of the transponder device 178 and with strategic connection of the transponder device 178 to the fuse 162, the transponder device 178 may withstand opening of the primary fuse element 170 and determine the opening of the primary fuse element 170 via, for example, current or voltage sensing of the electrical circuit through the fuse 162 or temperature sensing of the fuse clips 160 or the terminal elements 166, 168 of the fuse 162. In such an embodiment, the transponder device 178 may respond in a first manner when the fuse 162 is in an operational state and respond in a second manner different from the first when the fuse 162 is in a non-operational state breaking the circuit through the fuse 162 when the fuse 162 has operated. The reader device may be programmed to distinguish between the two manners of response, and communicate 206 the status of the fuses to the overview and response dispatch system.

Figure 7:
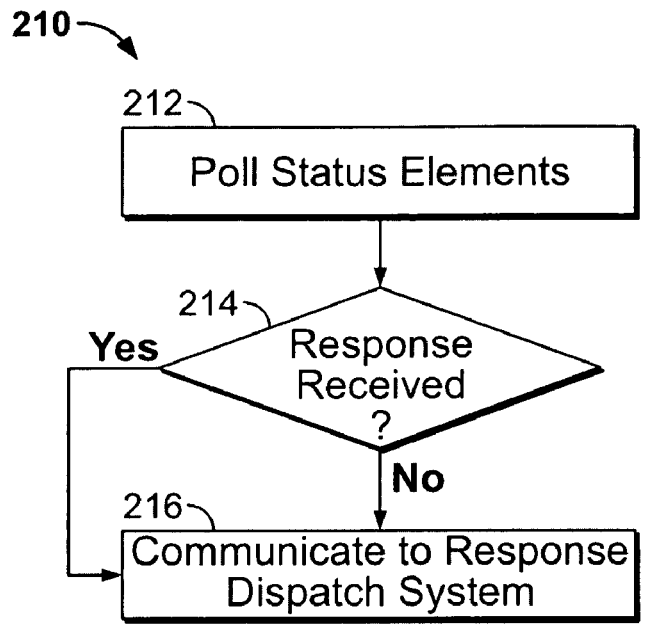
FIG. 7 is method flow chart of a second method of determining an operational state of a circuit protector for the circuit protector and panel shown in FIG. 3.

In another exemplary method 210 illustrated in FIG. 7, the reader device 180 may poll 212 the status elements and await responses 214 from the transponder devices associated with the fuses. A lack of response from the any of the transponders may be used to indicate that the associated fuse has opened, and the operated status of the fuse may be communicated 216 to the overview and response dispatch system. If a response is received 214, the operational status of the fuse is communicated to the overview and response dispatch system.

The method 210 could likewise be used in an embodiment wherein a transponder device is merely physically located in proximity to the primary fuse element of a fuse without being electrically connected to the terminal elements of the fuse, or without being connected to the primary fuse element. In such an embodiment, heat and electrical arcing associated with opening of the primary fuse element would damage the transponder device and prevent it from responding to an interrogation. Thus, if no response is received from a given transponder device, it may be presumed that the associated fuse has opened.

Using either of the methods 198 or 210, the reader device 180 may interrogate the transponder devices 178 of multiple fuses 162 in the panel 104 and determine, based upon the type of responses received, which, if any, of the fuses 162 in the panel 104 have operated to open circuits to the loads 106. In a more advanced communications protocol, a response from a transponder device 178 may be decoded by the reader device 180, thereby allowing communication of specific data stored in the transponder device memory 184 to be communicated to the reader device 180. For example, the data may include one or more of the following exemplary data information: an identification code for a specific fuse 162 in the system; a type or size code for the fuse 162; a location code for the panel, block or holder associated with the fuse 162 in the electrical system 100; an identification code for the specific panel 104 associated with the fuse 162; an inventory code for the fuse 162; a manufacturing date of the fuse 162 or other information as desired; and even data pertaining to current, voltage and temperature characteristics over time may be stored in the memory 184 of the transponder device 178. Thus, by collecting operating data, the transponder device 178 could be of aid in troubleshooting the electrical system, and could be helpful to detect improperly installed fuses or malfunctioning fuses by denoting abnormal or unexpected current, voltage or temperature characteristics of the fuse 162 in operation.

Data of interest with respect to the electrical system and the load connected to the fuse 162 may also be sensed by calibrated transducers and communicated to the transponder device 178 and/or the reader device 180. For example, data may be collected and communicated relating to vibration and displacement conditions for electric motors, stress/strain measurements and readings, acoustical emissions and noise readings, thermal imagery and thermalography readings, resistance readings, pressure readings, and humidity readings.

Figure 8:
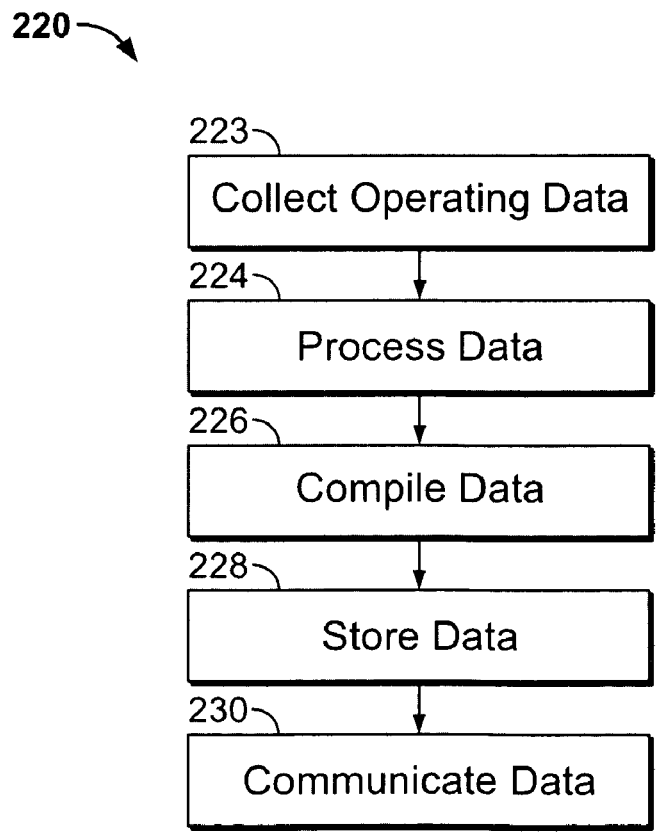
FIG. 8 is method flow chart of a third method of determining an operational state of a circuit protector for the circuit protector and panel shown in FIG. 3.

In another embodiment, and as illustrated in FIG. 8, another method 220 for determining the status of circuit protectors is provided. The method 220 may be used, for example, when the transponder device 178 is an active radio frequency transponder, and is powered by an onboard power supply, such as a battery 222 (shown in phantom in FIG. 4), or alternatively, is powered by the electrical current passing through a secondary fuse link of the fuse as shown in FIG. 3. As such, the transponder device 178 is capable of storing data and transmitting the data to the reader device 180 when interrogated. That is, in such an embodiment the transponder device 178 is a read and write device and is capable of advanced functions, such as problem diagnosis and troubleshooting.

The processor 190 of the reader device 180 may collect 223 operating data such as current, voltage or temperature conditions of the circuit protector, process the collected data, and compile 226 the data and information relating to the state of fuses 162 in the panel 104 as interrogations are made and as replies are received, and the data and information is then stored 228 in the memory 194 of the reader device 180. Such data and information stored in the memory 194 may be downloaded, transmitted, or otherwise communicated 230 to the overview and response dispatch system 118 and/or the inventory management system 120 using the communication link 116. The data may be communicated 230 to the overview and response dispatch system on a periodic basis or as events of interest occur, including but not limited to overcurrent, overvoltage, and temperature overlimit conditions, and the method 220 does not require polling or interrogation from the reader devices to operate Utilizing the method 220, the overview and response dispatch system processes and stores the information and data for evaluation by a user for analysis, and the overview and response dispatch system may be programmed to alert a user when specified data is obtained according to the method 130. As such, and for example, a user may be alerted when one or more of the fuses 162 experiences voltages, currents, or temperatures that are not within normal or expected operating ranges, and the management system 112 may therefore provide some advanced warning of a potential problem that may cause one or more fuses 162 to operate and open circuitry to the loads 106. If possible, corrective action may then be taken to manage the electrical system 100 to avoid operation of fuses 162 and the resultant disconnection of the respective electrical loads 106. The method 220 may also identify improperly installed or malfunctioning fuses, and permit diagnosis and troubleshooting of the electrical system 100 apart from issues relating to the circuit protectors.

By virtue of the circuit protector management system 112, and according to any of the aforementioned exemplary methods 198, 210 and 220, any fuses 162 that are opened and require replacement may be identified, together with other data of interest regarding the fused electrical system 100. Improperly installed fuses, the presence or absence of fuses in the panel 104, or malfunctioning units or panels 104, may likewise be detected and diagnosed with appropriate programming of the transponder device 178, the reader device 180, and the overview and response dispatch system 118.

Data from the overview and response dispatch system 118 may likewise be transferred to the reader device 180, and the transmitted data may be used, for example, to match responses from selected transponder devices 178 with specific fuses 162 in the panel 104. Such data may be used to generate interrogatories to specific fuses 162 of a electrical system for diagnostic or troubleshooting purposes. In such an embodiment the transponder devices 178 of the fuses 162 may be programmed to ignore certain interrogatories and to respond to other interrogatories from the reader device 180. Further, the transponder device 178 of the fuses 162 may be programmed to respond differently as different interrogatories are made. For example, a transponder device 178 may send a very basic response to a basic interrogatory, or a detailed response including supporting data for a more advanced interrogation. Also, in such a system, the reader device 180 may be used to confirm the status of certain fuses 162 in the panel 104 with different interrogations and collecting certain information before notifying the overview and response dispatch system 118 of an operated fuse 162.

Having now described some exemplary embodiments of status element transponder and reader/interrogation elements interfacing with the overview and response dispatch system 118, programming of the system components to achieve desired outputs for monitoring the status of the fuses 162 and the associated electrical system 100 may be provided conventionally.

2. Transmitter and Transponder Monitoring Systems

Figure 9:
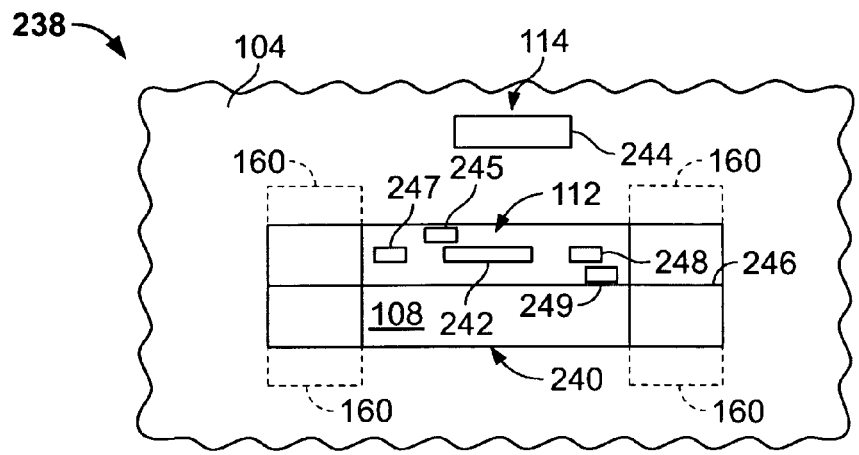
FIG. 9 is a schematic block diagram of a second embodiment of a circuit protector and panel for the circuit protector management system shown in FIG. 1.

FIG. 9 is a schematic block diagram of another type of status element and circuit protector monitoring assembly 238 that may be used in the circuit protector management system 112 and the method 130.

The assembly 238 includes a circuit protector 108 in the form of a fuse 240 and panel 104. The fuse 240 is similar to the fuse 162, but includes a status element 110 in the form of a transmitter 242, and a communications device 114 in the form of a transponder device 244 which receives signals from the transmitter 242 and transmits or otherwise communicates signals and data to the overview and response dispatch system 118. The transmitter 242 may be an active device and transmits data, including but not limited to voltage, current or temperature data, to the transponder 244 on a periodic basis. In turn, the transponder 244 communicates the data to the overview and response dispatch system 118 via any of the aforementioned communication technologies. Thus, the transmitter 242 of the fuse 240 is active and the transponder 244 is generally reactive in transmitting data to the overview and response dispatch system 118. When the primary fuse element 246 within the fuse 240 opens to break the circuit through the fuse 240, the transmitter 242 detects the operated fuse and opened circuit by any of the aforementioned sensing methods.

Once an operated fuse 240 is detected, the transmitter 242 sends a signal to the transponder 244. In turn, the transponder 244 signals the overview and response dispatch system 118 of the operated fuse, and the overview and response dispatch system 118 takes appropriate action to notify personnel and instruct personnel regarding the location of a replacement fuse, pinpoint the identity of the operated fuse, and order a replacement fuse. Global positioning technology may be employed to determine the precise location of operated and replacement fuses 240 and to avoid any uncertainty or confusion on behalf of personnel in locating the operated fuse or the replacement fuse.

In one embodiment, the transmitter 242 and transponder 244 are implemented as application specific integrated circuitry and communicate wirelessly with one another according to known RFID, infrared or other wireless transmission techniques and equivalents thereof. While wireless communication is believed to be advantageous to avoid point-to-point conductive paths between the transmitter 242 and responder 244, it is understood that in alternative embodiments, other known transmitting and receiving devices and methods may be employed. An onboard power supply, such a battery 245 may be employed in the transmitter 242 to send communications after the fuse 240 has operated, or alternatively, an energy storing component 247, such as a capacitor, may be employed in the fuse 240 to power communications within a short time after the fuse has operated. Still further, switching devices may be used to connect the transmitter 242 to an alternative power source such as a battery, backup power supply, or other circuit of the electrical system after the fuse 240 has operated and the circuit through the fuse 240 is broken to permit the transponder 244 to communicate with the overview and response dispatch system 118. A power harvest device, including rechargeable batteries and the like that store energy when not in use, may be also be utilized for the energy storage component 247 in addition to or in lieu of the battery 245.

It is contemplated, however, that in an alternative embodiment, an absence of a signal transmission from the transmitter 242 could be taken as an indication that the fuse 240 has opened and the transmitter 242 no longer has power, and the overview and response dispatch system 118 could respond appropriately without an active signal transmission that the fuse 240 has opened. Thus, for example, if no transmission was received from the transponder 244 within a given time frame, the transponder could signal the overview and response dispatch system that the associated fuse has opened.

In a further embodiment, a combustible fuse state indicator 248 and an optically activated indicating circuit 249 may be provided that senses an emission of light in the indicator 248 when the indicator 248 is ignited, combusted, and consumed. Once light is sensed when the combustion occurs, the light may be converted into an electrical signal that may be input to the transmitter 242 for wireless transmission to a remote location. A combustible fuse state indicator and optically activated indicating circuit are described in detail in commonly owned U.S. patent application Ser. No. 10/973,628, the disclosure of which is herein incorporated by reference.

It is understood that more than one transmitter 242 may communicate with one or more transponders 244 so that multiple circuit protectors can be monitored The transponders 244 may be integrated into the panel hardware or be separately provided components. Multiple transponders 244 may be employed in a single panel 104 depending on the number of fuses 240 in the panel 104 or the sophistication of the circuit protector management system 112.

3. IC Card Monitoring Systems

Figure 10:
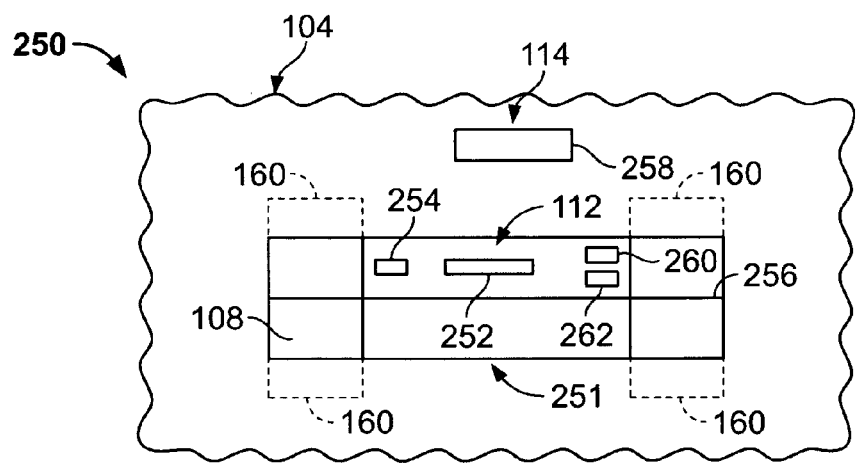
FIG. 10 is a schematic block diagram of a third embodiment of a circuit protector and panel for the circuit protector management system shown in FIG. 1.

FIG. 10 is a schematic block diagram of another type of status element and circuit protector monitoring assembly 250 that may be used in the circuit protector management system 112 and the method 130.

As shown in FIG. 10, the assembly 250 includes a circuit protector 108 in the form of a fuse 251 and panel 104 for the circuit protector management system 112 shown in FIG. 1 and the method 130 shown in FIG. 2. The fuse 251 is similar to the fuse 162 shown and described in relation to FIG. 3, but includes a status element 110 in the form of a smart card 252.

In an exemplary embodiment, the smart card 252 may be a thin film substrate device that contains an embedded integrated circuit (IC) having data transmission, storage and processing capability, and the card 252 is sometimes referred to as a chip card or IC card. In one embodiment, the smart card 252 is a microprocessor card or equivalent thereof and contains, for example, self-executable Java code sometimes referred to as Applets developed on a Java Card Applications Environment using the Java programming language. New code can be downloaded into the smart card 252 to change the circuit protection properties of the Applet and update or change the information on the card 252. Java Card technology specifications and development kits are available from Sun Micro Systems and the cards may be configured or adapted accordingly.

Circuit protection logic on the smart card 252 can be used to store information and add, delete, and manipulate information in its memory. The smart card 252 may be used in combination with a chip fuse 254 connected in parallel with the primary fuse element 256 of the fuse 251, and the smart card 252 is used to monitor the current and temperature of the chip fuse 254 to detect operation of the primary fuse element 256. When the primary fuse element 256 opens, current will be directed to the chip fuse 254 and cause a dramatic increase in current and heat experienced by the chip fuse 254. The increased current and/or increased heat attributable to the current may be sensed by the smart card 252 and a signal may be sent to the communications device 114, which may be a reader or reader terminal 258 connected to the card 252 to read data therefrom.

Communication to the reader 258 could be established wirelessly with an antenna structure 260 or transponder device 262 in communication with the smart card 252. Alternatively, a direct current path could be provided from the smart card 252 to the reader 258. More than one smart card 252 may communicate with the reader 258, and each of the smart cards 252 associated with a circuit protector may include the same or different modular programming scheme for data collection and response. As desired, the card 252 may include a contact interface which physically connects to the reader 258, or a contactless interface having an antenna structure embedded in the card for remote access to the card 252 without physical access.

Once the signal is received by the reader 258, the reader 258 transmits or otherwise communicates signals and data to the overview and response dispatch system 118 by any of the aforementioned methods. In turn, the overview and response dispatch system 118 takes appropriate action to notify personnel and instruct personnel regarding the location of a replacement fuse, pinpoint the identity of the operated fuse, and order a replacement fuse.

4. Mechanical Monitor Systems

Figure 11:
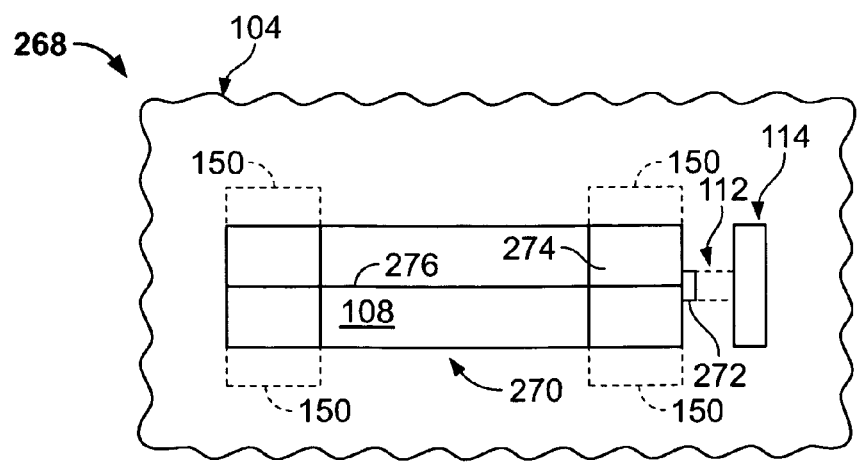
FIG. 11 is a schematic block diagram of a fourth embodiment of a circuit protector and panel for the circuit protector management system shown in FIG. 1.

FIG. 11 is a schematic block diagram of another type of status element and circuit protector monitoring assembly 268 that may be used in the circuit protector management system 112 and the method 130.

As shown in FIG. 11, the assembly 268 includes a circuit protector 108 and a panel 104. The circuit protector 108 is a fuse 270 that is similar to the fuse 162 shown and described in relation to FIG. 3, but includes a status element 110 in the form of a mechanical status element 272 which is movable from a first position when the fuse 270 is operational to a second position when the fuse 270 has operated to break the circuit. In the illustrated embodiment, the status element 272 is a spring loaded pin movable from a first position generally flush with the end cap 274 when the fuse is operative to a second position (shown in phantom in FIG. 11) projecting from the end cap 274 when the primary fuse element 276 opens to break the circuit through the fuse 270. Such mechanical indicators and their equivalents are known and not described in detail herein. When the pin 272 is moved to the second position (illustrated in phantom in FIG. 11) the pin 272 activates the communication device 114 to signal the overview and response dispatch system of an opened fuse.

Once the communications device 114 is activated, the communications device 114 transmits or otherwise communicates data to the overview and response dispatch system 118 by any of the aforementioned methods. In turn, the communications device 114 signals the overview and response dispatch system 118 of the operated fuse, and the overview and response dispatch system takes appropriate action to notify personnel and instruct personnel regarding the location of a replacement fuse, locate the operated fuse, and order a replacement fuse.

Additional components, including but not limited to proximity sensors and limit switches could be used in conjunction with the mechanical pin 272 or another mechanical indication feature, including spring loaded elements and electromagnetic elements, to trigger signals to the communications device 114 to indicate opened fuses. Additionally, optical systems and scanners could be employed to detect relative movement of the pin 272 or other mechanical feature of the fuse 270 as the fuse operates. Using these or other additional components, multiple fuses 270 could be employed with a single communications device 114 by inputting the sensors and switches to the communications device 114.

5. Monitoring Module Systems

Figure 12:
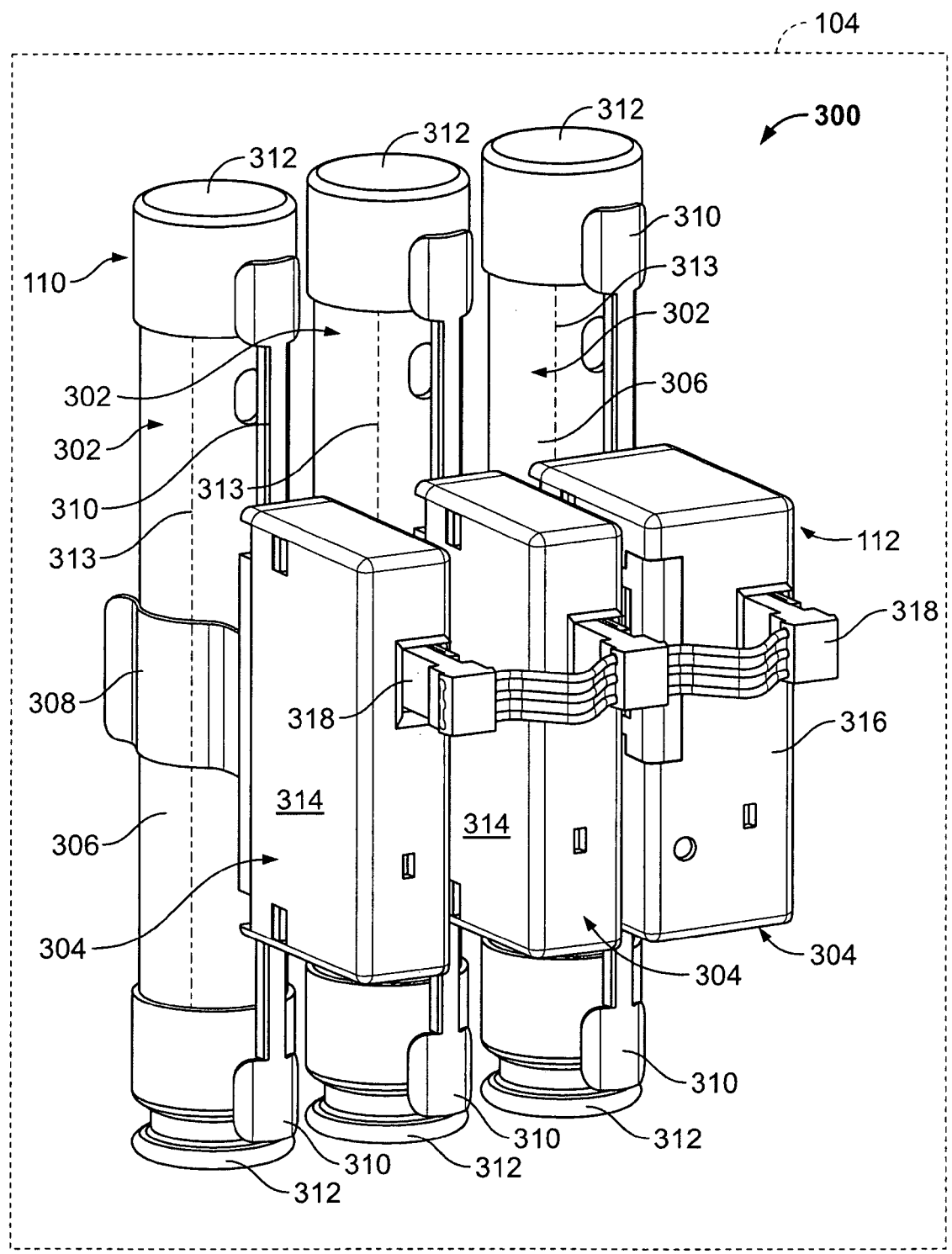
FIG. 12 is a perspective view of another embodiment of a circuit protector and panel assembly for the circuit protector management system shown in FIG. 1.

FIG. 12 is a perspective view of an exemplary circuit protector 108 and panel 104 that may be used in the circuit protector management system 112 and the method 130 wherein the status elements 110 are provided in the form of a monitoring module assembly 300. The monitoring module assembly 300 is associated with a plurality of circuit protectors in the form of fuses 302, and the assembly includes a plurality of monitoring modules 304 that are attached to the bodies 306 of the respective fuses 302. In an exemplary embodiment, the monitoring modules 304 are individually mounted to the fuse bodies 306 via a clip 308 to an exterior surface of the respective fuse bodies 306, thereby facilitating retrofit installation to the fuses 302 in an electrical system. As previously explained, the fuses 302 may be housed and arranged in the panel 104 in the electrical system to interconnect power supply circuitry 102 and various loads 106 in the electrical system.

The monitoring modules 304 may each include contact arms 310 extending outwardly from the modules 304 in a direction substantially parallel to the respective fuse body 306. The contact arms 310 of the respective modules 304 mechanically and electrically engage the terminal elements 312 of the fuses 302 so that the fuses 302 may be monitored in use. A primary fuse element 313 defines an interruptible current path between the terminal elements 312 of each of the fuses 302, and when the current path is opened or interrupted in an overcurrent condition, the modules 304 sense the operation of the fuses 302 in real time.

In an exemplary embodiment, the monitoring modules 304 include sensor modules 314 associated with some of the fuses 302 and a communications module 316 associated with one of the fuses 302. The sensor modules 314 and the communications module 316 may be interconnected to one another via interface plugs 318 and three wire connections, for example, as illustrated in FIG. 12.

Figure 13:
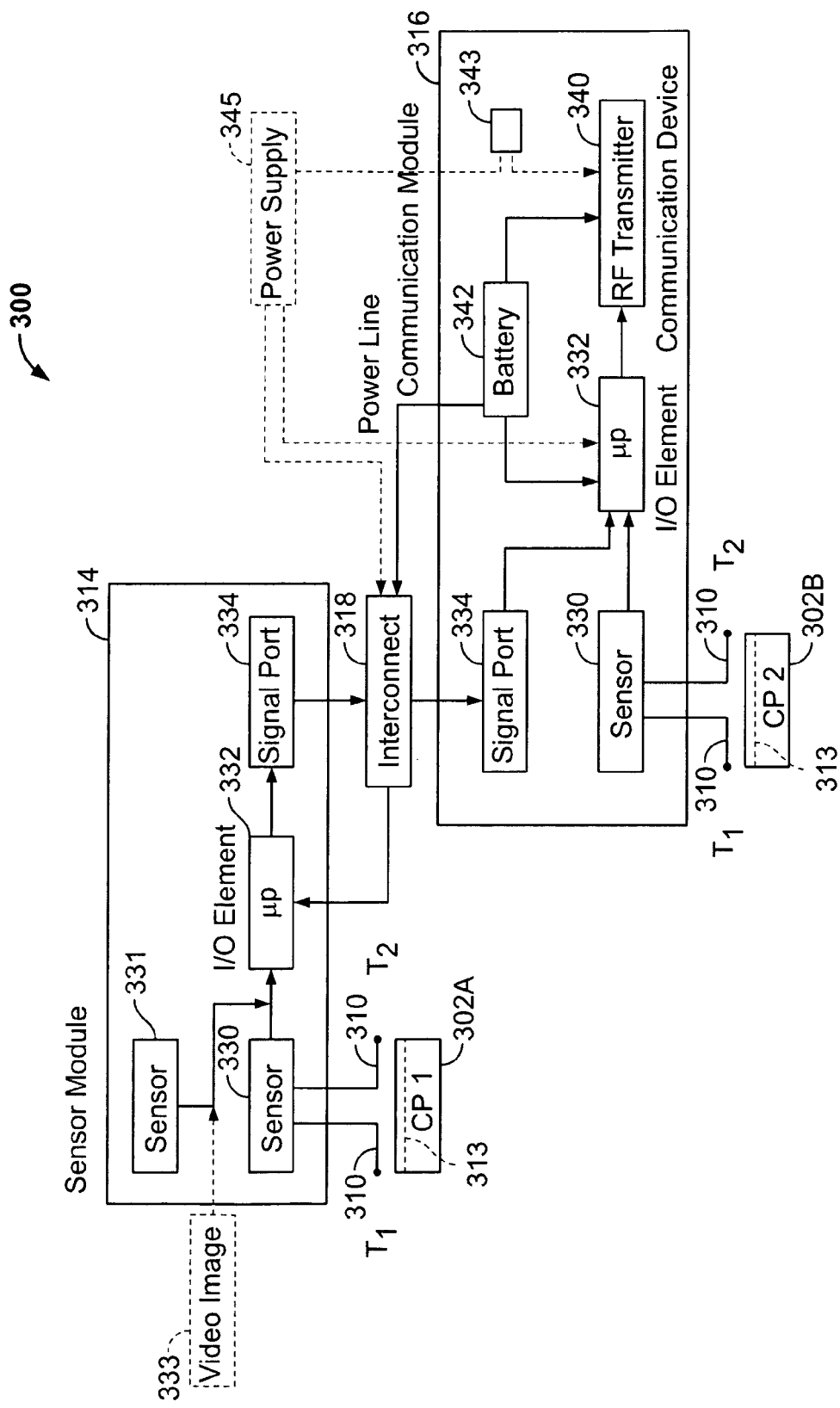
FIG. 13 is a schematic block diagram of the monitoring assembly shown in FIG. 12.

Referring now to FIG. 13, the construction of the sensor modules 314 and the communications module 316 will be described. Each sensor module 314 includes a sensor 330, an input/output element 332 connected to the sensor 330, and a signal port 334. The sensor 330 is connected to the contact arms 310 that are connected to the terminal elements $T_1$ and $T_2$ of one of the circuit protector fuses 302A. In one embodiment, the sensor 330 is a voltage sensing latch circuit having first and second portions optically isolated from one another. When the primary fuse element 313 of the fuse 302A opens to interrupt the current path through the fuse 302A, the sensor 330 detects the voltage drop across the terminal elements $T_1$ and $T_2$ of the fuse 302A. The voltage drop causes one of the circuit portions, for example, to latch high and provide an input signal to the input/output element 332. Acceptable sensing technology for the sensor 330 is available from, for example, SymCom, Inc. of Rapid City, S. Dak.

While in the exemplary embodiment, the sensor 330 is a voltage sensor, it is understood that other types of sensing could be used in alternative embodiments to monitor and sense an operating state of the circuit protector 302A, including but not limited to current temperatures and temperature sensors that could be used to determine whether the primary fuse element 313 has been interrupted in an overcurrent condition to isolate a portion of the associated electrical system.

In a further embodiment, one or more additional sensors or transducers 331 may be provided, internal or external to the sensor module 314, to collect data of interest with respect to the electrical system and the load connected to the fuse 302A. For example, sensors or transducers 331 may be adapted to monitor and sense vibration and displacement conditions, mechanical stress and strain conditions, acoustical emissions and noise conditions, thermal imagery and thermalography states, electrical resistance, pressure conditions, and humidity conditions in the vicinity of the A fuse 302A and connected loads. The sensors or transducers 331 may be coupled to the input/output device 332 as signal inputs. Video imaging and surveillance devices 333 may also be provided to supply video data and inputs to the input/output element 332.

In an exemplary embodiment, the input/output element 332 may be a microcontroller having a microprocessor or equivalent electronic package that receives the input signal from the sensor 330 when the fuse 302A has operated to interrupt the current path through the fuse 302A. The input/output element 332, in response to the input signal from the sensor, 330, generates a data packet in a predetermined message protocol and outputs the data packet to the signal port 334. The data packet may be formatted in any desirable protocol, but in an exemplary embodiment includes at least an identification code, a fault code, and a location or address code in the data packet so that the operated fuse may be readily identified and its status confirmed, together with its location in the electrical system. Of course, the data packet could contain other information and codes of interest, including but not limited to system test codes, data collection codes, security codes and the like that is desirable or advantageous in the communications protocol.

Additionally, signal inputs from the sensor or transducer 331 may be input the input/output element 332, and the input/output element 332 may generate a data packet in a predetermined message protocol and output the data packet to the signal port 334. The data packet may include, for example, codes relating to vibration and displacement conditions, mechanical stress and strain conditions, acoustical emissions and noise conditions, thermal imagery and thermalography states, electrical resistance, pressure conditions, and humidity conditions in the vicinity of the fuse 302A and connected loads. Video and imaging data, supplied by the imaging and surveillance devices 333 may also be provided in the data packet.

The communications module 316 in an exemplary embodiment may also include a sensor 330, an input/output element 332, and a signal port 334. Like the sensor module 314, the sensor 330 of the communications module 316 is connected to the contact arms 310 that are connected to the terminal elements $T_1$ and $T_2$ of one of the circuit protector fuse 302B, and the sensor 330 of the communications module 316 operates substantially in the same manner as described above to sense an operating state of a primary fuse element 313 in the fuse 302B. However, when the sensor 330 detects operation of the fuse 302B, the input/output element 332 generates and outputs a corresponding data packet to a transmitter 340 that communicates with the overview and response dispatch system 118. The transmitted data packet from the communications module 316, in addition to the data packet codes described above, also includes a unique transmitter identifier code so that the overview and response dispatch system may identify the particular communications module 316 that is sending a data packet.

In one embodiment, the transmitter 340 is a low power radio frequency (RF) signal transmitter that digitally transmits the data packet in a wireless manner. Point-to-point wiring in the electrical system for fuse monitoring systems is therefore avoided, although it is understood that point-to-point wiring could be utilized in some embodiments of the invention. Additionally, while a low power digital radio frequency transmitter has been specifically described, it is understood that any of the aforementioned wireless communication schemes and equivalents could alternatively be used if desired.

The communications module 316 further includes an on-board battery power supply 342 that powers the electronic sensor 330 and/or the input/output element 332 and the transmitter 340 of the communications module 316. The battery 342 may also supply power, through the interface plugs 318, to the input/output element 332 and/or the sensor 330 of the communications module 316. Thus, multiple sensor modules 314 may be powered by a single communications module 316 to monitor a plurality of fuses 302. For example, one of the three wire connections shown in FIG. 12 may be a power line connecting the battery 342 to one or more sensor modules 314. The battery 342 may be replaceable as needed to extend the life of the monitoring assembly 300, and a test button, for example, may be provided in the communications module 316 to ensure that the battery 342 is powered and the module electronics in the communications module 316 and connected sensor modules 314 are working properly. Reset buttons may also be provided in the modules for testing and diagnostic purposes. A power harvesting device 343, such as rechargeable batteries and the like that store energy when not in use may be utilized in addition to or in lieu of the battery 342. A backup power supply 345, or other circuits of the electrical system may also be used to power the sensor and communications modules 314, 316. Energy storage components such as capacitors may also be employed, and switching devices may be provided to switch between energy storage elements, power harvesting devices, batteries, and backup power supplies, or other circuitry to power communications after circuit protector 302A has operated.

Also, the signal port 334 of the sensor module 314 may communicate, via the interface plug 318 with the signal port 334 of the communications module 316. Thus, for example, considering the embodiment of FIG. 13, when the primary fuse element 313 opens in the fuse 302A associated with the sensor module 314, the sensor module input/output element 332 generates a data packet that is sent to the sensor module signal port 334 through the interface plug 318 and to the communications module input/output element 332 for transmission via the transmitter 340. Thus, signals are simply passed through the respective signal ports 334 via the interface plug 318, and multiple sensor modules 314 may be connected to a single communications module 316 via interconnecting the interface plugs 318 to the signal ports 334. In such a manner, the number of communication modules 316 and transmitters 340 in the circuit protector management system may be reduced, together with associated costs and maintenance issues.

Additionally, status indicators and the like such as light emitting diodes (LED's) may be provided in the sensor and communication modules 314, 316 to locally indicate an operated fuse 302. Thus, when maintenance personnel arrives at the location of the operated fuse 302, the status indicators may provide local state identification of the fuses associated with the modules 314, 316.

Notably, the monitoring modules 304, including the sensor modules 314 and communications modules 316 are provided in modular form wherein different sized mounting clips 308 and differently dimensioned contact arms 310 may be provided to accommodate fuses of varying sizes and configurations. By providing various mounting clips and mounting structure, together with various contact arms and contact structure to establish electrical contact with the fuses, the modules 304 are readily adaptable to accommodate most if, not all, types of fuses, and the modules 304 may be retrofitted to complex electrical systems with snap-on engagement, thereby minimizing installation time and complexity in existing electrical systems.

FIGS. 14 to 21 illustrate the adaptability of monitoring modules 304 to various types of circuit protectors and systems.

Figure 14:
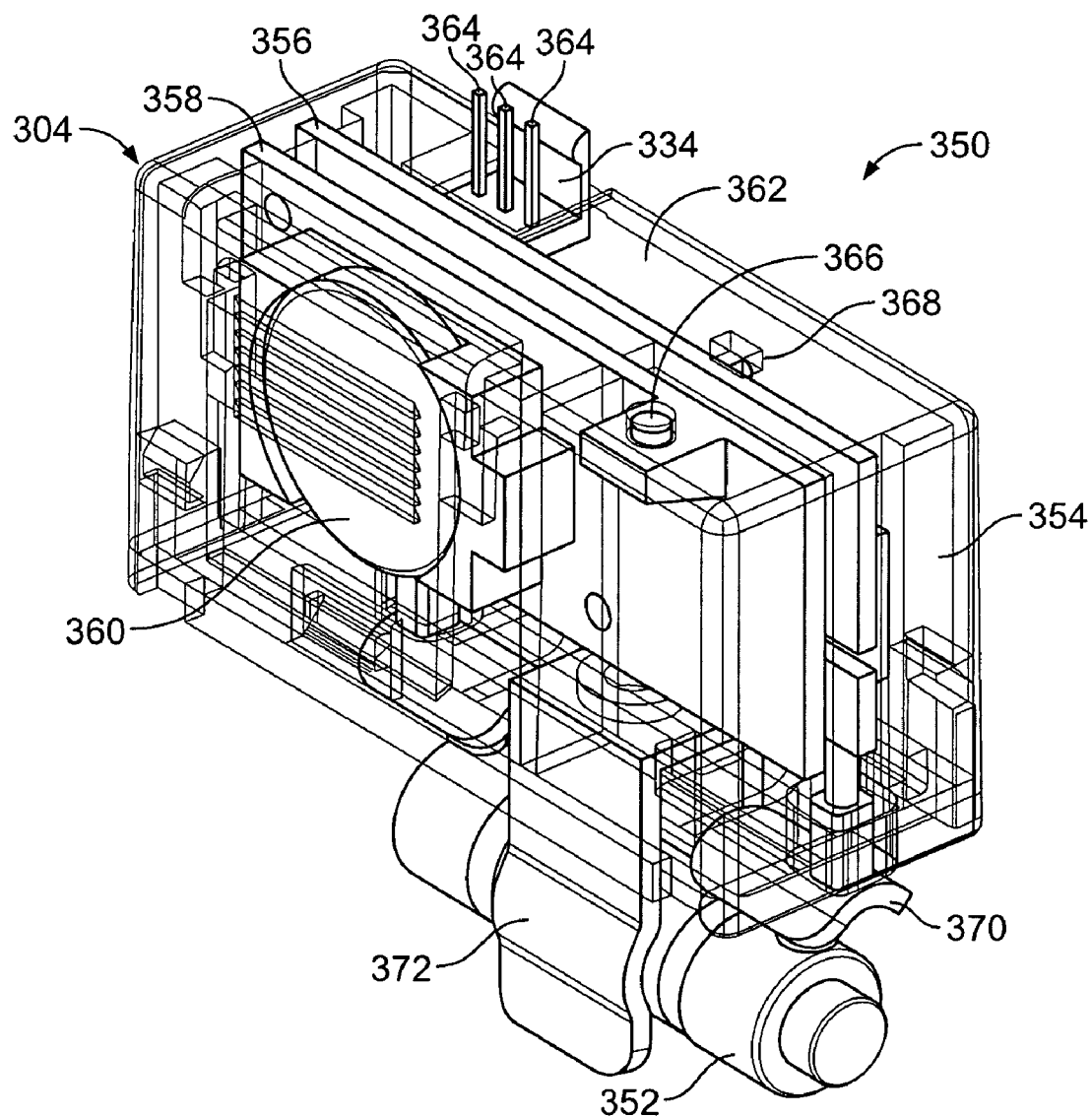
FIG. 14 is a perspective view showing internal parts of a module that may be used in the assembly of FIGS. 12 and 13.

FIG. 14, for example, illustrates a single phase monitoring assembly 350 including a monitoring module 304 and a circuit protector in the form of a fuse 352. The module 304 includes a body or housing 354, a sensor board 356, a communications board 358, and a battery 360 mounted therein and forming a protective enclosure thereabout. The sensor board 356 includes, for example, sensing circuitry 330 to detect operation of the fuse, such as the aforementioned voltage sensing, current sensing, or temperature sensing circuitry, and the communications board includes, for example, the input/output element 332 and the transmitter 340 for generating data messages and signals when the fuse 352 operates to open the circuit.

The signal port 334 is exposed through an outer surface 362 of the module 304, and in an exemplary embodiment, the signal port 334 includes contacts 364 that interface with, for example, mating interconnect plugs such as the plugs 318. The module 304 may therefore be connected to another monitoring module 304 in the larger electrical system.

With the communications board 358 and battery 360, the module 304 may function as the communications module 316 described above. Without the communications board 358 and battery 360, the module 304 may function as a sensor module 314 as described above. The communications board 358 may include a low power radio frequency transmitter as described above, or may alternatively communicate with a remote device by any of the aforementioned methods.

A test/reset button 366 extends through the outer surface 362 of the housing 354, and a status indicator opening 368 is provided in the outer surface 362. A light emitting diode (LED), for example, may be connected to the sensor board 356 and may be illuminated when the fuse 352 opens to isolate a portion of electrical circuitry connected thereto, thereby providing visible local indication in the housing 354. Contact arms 370 are attached to the housing 354 and are electrically connected to the sensor board 356 for monitoring of the fuse 352 when the contact arms 370 are mechanically engaged to the terminal elements of the fuse 352.

A mounting element 372 attaches to the exterior surface of the fuse body, thereby permitting retrofit installation to the fuse 352 when the fuse 352 is installed in an electrical system.

Figure 15:
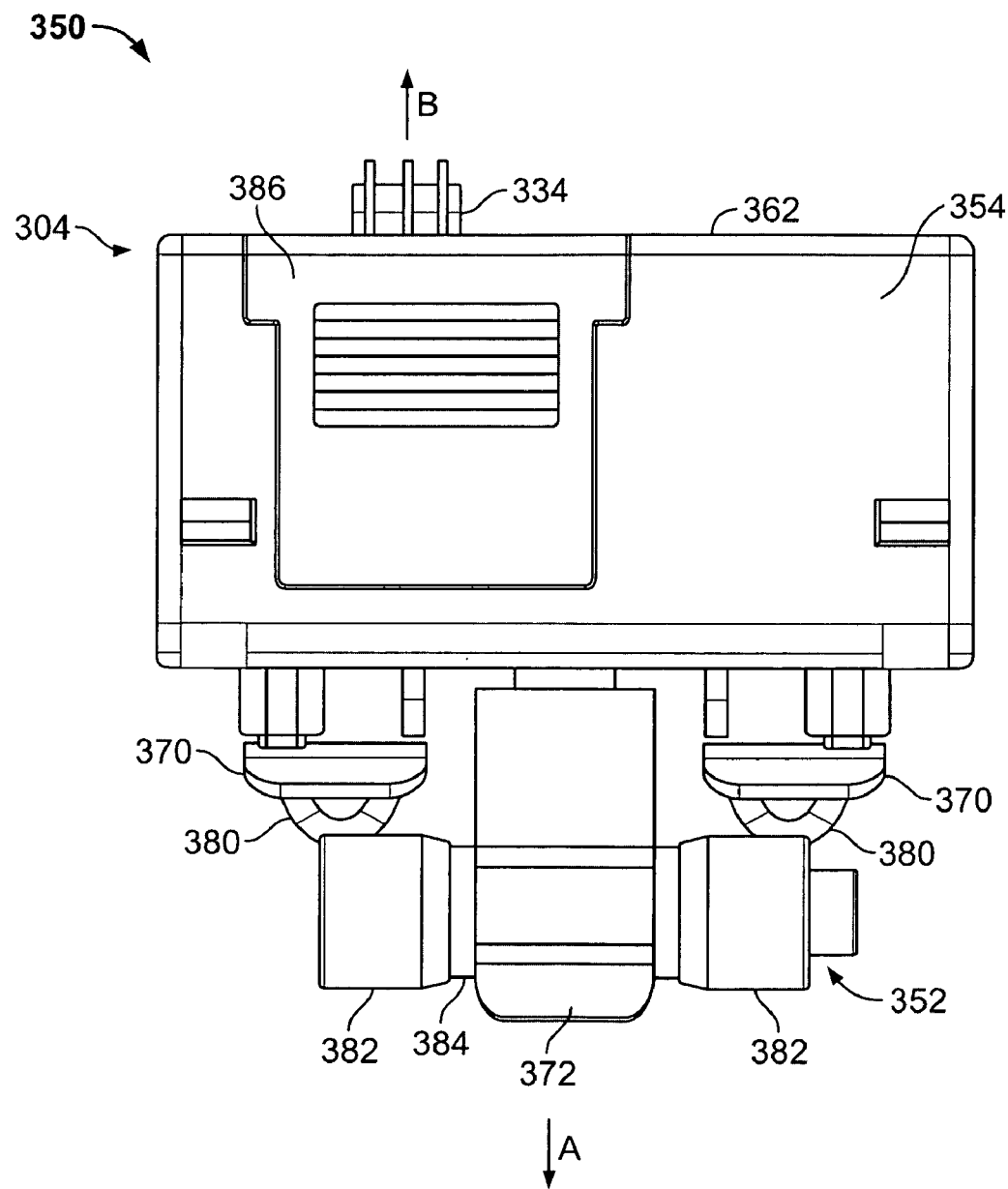
FIG. 15 is a side elevational view of the monitoring assembly shown in FIG. 14.

FIG. 15 is a side elevational view of the monitoring module 304 illustrating the contact arms 370 depending from the housing 354 toward the fuse 352, and resilient contact elements or extensions 380 engaging the respective terminal elements 382 of the fuse 352. The contact arms 370 may extend inwardly and toward one another to accommodate a relatively small fuse 352 in relation to the module 304.

As the mounting element 372 is installed in the direction of arrow A, it snaps over the exterior surface of the fuse body 384 and resiliently secures the module 304 to the fuse 352. The contact elements 380 are compressed or deflected as they engage the fuse terminal elements 382 when the module 304 is installed, and the deflection or compression of the terminal elements 382 provides a normal contact force or bias force against the fuse terminal elements 682 in the direction of arrow A. Mechanical and electrical engagement of the module 304 and the fuse terminal elements 382 is therefore ensured. The contact elements 380 are electrically connected to the sensor board 356 for monitoring of the operation state of the fuse 352.

A removable battery door 386 may be mounted to one side of the housing 354 and may be removable, for example, in the direction of arrow B to provide access to the battery 360 for inspection and replacement within the module 304. The signal port 334 extends from and is exposed through the outer surface 362 of the module housing 354 that, in use, may define a front face of the module 304. Locating the signal port 334 in a front face of the module 304 that opposes the fuse 352 provides unobstructed access to the signal port 334 for ease of interconnection to other modules via interface plugs 318 as described above.

Figure 16:
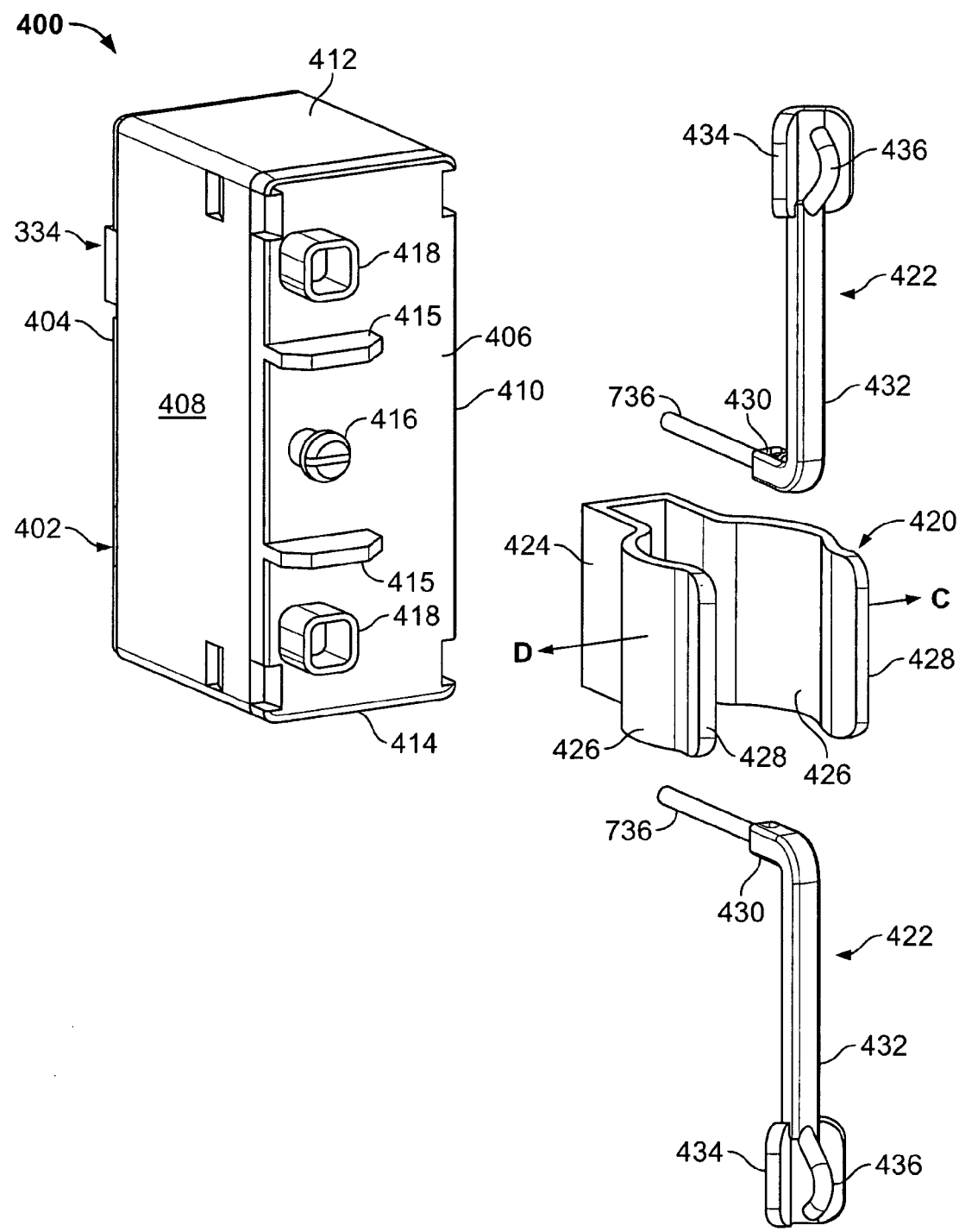
FIG. 16 is a bottom exploded view of a circuit protector monitoring assembly kit that may be used in the assembly of FIGS. 12 and 13.

FIG. 16 is a bottom exploded view of a circuit protector monitoring assembly kit 400 that may be used to configure modules the modules 304 for varying types of circuit protectors. The kit 400 may be assembled into a monitoring module 304 that may be a sensor module 314 or a monitoring module 316.

The kit 400 includes a housing 402 that may formed into a generally rectangular shape including a top surface 404, a bottom surface 406, opposing side walls 408 and 410, and opposing end walls 412, 414 forming a box-like structure that houses, for example, the above described sensing circuitry, communications transmitter, and battery power supply. The housing 402 may be assembled with a snap-fit engagement without tools in one embodiment. While a generally rectangular shape is illustrated in an exemplary embodiment, it is recognized that other shapes and configurations of housings could be used in alternative embodiments.

The bottom surface 406 may include mounting shoulders 415, a retaining flange 416, and contact arm receptacles 418. A mounting element 420 is attachable to the retaining flange 416, and contact arms 422 are attachable to the contact receptacles 418.

The mounting element 420, in one embodiment, may include a U-shaped base 424, and resilient arms 426 extending from the base 424 and having a curvature selected to inter-fit with an outer surface of a fuse body. Outwardly tapered edges 428 are provided on distal ends of the arms 426 to separate the arms 426 away from one another in the direction of arrows C and D as the mounting element 420 is installed over an exterior surface of the fuse with, for example, clip-on or snap-fit engagement. A retaining aperture is formed in the base 424, and when the base 424 is inserted over the housing retaining flange 416 and positioned between the housing mounting shoulders 415, the retaining aperture is aligned with the retaining flange 416. By pressing the base 424 against the housing 402, the retaining flange 416 may be resiliently deflected and forced through the retaining aperture in the base 424. When the flange 416 returns to its original position, the flange 416 locks the base 424 to the bottom surface 406 of the housing 402, also with a snap-on or clip-on engagement.

In an exemplary embodiment, the contact arms 422 each include a connecting portion 430, an extension portion 432 and a shroud 434. A resilient contact element 436, such as a conductive wire element or equivalent, extends through the extension and connecting portions 430, 432 and is bent or curved beneath the shroud 434 of each extension. The connecting and extension portions 430, 432 may be formed of a nonconductive or insulative material, such as plastic, to prevent inadvertent contact with the elements 436 in use when the kit 400 is installed to an energized circuit protector. The connecting portions 430 and one end of the contact elements 436 may be inserted into the receptacles 418 in the housing bottom surface 406 and retained thereto with a snap-fit or clip-on engagement. The contact elements 436 are electrically connected to the sensor board, directly or indirectly, when the connecting portions 430 are received in the receptacles 418.

The kit 400 may therefore be assembled quickly by hand and without tools due to the snap-fit connections of the component parts, thereby providing a convenient and low cost monitoring assembly for circuit protectors. By providing various sizes, shapes and configurations of mounting elements 420 and various sizes, shapes and configurations of contact arms 422, the kit 400 may be assembled into various different configurations to accommodate different types of fuses.

Figure 17:
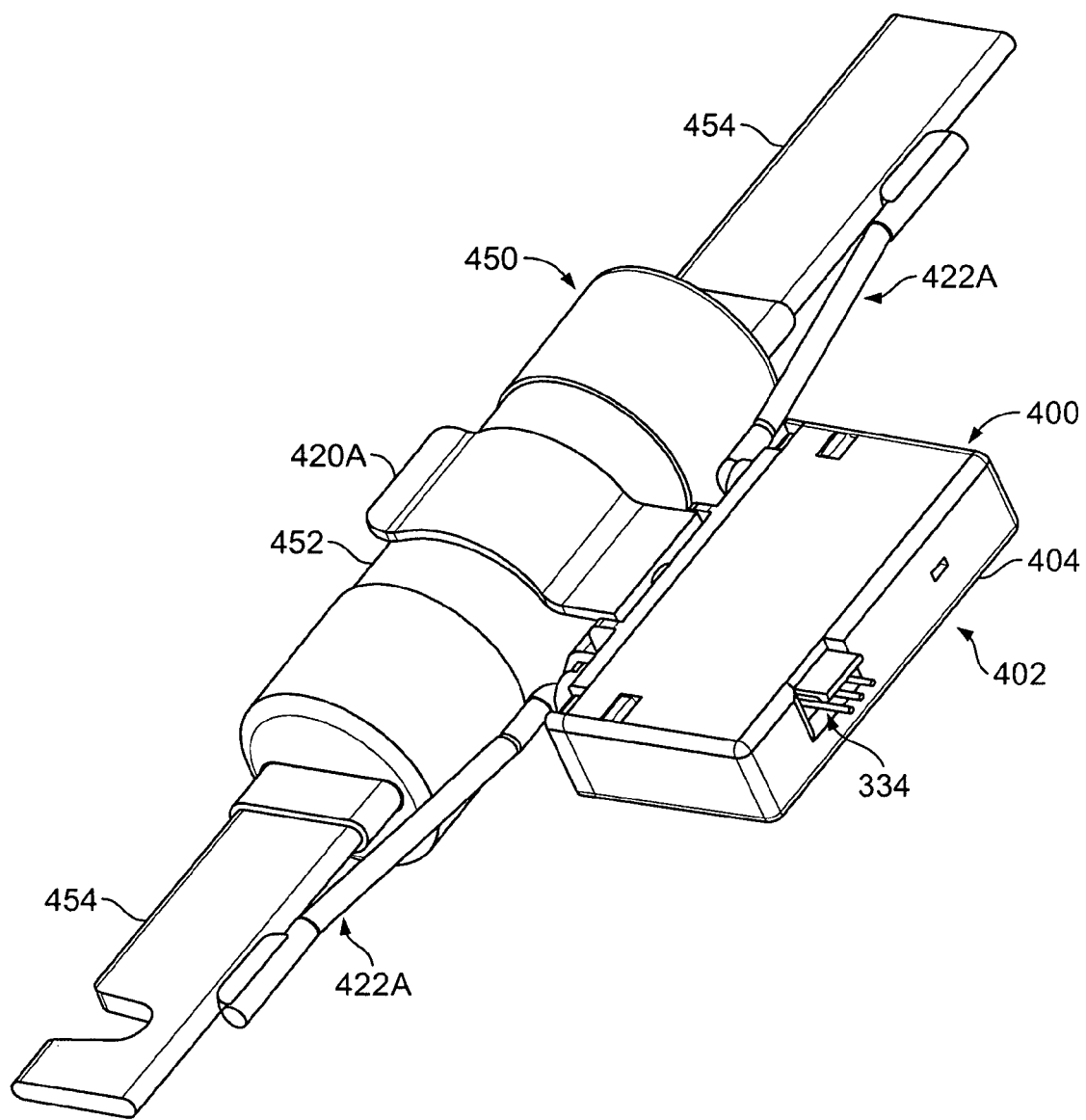
FIG. 17 illustrates a first version of the kit shown in FIG. 16.

For example, FIG. 17 illustrates one exemplary version of the kit 400 attached to a knife blade fuse 450. A mounting element 420A is provided to engage an exterior surface of the fuse body 452, and elongated contact arms 422A are provided to mechanically end electrically connect to the knife blades 454 of the fuse 450. The contact arms 422A are extended outwardly and away from the nodule housing 402 to reach the knife blades 454 at a distance from the module housing 402.

Figure 18:
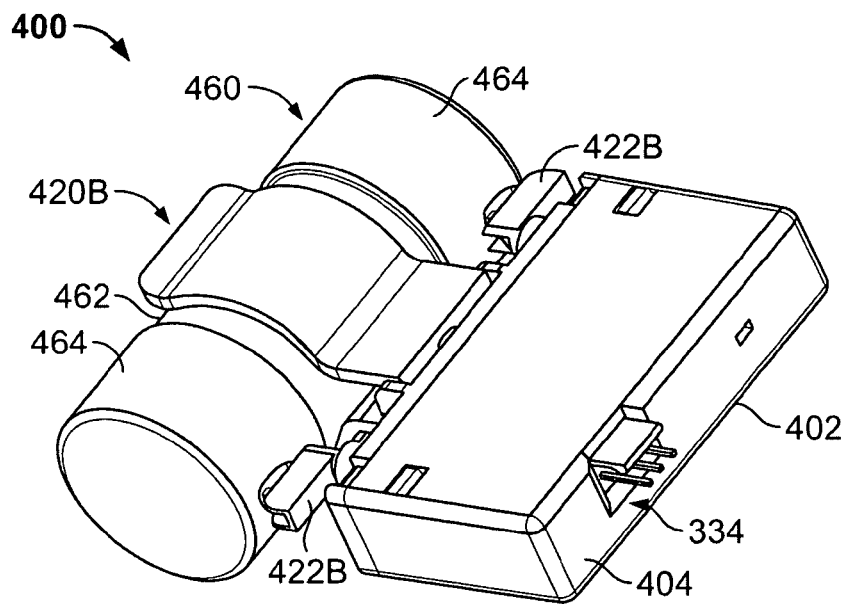
FIG. 18 illustrates a second version of the kit shown in FIG. 16.

FIG. 18 illustrates another exemplary version of the kit 400 attached to a fuse 460 having a greater diameter than the fuse 450 shown in FIG. 17, but having a reduced axial length compared to the fuse 450. A different mounting element 420B, dimensioned to inter-fit with the fuse body 462 of the fuse 460 is therefore employed with the housing 402, and different contact arms 422B are provided to mechanically and electrically connect to the terminal elements 464 of the fuse 460.

Thus, as demonstrated in FIGS. 14-18, by mixing and matching mounting elements 420 with contact arms 464 and attaching them to a universally usable housing 402, whether for a sensor module or a communications module, the kit 400 may easily assembled into many different configurations to engage and monitor fuses of many sizes and shapes. Once the kit 400 is assembled and installed to a fuse, the kit 400 may be interconnected via the signal ports 334 in the top surface 404 of the housing 402 in the manner described above.

Figure 19:
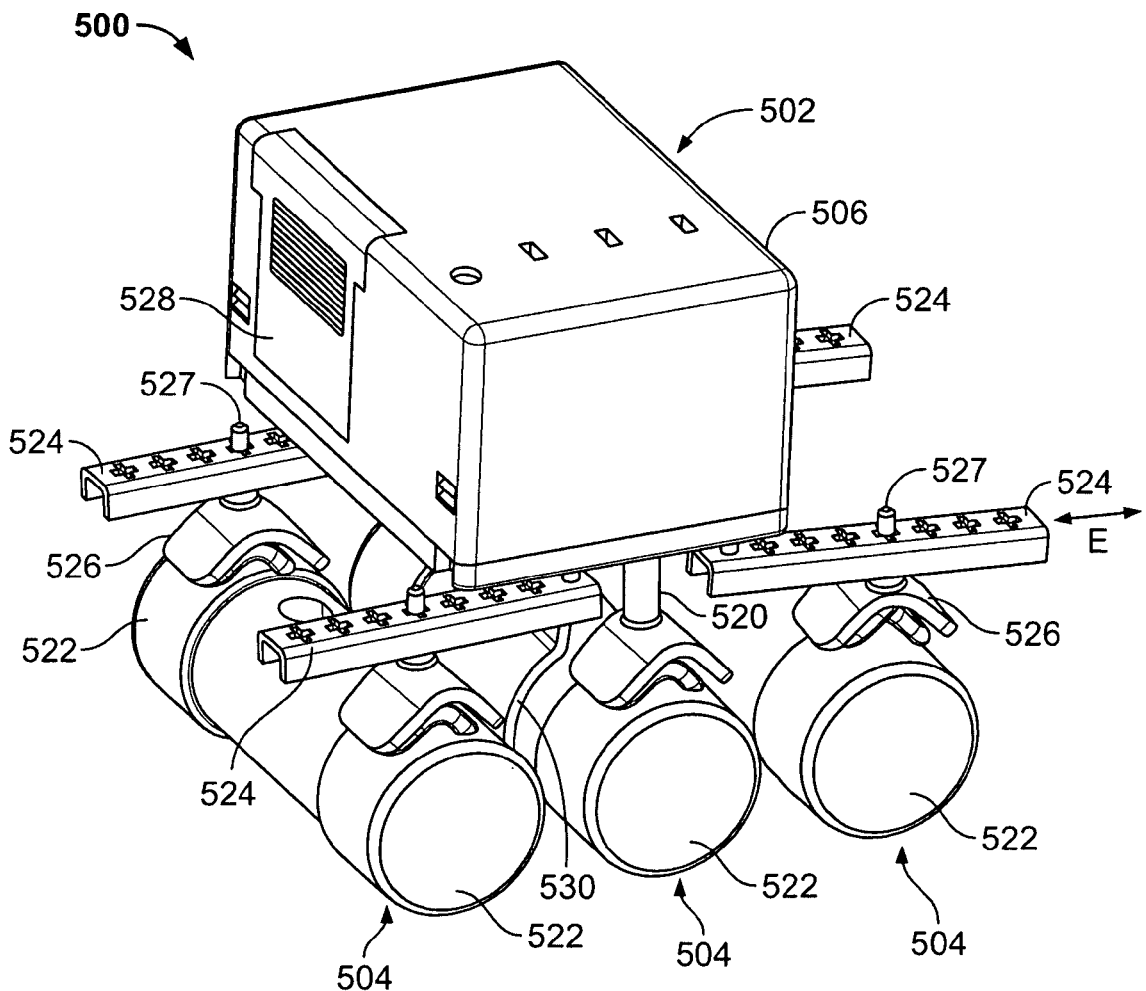
FIG. 19 is a perspective view of another embodiment of a circuit protector monitoring module that may be used in the circuit protector management system shown in FIG. 1.
Figure 20:
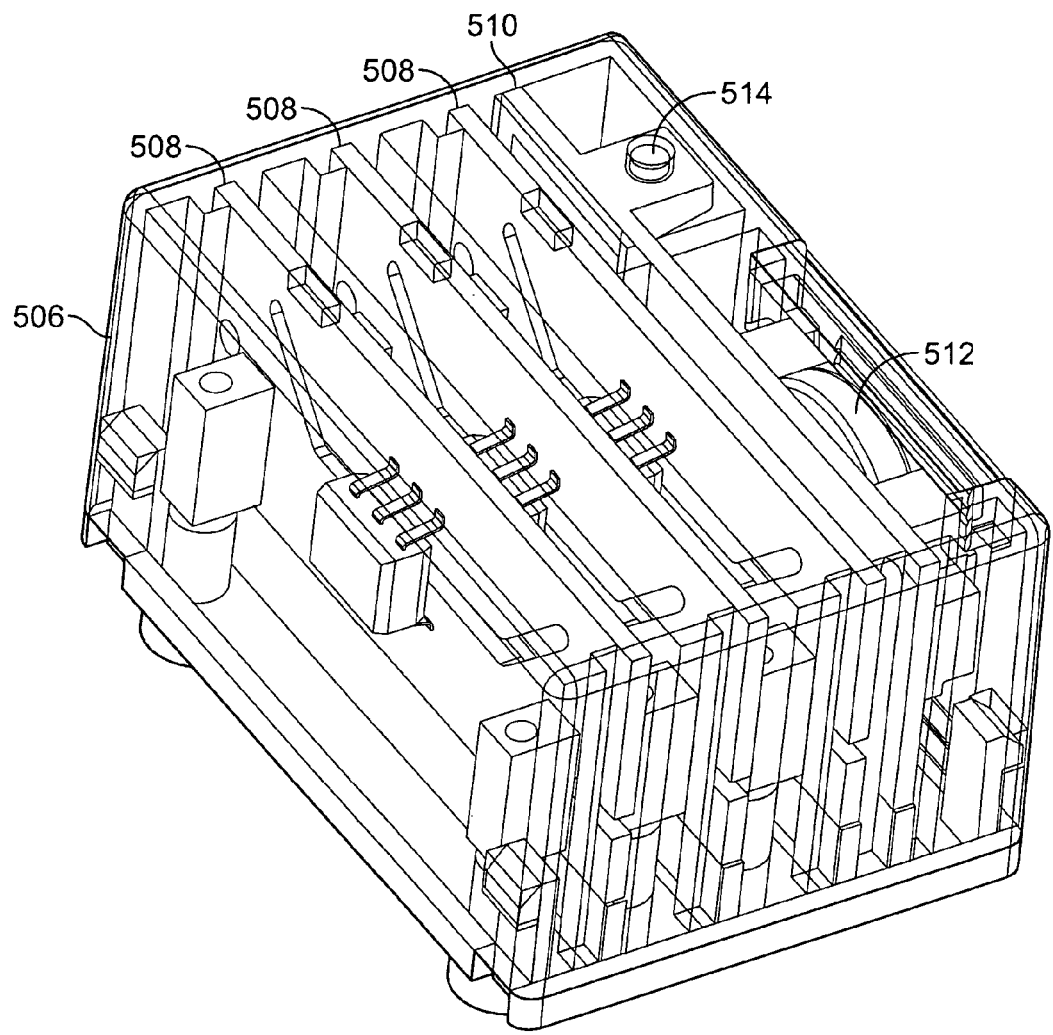
FIG. 20 is a perspective view showing internal parts of the module shown in FIG. 19.

FIGS. 19 and 20 illustrate another embodiment of a circuit protector monitoring assembly 500 that may be used in the circuit protector management system 112 shown in FIG. 1 and the method 130 shown in FIG. 2. The assembly 500 includes a monitoring module 502 that is a three phase device interfacing with circuit protector fuses 504 each corresponding to one phase of a three phase electrical power system.

The module 502 may include a protective housing 506, a plurality of sensor boards 508 in the housing 506, and a communications board 510 powered by an on-board power supply battery 512. As with the foregoing embodiments, the sensor boards 508 may include voltage sensing circuitry, current sensing circuitry, or temperature sensing circuitry to monitor each of the fuses 504, and the communications board 510 may include a low power radio frequency transmitter, or may communicate by other methods as described above. The sensor boards 508 are interconnected with one another and the radio communications board 510 so that, when any of the fuses 504 opens to interrupt one phase of current through the fuses 504, a signal is generated and sent to the communications board 510 for transmission to remote device, such as the overview and response dispatch system 118.

A test/reset button 514 may be provided on the communications board 510, and the sensor boards 508 may include LEDs or other local state indicators as desired to indicate the operating state of the fuses 504 associated with the three phases of electrical power.

The assembly 500 includes center contact arms 520 engaging the terminal elements 522 of one of the fuses 504, and side contact arms 524 engaging the terminal elements 522 of the other fuses 504. The side contact arms 524 may include a plurality of mounting apertures therein, and contact shrouds 526 are selectively postionable in the mounting apertures of the side contact arms 524 via locating pins 527. Thus, the position of the contact shrouds 526 on the contact arms 524 relative to the center contact arm 520 is adjustable in a direction of arrow E so that the assembly 500 may be used with fuses of greater or lesser diameter than the fuses 504, and having a greater or lesser spatial separation between centerlines of the fuses when installed in an electrical system.

A single mounting element 530 engages one of the fuses 504, with the contact arms 524 extending outward and away from the housing 506 to mechanically and electrically engage terminal elements 532 of the fuses 504 so that the sensor circuitry in the module 502 may monitor the operating state of the fuses 504. In an alternative embodiment, the mounting element 530 may engage more than one of the fuses to secure the assembly 500 to the fuses.

A removable battery door 528 may be provided on one side of the module 502 for access to the battery 512. The module 502 may be supplied in a kit form similar to the kit 400 described above with varying mounting elements 530 and contact arms 524 that may be assembled into different configurations for monitoring various types of fuses in three phase current applications.

Figure 21:
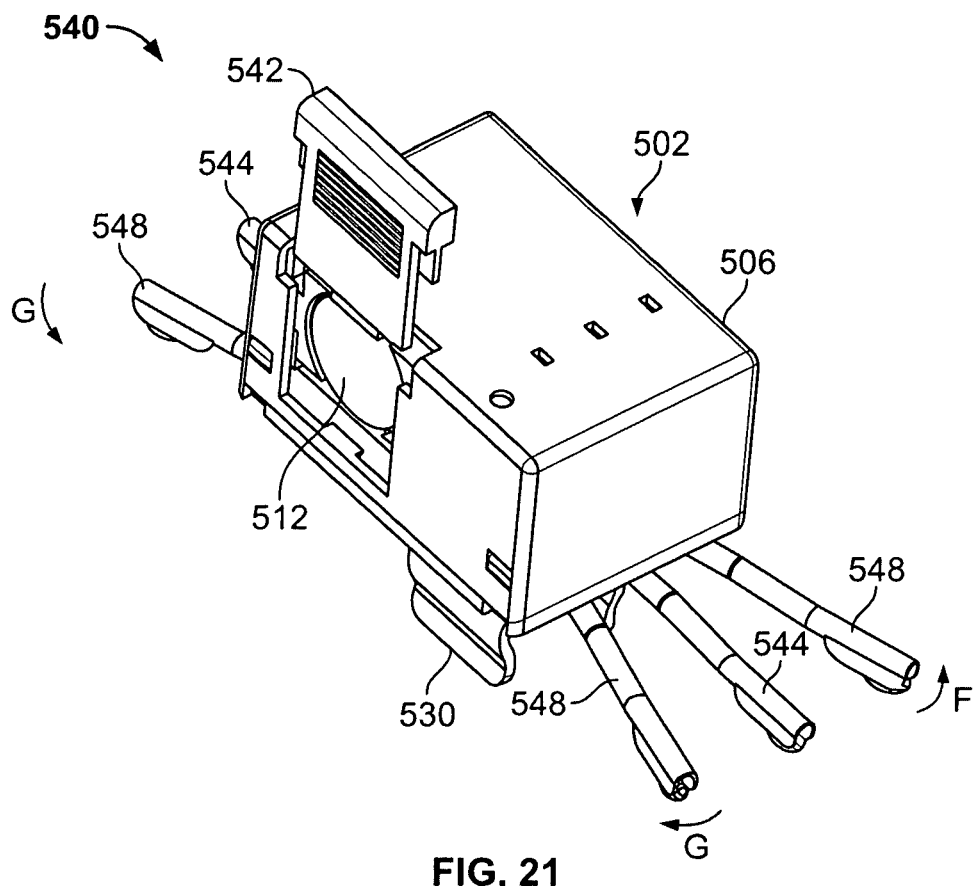
FIG. 21 is a perspective view of another embodiment of a circuit protector module that may be used in the circuit protector management system shown in FIG. 1.
Figure 22:
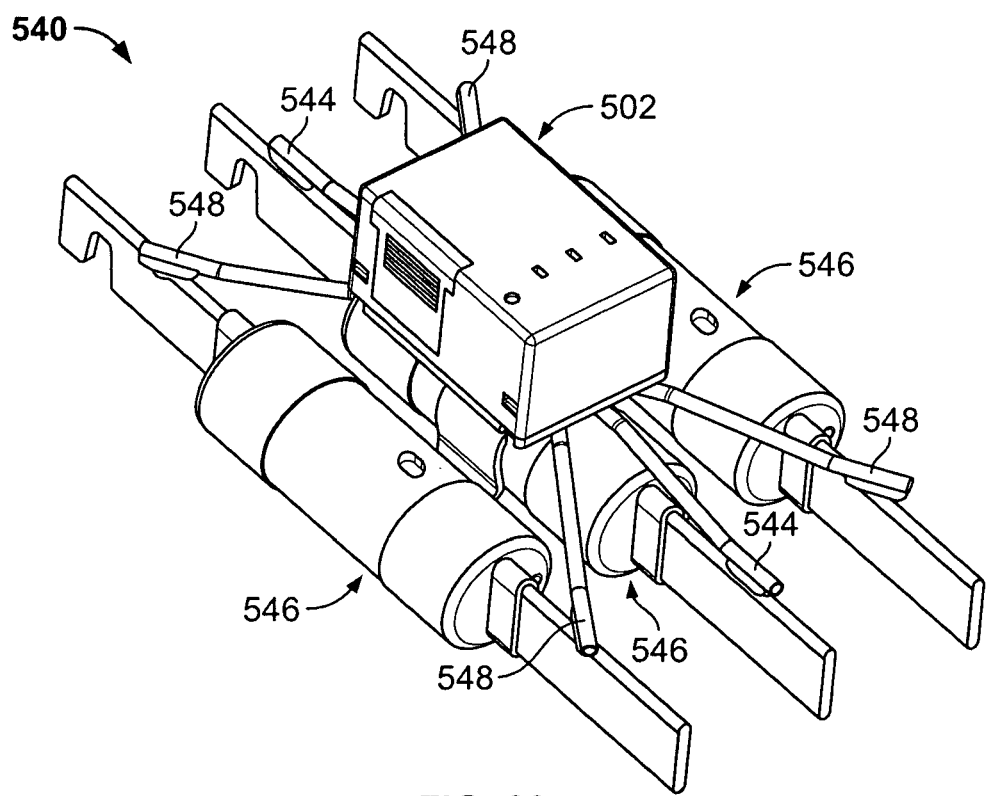
FIG. 22 is a perspective view of the module shown in FIG. 21 coupled to circuit protectors.

FIGS. 21 and 22 illustrate another embodiment of a circuit protector monitoring assembly 540 that may be used in the circuit protector management system 112 shown in FIG. 1 and the method 130 shown in FIG. 2. The assembly 540 includes the monitoring module 502, and a removable battery cover or door 542 providing access to the battery 512.

Unlike the assembly 500, the assembly 540 includes center contact arms 544 engaging the terminal elements of one of the fuses 546, and side contact arms 548 engaging the terminal elements the other fuses 546. The side contact arms 548 are pivotal or rotatable with respect to the module housing 506 in the direction of arrows F and G to adjust a separation of the contact arms 544, 548 relative to the module housing 506 and accommodate fuses of various diameters or outer dimension in a three phase application.

The assembly 540 may be provided in kit form having contact arms 544, 548 of varying lengths to mechanically and electrically engage terminal elements of a variety of sizes of fuses, and may be provided with various mounting elements 530 to engage the modules 502 to different fuse bodies.

Having described some exemplary embodiments of three phase monitoring modules and single phase monitoring modules, it is recognized that the three phase modules and single phase modules may be used in combination in a complex electrical system wherein circuit protectors are employed to isolate single phase and three phase electrical loads and power supplies from one another. The modular construction and assembly of the monitoring modules, mounting elements and contact arms permits wide application of the monitoring modules to existing electrical systems having fuses of various sizes, shapes and configurations. When used in a circuit protector management system 112 such as that described above to communicate signals to the overview and response dispatch system 118, the monitoring modules and monitoring assemblies provide an effective monitoring status and detection scheme for an electrical system having a variety of different types of circuit protectors.

A versatile, relatively low cost, expandable and adaptable circuit protector monitoring system is therefore provided that may be retrofitted to existing electrical systems without modifying the electrical system and infrastructure. It is understood, however, that in future equipment, or perhaps for smaller electrical systems, the monitoring, communications, and management components could be built-in to the electrical system and circuit protector products themselves.

6. Monitoring Assembly and System Combinations

The monitoring assemblies described above may be mixed and matched in the electrical system 100 as desired or as needed for a particular application. Thus, for example, circuit protectors in the electrical system that protect critical loads in the system may include more advanced status elements that operate as data collectors, while other circuit protectors in the system may be monitored with more basic, and lower cost status elements. Likewise, data collection may be required for some circuit protectors but not for others, and some of the electrical system may be retrofitted with monitoring modules while other parts of the system may include monitoring technology integrated into the system hardware and infrastructure.

Additionally, it is contemplated that the status elements of the above-described assemblies could be mixed and matched in different assemblies. For example, reader or interrogator elements could be employed in modular monitoring assemblies and engaged to circuit protectors with snap-on retrofit installation. As another example, smart card technology or mechanically actuated status elements could be incorporated into module monitoring assemblies.

Any of the foregoing embodiments of circuit protectors and status elements may be combined with other known fuse state indication features for user convenience. For example, the fuses may include combustible fuse state indicators, temperature responsive materials, and other known materials which visually indicate the state of the fuse as opened or unopened. Thus, by denoting a color change or other physical transformation in the appearance of a portion of the fuse, maintenance personnel may more easily identify operated fuses in an area identified by the overview and response dispatch system 118. In other words, visual fuse state identification features may provide confirmation of the fuse state identified by the overview and response dispatch system 118 when maintenance personnel arrive at the designated location.

Still further, while the foregoing embodiments of panels 104 and circuit protectors 108 are described in the context of fuses, similar technologies and methodologies could be employed with other types of circuit protectors such as, for example, circuit breakers and switches to detect operation of the devices to more efficiently locate and reset tripped breakers and opened switch paths, as well as to facilitate monitoring, diagnostics and troubleshooting of the electrical system.

D. The Signal Transmission System

Figure 23:
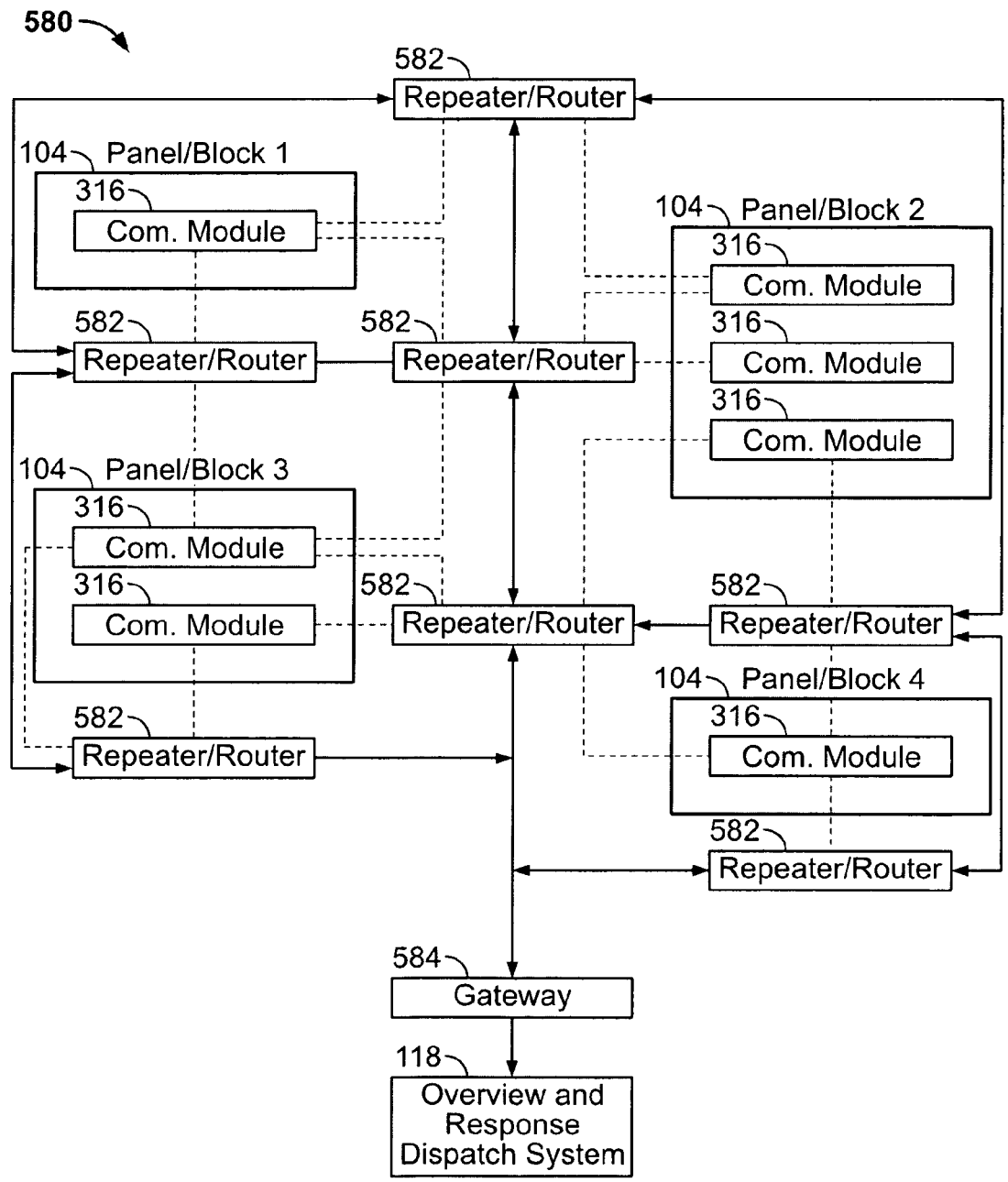
FIG. 23 is a schematic block diagram of a networked circuit protection signal transmission system that may be used in the circuit protector management system of FIG. 1.

FIG. 23 schematically illustrates an exemplary signal transmission system 580 for use with the circuit protector management system 112 shown in FIG. 1 and the method 130 shown in FIG. 2. A plurality of circuit protector panels 104 are distributed throughout the electrical system, and each circuit protector panel 104 in the electrical system that is to be monitored includes, for example, a monitoring assembly such as those described above for transmitting data signals corresponding to the operational state one or more circuit protectors, such as fuses, in the panels 104. In the manner described above, the communications module 316 generates a wireless data signal or data packet when one of the fuses associated with the monitoring assemblies opens. In an exemplary application, the monitoring assemblies include the communications modules 316 describe above.

The wireless data signals from the communications modules 316 may be received, for example, by one or more repeater/router elements 582 located within the transmission range of the communications module transmitter 340. In an exemplary embodiment, the repeater/router elements 582 may be wireless, radio frequency transmission devices or equivalent devices that receive, for example, a digitally transmitted RF data signal from the communications module 316 and forward the data signal to a signal collection and conditioning device, referred to herein as a gateway device 584. The gateway device is, in turn, in communication with the overview and response dispatch system 118. Alternatively, the repeater/router elements 582 may be another electronic device that functions to feed transmitted data from the communications module 316 to the gateway device 584. For example, USB, serial port connections or other connection means and their equivalents may be utilized to interconnect the repeater/router elements 582 and the gateway device 584.

In an exemplary embodiment, a plurality of repeater/router elements 582 are provided around and about the various panels 104, and the repeater/router elements 582 form a mesh network defining multiple signal paths to forward signal transmissions from the communication modules to a single gateway device 584 in communication with the overview and response dispatch system 118. Repeater/router elements 582 and mesh network configurations are commercially available from, for example, RF Monolithics, Inc. of Dallas, Tex. Many different mesh topologies are known and may be employed, including but not limited to star configurations, ring configurations, cloud configurations, linear configurations and the like. The mesh network may be algorithmically based and configured to meet specific needs for specific installations.

The network of repeater/router elements 582 in one embodiment is self-configuring and self healing with autorouting and rerouting capability as the network changes, and is highly scalable wherein thousands of circuit protectors may be monitored in the circuit protector management system 112. Considering that the various panels 104 may be located in different locations, and even in different buildings, the management system 112 is versatile and adaptable to existing electrical systems 100, and is accommodating to addition or subtraction of additional electrical loads and circuit protectors in the electrical system.

While a plurality of repeater/router elements 582 are illustrated in FIG. 23, it is understood that as few as one repeater/router element 582 could be provided in an alternative embodiment. Likewise, more than one gateway device 584 could be employed if desired.

The gateway device 584 may be a network based computer server system, a personal computer, a computer workstation, a programmable logic controller or other electronic controller, a processor-based hand held device or another electronic device or equivalent thereof that may receive, condition, process or interpret signals from repeater/router elements 582, and communicate the signals to the overview and response dispatch system 118 as explained further below.

Figure 24:
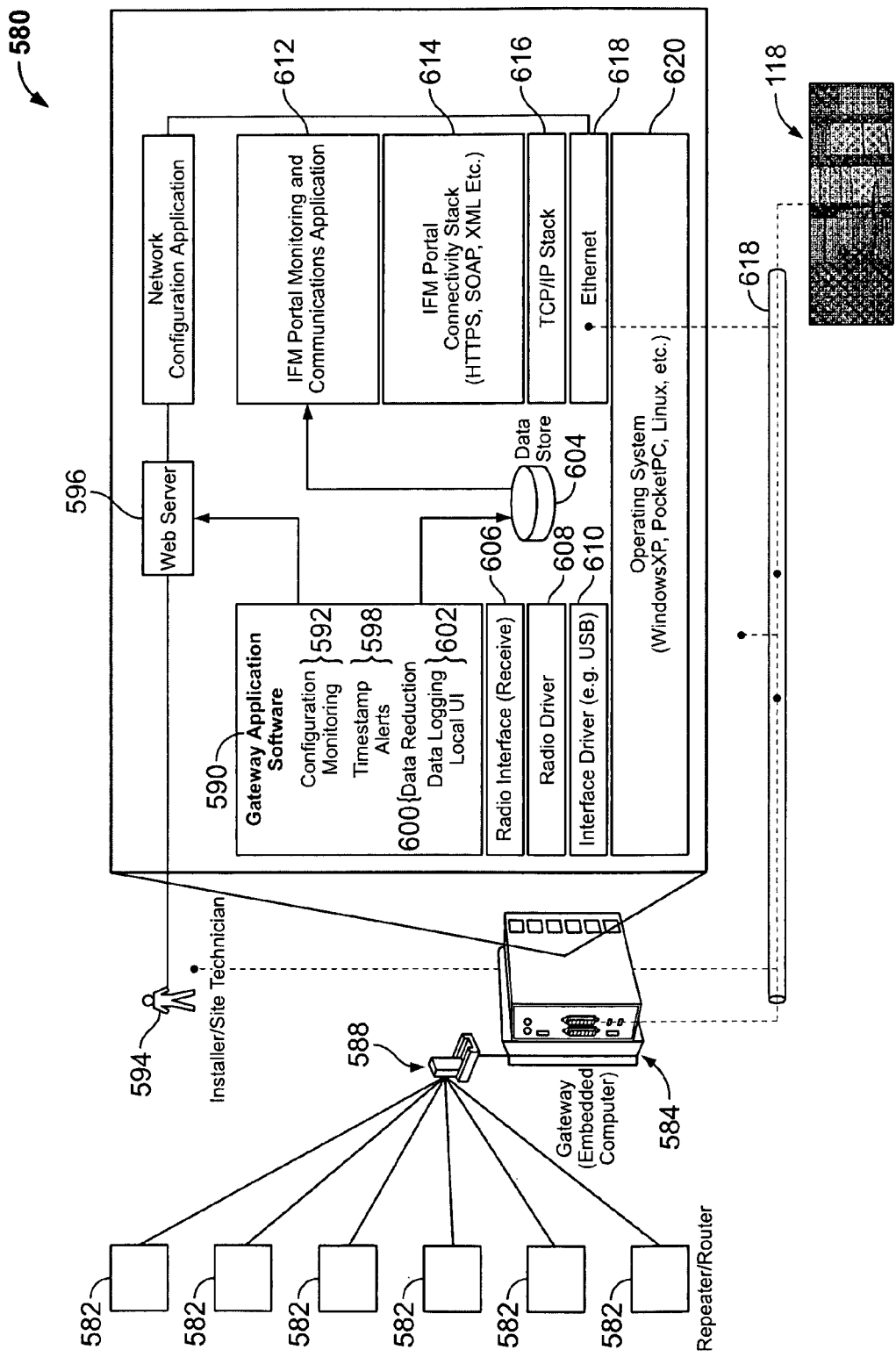
FIG. 24 schematically illustrates the signal transmission system shown in FIG. 23.

FIG. 24 schematically illustrates the signal transmission system 580 providing data communication between the repeater/router elements 582 and the overview and response dispatch system 118 via the gateway device 584.

As shown in FIG. 24, the gateway device 584 may be an embedded computer device including a receiver 588 for receiving, for example, wireless data transmission from the repeater/router elements 582 when one or more of the status elements, such as the monitoring modules 304 described above or any of the status elements described in relation to FIGS. 3-11 signal the repeater/router elements 582 of an operated circuit protector that has isolated portions of electrical circuitry in an electrical system. The receiver 588 may be a part of the gateway device 584 or may be separately provided and interfaced with the gateway device 584 to receive incoming signal transmissions from the repeater/router elements 582.

Data packets may be transmitted repeatedly from the circuit protector monitoring assemblies and/or the repeater/router elements 582 within specified time periods to ensure that the data packets are completely received, processed, and optionally acknowledged by a gateway device 584 and/or the overview and response dispatch system 118. Repeated transmission of data signals avoids collision of signals when more than one of the circuit protectors operates at approximately the same time. Also, the repeater/router elements 582 may add a routing code, a time stamp or other information to the data packet so that the overview and response dispatch system 118 may monitor the communication system and signal path between the monitoring modules and the overview and response dispatch system 118.

As shown in FIG. 24, the gateway device 584 includes gateway application software 590 for processing incoming data signals through the repeater/router elements 582. The gateway application software may be implemented on, for example a Linux, UNIX or Windows-based operating system and equivalents thereof as those in the art will appreciate.

The application software 590 may include, for example, configuration and monitoring algorithms 592 and interactive graphic user displays for assisting the monitoring assembly installers and system or site technicians 594 with setting up, testing and troubleshooting the communications between the status elements, the repeater/router elements 582 and the gateway device 584. The installers or technicians 594 may be logged on to the gateway device 584 at a remote location from the gateway device through, for example, a web server 596 connected to the gateway device 584, or installers or technicians may work directly with a local user interface associated with the gateway device 584 itself. More than one installer or technician could log on to the gateway device 584 for access to the application software 590 to supply and receive necessary information to install, maintain, or modify the configuration of the monitoring components and the signal transmission components associated with circuit protectors.

Using the configuration and monitoring algorithms 592 and interactive graphic user displays, status elements and repeater/router elements may be deemed, considered, determined or identified by the system according to an operating mode thereof. For example, applicable monitoring modes for the status elements may include a "registered" status wherein the status elements are authorized and compatible with the gateway device; a "discovered" status wherein the status element is installed but not activated to communicate with the management system; an "activated" status wherein the status elements are associated with a specific circuit protector and communicating with the management system; a "suspended" status wherein the status element has been caused not to function; a "deactivated" status wherein the element is uninstalled and not associated with any circuit protector; or an "offline" status wherein the status element is activated but not reporting to the management system 112. The signal transmission components, including but not limited to the repeater/router elements 582, may likewise be designated and identified by the management system.

Additional characterization, grouping, or labels of the status elements for the circuit protectors may be provided for informational purposes to provide an overview of the entire management system and status of the monitoring and signal transmission components as the system is expanded, contracted, or changed in use, and as more electrical loads or configuration of the electrical system are changed or adapted over time. The operating modes may be automatically detected by the gateway device 584, or may be manually entered by installers, technicians, and service personnel for the status elements. The gateway device 584 may therefore intelligently manage the addition or subtraction of circuit protector status elements and repeater/router elements 582 to and from the circuit protector management system 112.

Timestamp alert algorithms 598 and associated displays may also be included in the application software 590 for inspection and maintenance purposes wherein the communications systems between the status elements, the repeater/router elements 582 and the gateway device 584 are periodically verified to ensure operation of the monitoring and communication components in the circuit protector management system 112. As one example, the circuit protector status elements and/or the repeater/router elements 582 may be programmed to communicate or report with the gateway device 584 on a periodic basis or interval, sometimes referred to as a watchdog interval, and the gateway device 584, through the application software 590, could monitor the operating status or health of the management system by comparing signals received from the status elements and the repeater/router elements with information entered into the system, via the configuration and monitoring algorithms and displays 592, of the status elements and repeater/router elements known to be in the circuit protector management system 112. If, for example, one of the repeater/router elements 582 or one of the circuit protector status elements does not report in a predetermined time frame, an error flag may be set and alert may be generated to the installer/site technician 594, either directly from the gateway device 584 or indirectly through the overview and response dispatch system 118. The timestamp alert algorithms 598 and the configuration and monitoring algorithms 592 may then be accessed by site technicians 594 to diagnose and troubleshoot the circuit protector management system 112.

Data reduction algorithms 600 may be included in the application software 590 for processing signal transmissions from the repeater/router elements 582 before communicating with the overview and response dispatch system 118. For example, the gateway device 584 may filter incoming data signals and identify duplicate signal transmissions that may occur, for example, when more than one of the repeater/router elements 582 transmits the same signal to the gateway device, or as another example, when the same status element signals the repeater/router elements 582 more than once to avoid for example, collision of data signals. Duplicate signals may be discarded or deleted by the gateway device 584 prior to communicating signals to the overview and response dispatch system 118.

The data reduction algorithms 600 may also reduce or eliminate information from the data signals that are not necessary for the overview and response dispatch system 118 functionality. For example, messaging protocol information pertinent to the radio frequency transmission of the data signals but not pertinent to the network messaging protocol for communication with the overview and response dispatch system 118, may be stripped, eliminated, or deleted from the data signals before transmission to the overview and response dispatch system 118.

Data logging algorithms 602 and associated displays may also be included in the gateway application software 590 for supplying and receiving information and data and generating reports of management system activity. Such information and reports, as explained above, could be a useful tool for proactive management of an electrical system to identify issues in the electrical system that may cause operation of one or more circuit protectors to isolate portions of the circuitry, and perhaps allow for technicians 594 to take steps to control and manage the electrical system in a way that opening of the circuit protectors is avoided altogether, which is especially advantageous in critical applications, such an electrical system for a hospital.

The data logging algorithms 602 and displays could also be used to initiate special procedures responsive to real time operation of the electrical system, such as shutting down certain machines or portions of the circuitry at high risk when one or more of the circuit protectors operates. Such procedures may be particularly appropriate, for example, when one phase of a three phase electrical power supply becomes isolated or interrupted due to an operated circuit protector, and a machine or load is temporarily powered by only two phases of electrical current.

Each of the configuration and monitoring algorithms 592, the timestamp alert algorithms 598, the data reduction algorithms 600 and the data logging algorithms 602 are interconnected with a database 604 or memory storage medium needed to store inputted, collected, and received data, operating parameters and settings, and the machine readable operating software codes and algorithms, etc. that the gateway device 584 may require.

A communications interface 606, a communications driver 608, and interface drivers 610 may also be provided in the gateway application software 590 to provide communication between operative components in the circuit protector management system 112.

The gateway device 584 may also perform authentication, verification, or security algorithms to ensure the integrity of the management system communications, as well as perform diagnostic, testing, and troubleshooting procedures to ensure proper installation and operation of the circuit protector status elements and repeater/router elements 582 in the overall circuit protector management system 112.

In an exemplary embodiment, a portal monitoring and communications application 612 may be provided for further processing of data signals to convey information to the overview and response dispatch system 118. The communications application 612 may include protocol algorithms 614 to convert message data from the incoming radio frequency data transmission protocol, for example, to a preferred network messaging protocol, including but not limited to HTTPS, SOAP, and XML protocols and their equivalents known in the art, and internet protocol algorithms 616 for transmitting the network messaging protocol data packets to the remote overview and response dispatch system 118 via, for example, an Ethernet connection 618.

In an exemplary embodiment, the incoming radio frequency data protocol is a byte oriented protocol having multiple bits representative of information of interest. For example, the status elements may transmit digital data signals including bits corresponding to a unique radio identifier, a manufacturer serial number for the status element, a device type code for the circuit protector, a location or address code for the circuit protector, a power/control code, an equipment identification code, and state parameter codes such as testing codes, faults codes, and codes pertaining to operating conditions of the circuit protector and/or circuitry associated with the status elements. The data signals may also include codes relating to the ambient environment of the circuit protector or the associated electrical system and loads, such as temperature codes, vibration codes, displacement codes, mechanical stress codes, mechanical strain codes, acoustical emission codes, noise codes, thermal imagery codes, electrical resistance codes, pressure codes, humidity codes and video surveillance codes.

The repeater/router elements 582 may add bits to the signal protocol corresponding to a serial number of the respective repeater/router element, a device type code for the repeater/router, a wireless address for the repeater/router, a data packet sequence number, a location code for the repeater/router, and state parameters pertaining to operating conditions of the repeater/router elements.

The gateway device 584 converts the radio frequency transmission protocol to a second, and different messaging protocol for transmission to the overview and response dispatch system 118. The second message protocol may also be byte oriented and include bits corresponding to the unique radio identifier, a serial number of an operated circuit protector, a device type code for the operated circuit protector, a location code for the operated circuit protector, a wireless address, an IP address for the gateway device, a time/date stamp, a software revision code for the gateway application software and/or the communications application loaded on the gateway device, a hardware revision code for the gateway device, a packet count, an error count, and a predetermined number of error codes. When received by the overview and response dispatch system 118, the gateway data message can be used to quickly determine operation of the circuit protectors, locate operated circuit protectors in the electrical system, and notify and summon responsible personnel and technicians for quickly re-energizing downed circuitry. Furthermore, all of the codes and data relating to signal events in the system are logged for future use, retrieval, study and analysis to evaluate the performance of the overall circuit protector management system 112.

While some exemplary message codes have been described, it is understood that other types of codes, information and data representative of circuit protector products and operating status may be included in alternative embodiments, and it is also recognized that less than all of the exemplary protocol bits and codes could be used in other embodiments of the signal transmission system 580. Implementation of the message protocols may be conventionally provided and is not specifically described in further detail herein.

The gateway application software 590 and the communications application 612 may run on a known operating system 620 loaded on the gateway device 584, including but not limited to Windows, PocketPC, and Linux operating systems and their equivalents known in the industry. Having now described the various operating algorithms functionally, programming of the modules to operate in the manner described may be conventionally provided by those in the programming arts without further explanation.

In an exemplary installation, the gateway device 584 may be located at the electrical system site, and the overview and response dispatch system 118 may be located remotely, although the overview and response dispatch system 118 could be located at the site of the electrical system as well.

Figure 25:
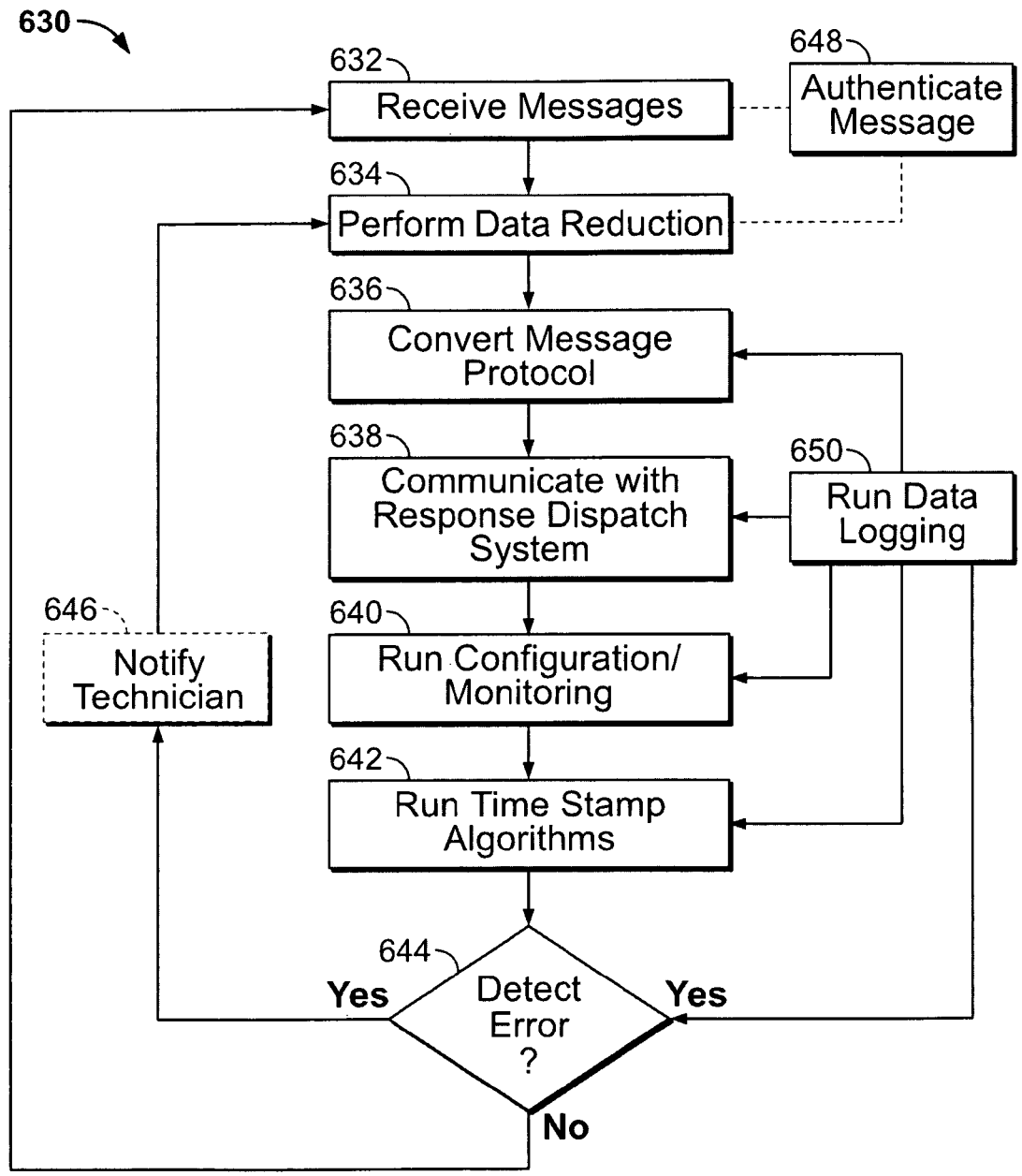
FIG. 25 is a method flowchart for the system shown in FIGS. 23 and 24.

FIG. 25 is a flowchart of a method 630 executable by the gateway device 584 in an exemplary embodiment. The gateway device 584 awaits signals from the repeater/router elements, and receives the signals 632 in any manner described above. Data reduction is performed 634 on the incoming signals in the manner described above, and the incoming message protocol is converted 636 to a second message protocol, different from the incoming message protocol. Once the message protocol is converted 636, the gateway device communicates 638 the converted data message to the remote overview and response dispatch system 118 for action or attention in the manner described above.

As appropriate or as needed, the gateway device runs 640 the configuration and monitoring algorithms and runs 642 the timestamp algorithms as described above. If an error is detected 644, the gateway device may notify 646 a technician and perform data reduction procedures 634 to prepare to send an error signal to the overview and response dispatch system. If an error is not detected 644 during the time stamp algorithms and procedures, the gateway devices reverts to a dwell state until another message is received 632 from the repeater/router elements.

Optionally, incoming messages may be authenticated 648 or other verification and security algorithms and procedures may be implemented to ensure the integrity of the system communications. Data logging procedures are run 650 as needed during operation of the gateway device 584, and data may be accessible by or be communicated to the remote overview and response dispatch system as desired.

Figure 26:
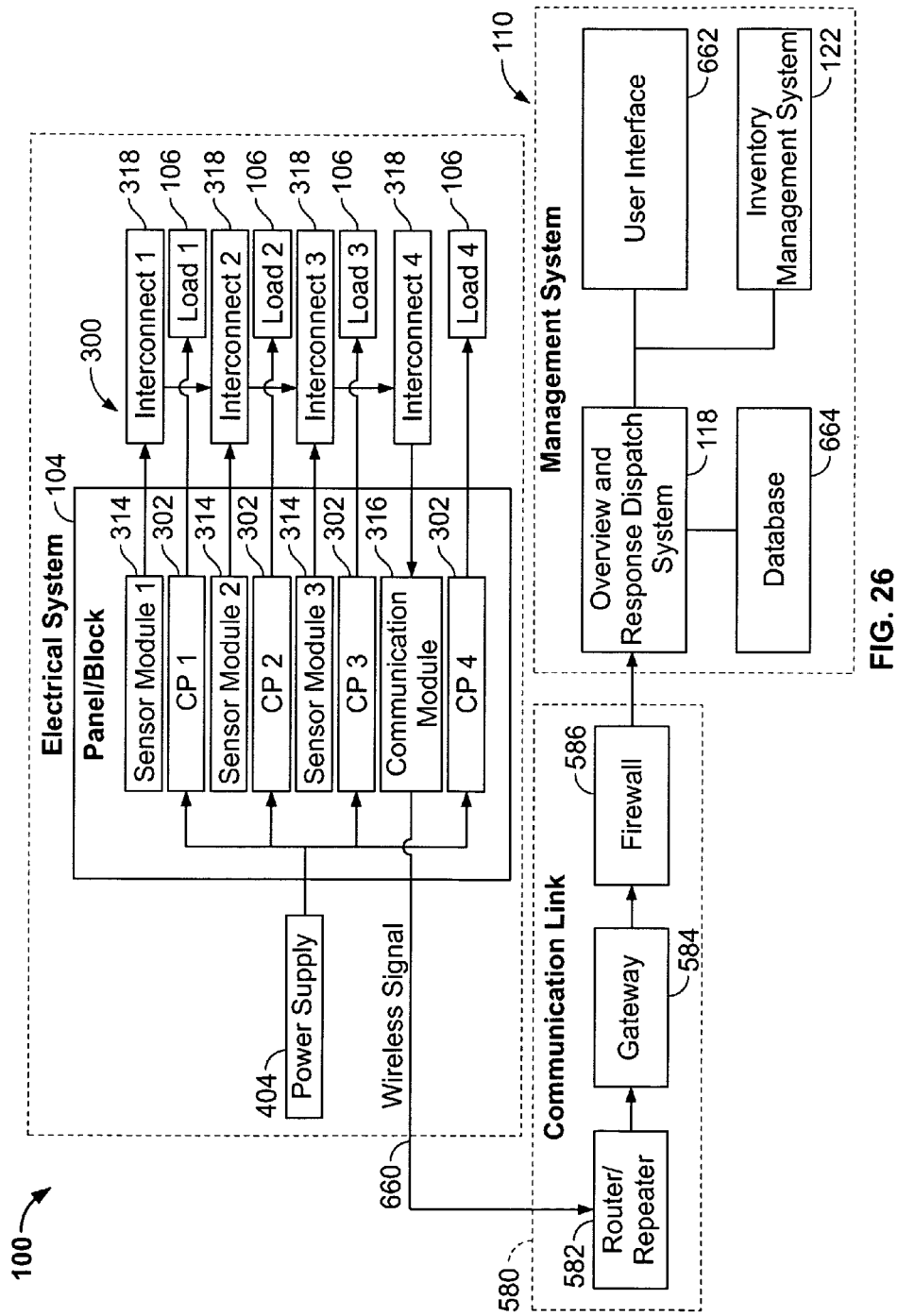
FIG. 26 schematically illustrates a further embodiment of the system shown in FIGS. 23-25.

FIG. 26 schematically illustrates the signal transmission system 580 connected to an electrical system 100 and the management system 112. The electrical system 100 includes a power supply or power supply circuitry 102 connected to multiple circuit protectors such as fuses 302 in a circuit protector panel 104. Each of the fuses 302 is associated with a sensor module 314 or a communications module 316, and each of the fuses 302 is connected to an electrical load 106. The interface plugs 318 interconnect the sensor modules 314 to one another and to the communications module 316 in the manner described above. Due to the interconnection of the modules 314, 316, when any of the fuses 302 operates to isolate any of the loads 106, a data packet is presented to the transmitter 340 of the communications module 316, and a wireless signal 660 is transmitted by the communications module 316. The wireless signal 660 is received and forwarded by at least one of the repeater/router elements 582 to the gateway device 584. The gateway device 584, protected by a firewall 586, then communicates the information to the overview and response dispatch system 118.

The management system 112 includes the overview and response dispatch system 118, a user interface or display 662 connected to the overview and response dispatch system 118, and may be in communication with the inventory management system 120 for automatic ordering of replacement fuses. A memory or database 664 may also be provided to log system activity and store needed information for the overview and response dispatch system. For example, the database 664 may be used to decode incoming data packet transmissions from the gateway device 584, and the user interface 662 may be used to present information to responsible personnel in tabular and graphic form with menu-driven displays described below. The database 664 may also be used for storage and retrieval of contact information for locating and summoning maintenance personnel.

Figure 27:
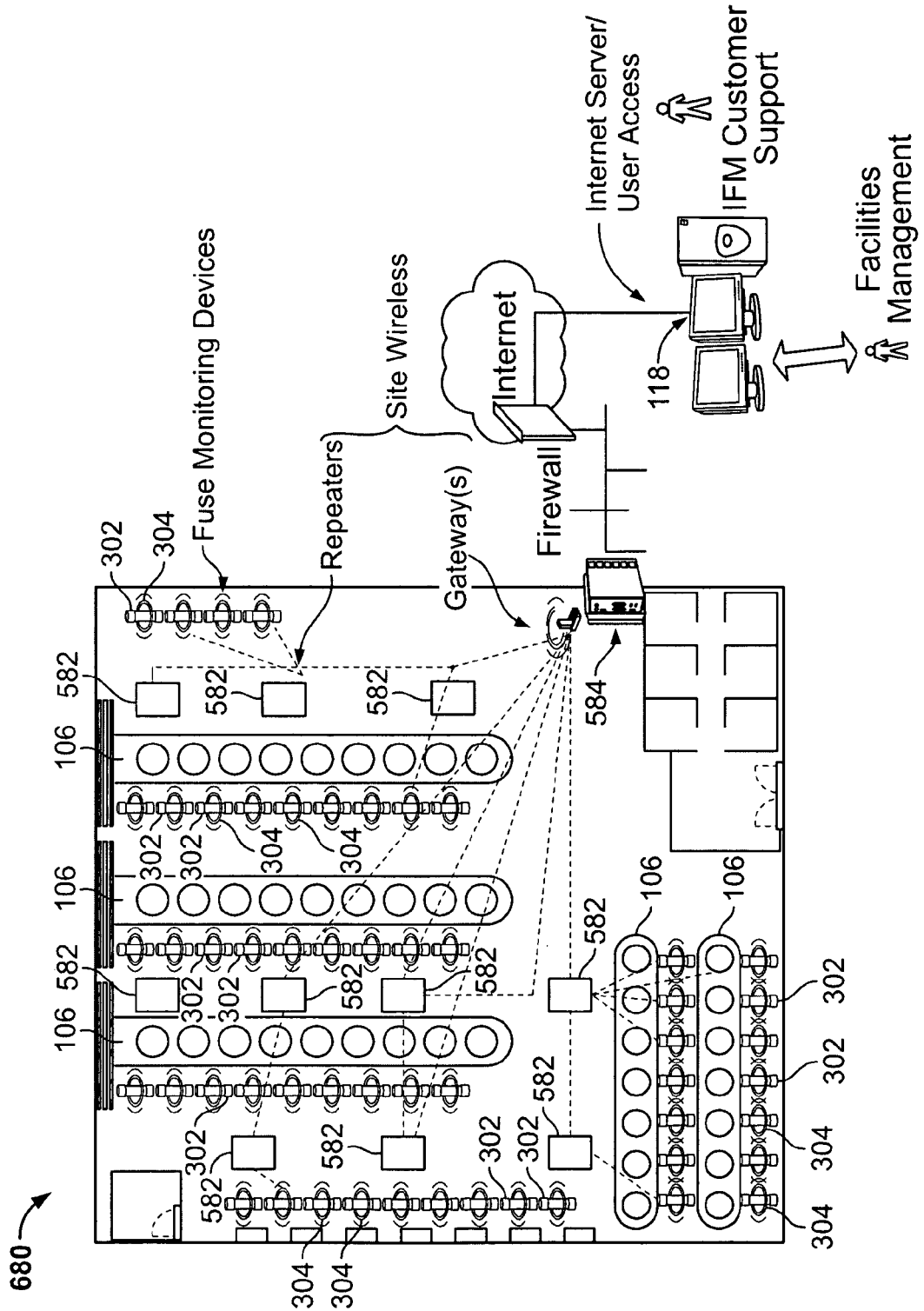
FIG. 27 is an exemplary schematic block diagram of an exemplary circuit protector management system utilizing the signal transmission system of FIG. 23 and connected to an electrical system.

FIG. 27 is an exemplary site diagram of an electrical facility 680 housing an electrical system having many circuit protectors 302 to be monitored in various panels 104 in the facility 680. Monitoring modules 304, some of which are communication modules 316 and some of which are sensor modules 314 are associated with circuit protectors such as fuses 302 scattered throughout the facility 680. A number of repeater/router elements 582 are also strategically located in different locations in the facility 680 within the operating range of the monitoring modules 304, and specifically the communications modules 316. The repeater/router elements 582, in turn, are in communication with a centralized gateway device 584 that communicates with the overview and response dispatch system 118 at a remote location via, for example, the Internet.

As FIG. 27 demonstrates, the management system can efficiently monitor a large number of fuses 302, and as the size and complexity of the facility 680 increases, the system is readily adaptable by adding additional monitoring modules 304 and repeater/router elements 582. The overview and response dispatch system 118 directly interacts with facilities management to provide real time system performance data and immediate information so that downed circuitry may be re-energized as quickly as possible.

Figure 28:
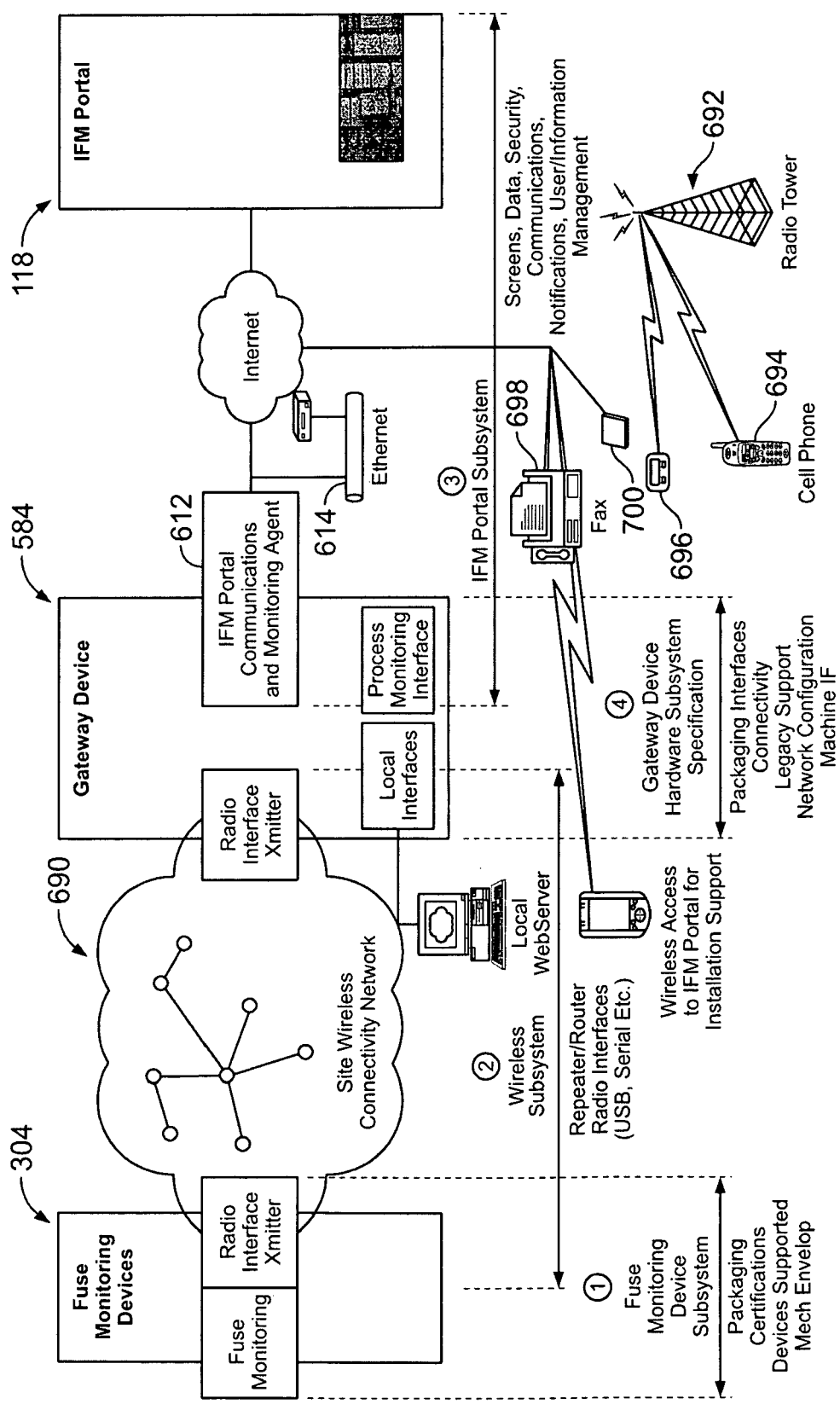
FIG. 28 is an exemplary site diagram of the electrical system shown in FIG. 27.

FIG. 28 further illustrates additional features of the management system shown in FIGS. 26 and 27 in one implementation thereof. The fuse monitoring modules 304 are interfaced with a network 690 of repeater/router elements 582 that are, in turn, interfaced with the gateway device 584. The gateway device 584 may be connected to local network interfaces and process monitoring interfaces of, for example, the facility 680. The portal communications application 612 of the gateway device 584, implemented in software or machine readable code, processes incoming signals from the repeater/router network 690. After processing by the portal communications application 612, the gateway device 584 communicates with the Internet via an Ethernet connection 618 and ultimately with the overview and response dispatch system 118. In response to communications from the gateway device 584, the overview and response dispatch system 118 communicates with responsible personnel for the electrical system through the Internet and communication towers 692, for example. to contact designated personnel by phone 694, pager 696, facsimile 698, email 700, or via a customer web site to provide direction and information regarding operated circuit protectors and re-energizing circuitry.

Figure 29:
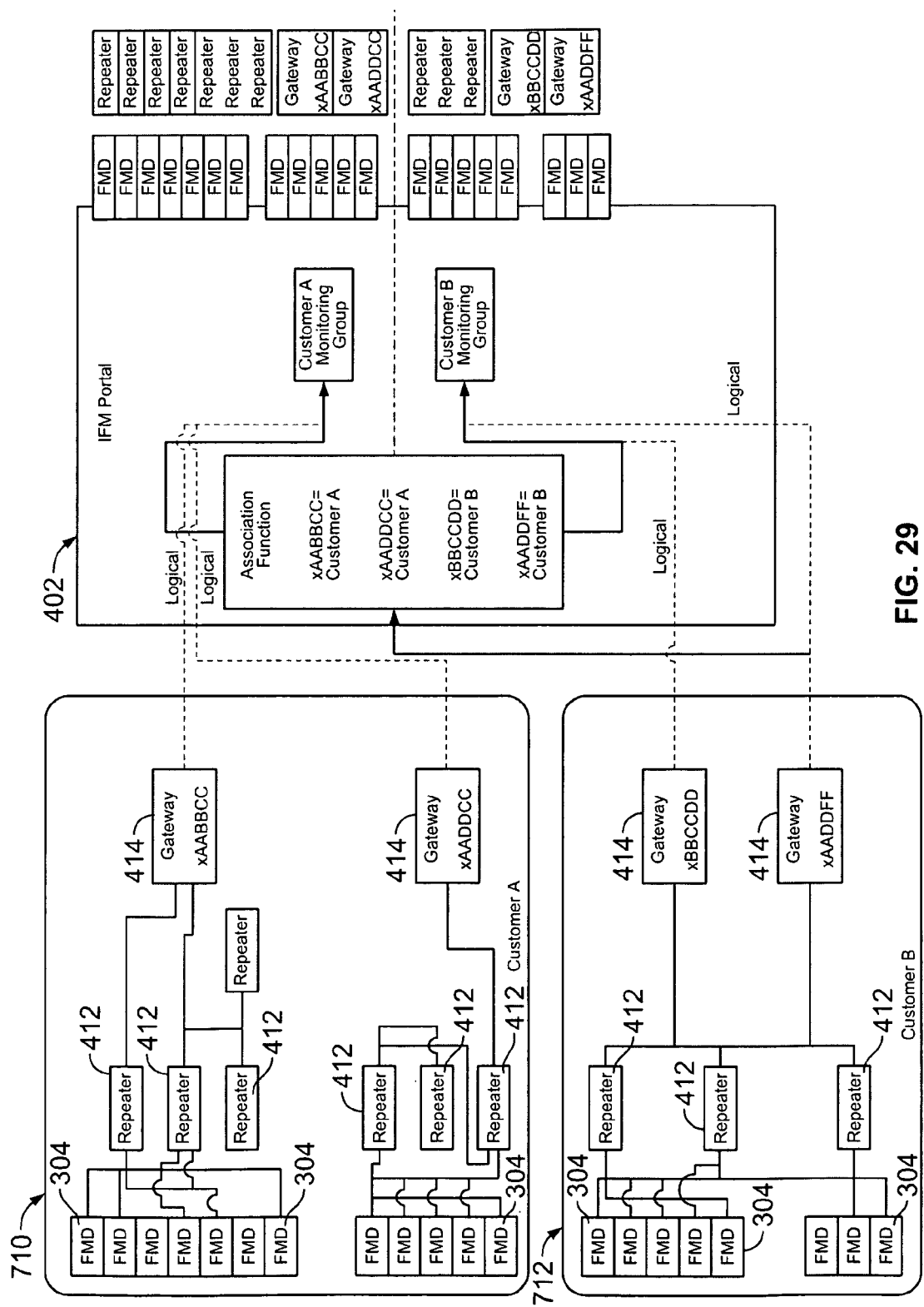
FIG. 29 is a system diagram of a further embodiment of the invention.

FIG. 29 schematically illustrates a further embodiment of another circuit protector management system wherein multiple status elements, such as the monitoring modules 304 or any of the status elements described above, communicate with repeater/router elements 582 and multiple gateway devices 584 in different locations or facilities 710 and 712. The gateway devices 584 in each facility 710, 712 communicate with the overview and response dispatch system 118 that may be, for example, at a third location remote from both of the facilities 710 and 712. In such a manner, and when the gateway data message includes a customer identifier, the overview and response dispatch system 118 may distinguish messages regarding the operation of the electrical system corresponding to the facility 710 from messages regarding the operation of the electrical system corresponding to the facility 712. Thus, when the facilities 710 and 712 are owned by different customers A and B as shown in FIG. 29, the overview and response dispatch system 118 may advise and alert multiple customers of the real time operation of their electrical systems, and provide each customer with specific information to efficiently re-energize electrical circuitry when the circuit protectors operate to protect the electrical systems.

In an exemplary embodiment, the overview and response dispatch system 118 may be located at the site of a circuit protector manufacturer, thereby providing real time information to the operation and performance of its fuse protection products in the field. The manufacturer may access the information input to or collected by the overview and response dispatch system 118 to provide superior customer support for a complete line of fuse circuit protection products, and may even use the information to improve existing circuit protection products, identify new product opportunities, and work closely with customers to solve complex problems in complicated electrical systems.

When implemented in easy to use, graphical interfaces and displays, the overview and response dispatch system 118 can provide operating status information to the customer at one location, a site technician at another location, and to customer support personnel at a third location with real time information to manage circuit protectors in various types of electrical systems and configurations. Thus, key personnel at the electrical system site level, the key management or personnel at the customer level that is responsible for the electrical system, and key personnel for circuit product support and help at the manufacturer level may all be advised on a timely basis of actual operating conditions of circuit protectors in multiple respective electrical systems. Additional parties, such as circuit protector retailers and distributors, could also be provided with circuit protector information as desired, and as previously mentioned, the overview and response dispatch system 118 could be programmed to automatically order a replacement fuse, for example, to replenish a fuse inventory as it is used.

E. The User Interface

FIGS. 30-46 illustrate aspects of an exemplary overview and response dispatch system 118 and the user interface therefore, that in one embodiment is a computer program or software embodied on a computer readable medium and utilizing, for example, a Structured Query Language (SQL) with a client user interface front-end for administration and a web interface for user input, access, and information retrieval and reports by service technicians and facilities management for electrical systems. The overview and response dispatch system 118 may be web enabled and is run on a business-entity intranet or alternatively may be fully accessed by individuals having an authorized access outside the firewall of the business-entity through the Internet. In an exemplary embodiment, the overview and response dispatch system is run in a Windows® NT environment or operating system that is commercially available from Microsoft Corporation of Redmond, Wash. The application is flexible and designed to run in various different environments without compromising any major functionality.

Figure 30:
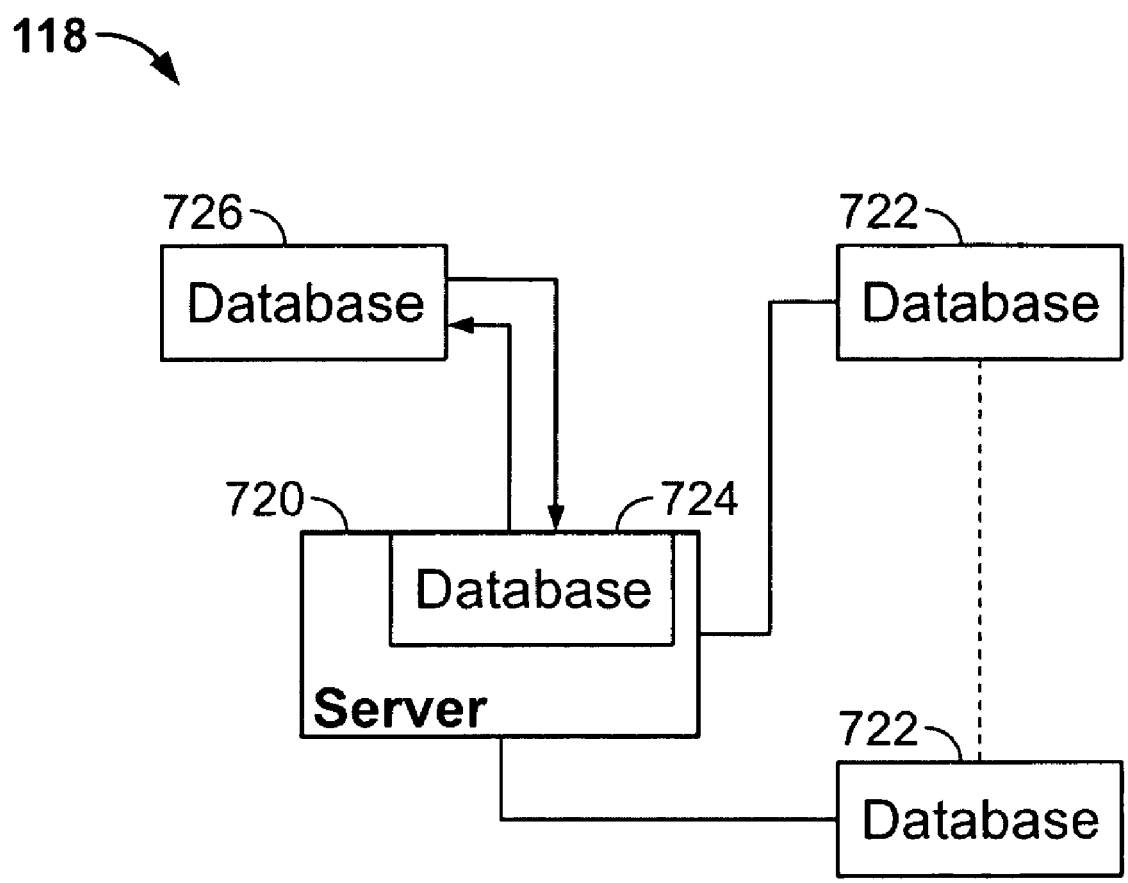
FIG. 30 is a simplified block diagram of an exemplary embodiment of the overview and response dispatch system shown in FIG. 1.

FIG. 30 is a simplified block diagram of an exemplary embodiment of the overview and response dispatch system 118 including a server system 720, and a plurality of client sub-systems, also referred to as client systems 722, connected to the server system 720. Computerized modeling and grouping tools, as described below in more detail, are stored in the server system 720 and can be accessed by a requester at any one of the client systems 722. In one embodiment, the client systems 722 are computers or other electronic devices including a web browser, such that the server system 720 is accessible to the client systems 722 using, for example, the Internet.

The client systems 722 may be interconnected to the Internet through many interfaces including, for example, a network such as a local area network (LAN) or a wide area network (WAN), dial-in-connections, cable modems and special high-speed ISDN lines. The client systems 722 may be any device capable of interconnecting to the Internet including a web-based phone, personal digital assistant (PDA), or other web-based connectable equipment or equivalents thereof. A database server 724 is connected to a database 726 containing information on a variety of matters, as described below in greater detail. In one embodiment, the database 726 is centralized and stored on the server system 720, and the database 726 be accessed by potential users at one of client systems 722 by logging onto the server system 720 through one of the client systems 722. In an alternative embodiment, the database 726 is stored remotely from server system 720 and may be non-centralized.

Figure 31:
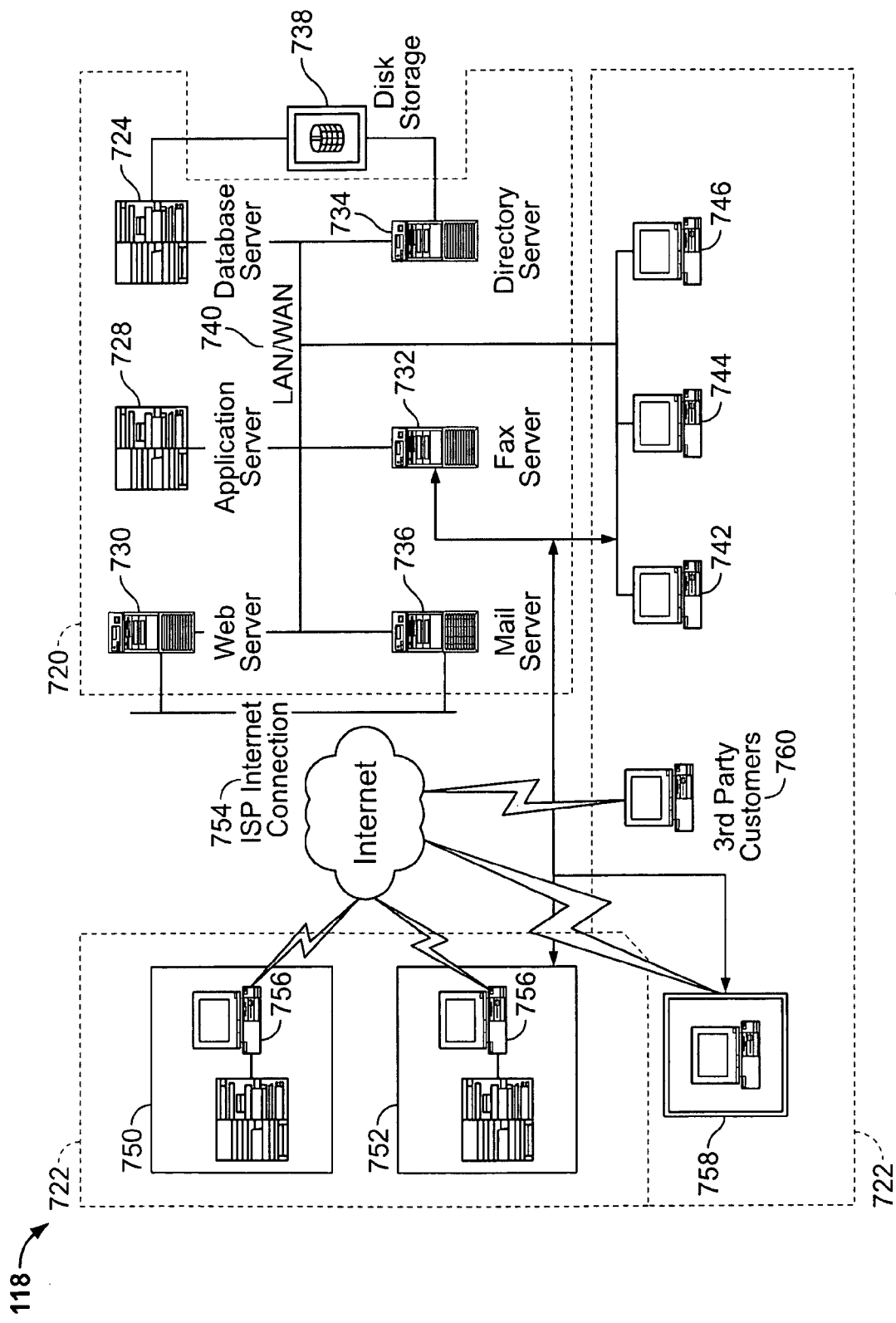
FIG. 31 is an expanded block diagram of an exemplary embodiment of a server architecture of the overview and response dispatch system shown in FIG. 30.

FIG. 31 is an expanded block diagram of an exemplary embodiment of a server architecture of the overview and response dispatch system 118 including the server system 720 and the client systems 722. The server system 720 includes the database server 724, an application server 728, a web server 730, a fax server 732, a directory server 734, and a mail server 736. A disk storage unit 738 is coupled to the database server 724 and the directory server 734. The servers 724, 728, 730, 732, 734, and 736 are coupled in a local area network (LAN) 740. In addition, a system administrator's workstation 742, a user workstation 744, and a supervisor's workstation 746 are coupled to the LAN 740. Alternatively, workstations 742, 746, and 748 are coupled to LAN 740 using an Internet link or are connected through an Intranet.

Each workstation, 742, 744, and 746 is a personal computer or other electronic device having a web browser. Although the functions performed at the workstations typically are illustrated as being performed at respective workstations 742, 744, and 746, such functions can be performed at one of many personal computers coupled to the LAN 740. Workstations 742, 744, and 746 are illustrated as being associated with separate functions only to facilitate an understanding of the different types of functions that can be performed by individuals having access to the LAN 740.

The server system 720 is configured or adapted to be communicatively coupled to various individuals via some of the client systems 722, including employees 750 associated with the overview and response dispatch system 118 such as circuit protector manufacturer technical support and assistance personnel, and to third parties 752 such as installer, technicians or maintenance personnel that are responsible for an electrical system to be monitored and communication with the server system 720 using, for example, an ISP Internet connection 754. The communication in the exemplary embodiment is illustrated as being performed using the Internet, however, any other wide area network (WAN) type communication can be utilized in other embodiments. That is, the overview and response dispatch system, and its operating algorithms and processes are not limited to being practiced using the Internet.

In an exemplary embodiment, any authorized individual having a workstation 756, 758 can access the server system 720 via one of the client systems 722. At least one of the client systems 722 includes a manager workstation 758 located at a remote location. Workstations 756 and 758 may be personal computers or other electronic devices having a web browser. Additionally, third party customers such as circuit protector distributors or automated dispensing systems for replenishing circuit protector inventories, may communicate with the server system 720 via a workstation 760 having, for example, a web browser.

The fax server 732 may communicates with remotely located client systems 722, including the workstations 756, 758 and 760. The fax server 732 may use, for example, a telephone link or cellular communications tower to communicate with the workstations and alert and summon designated persons for action and attention to the electrical system when circuit protectors operate. The fax server 732 is configured or adapted to communicate with other client systems including but not limited to the workstations 742, 744 and 746 as well for reporting purposes.

Figure 32:
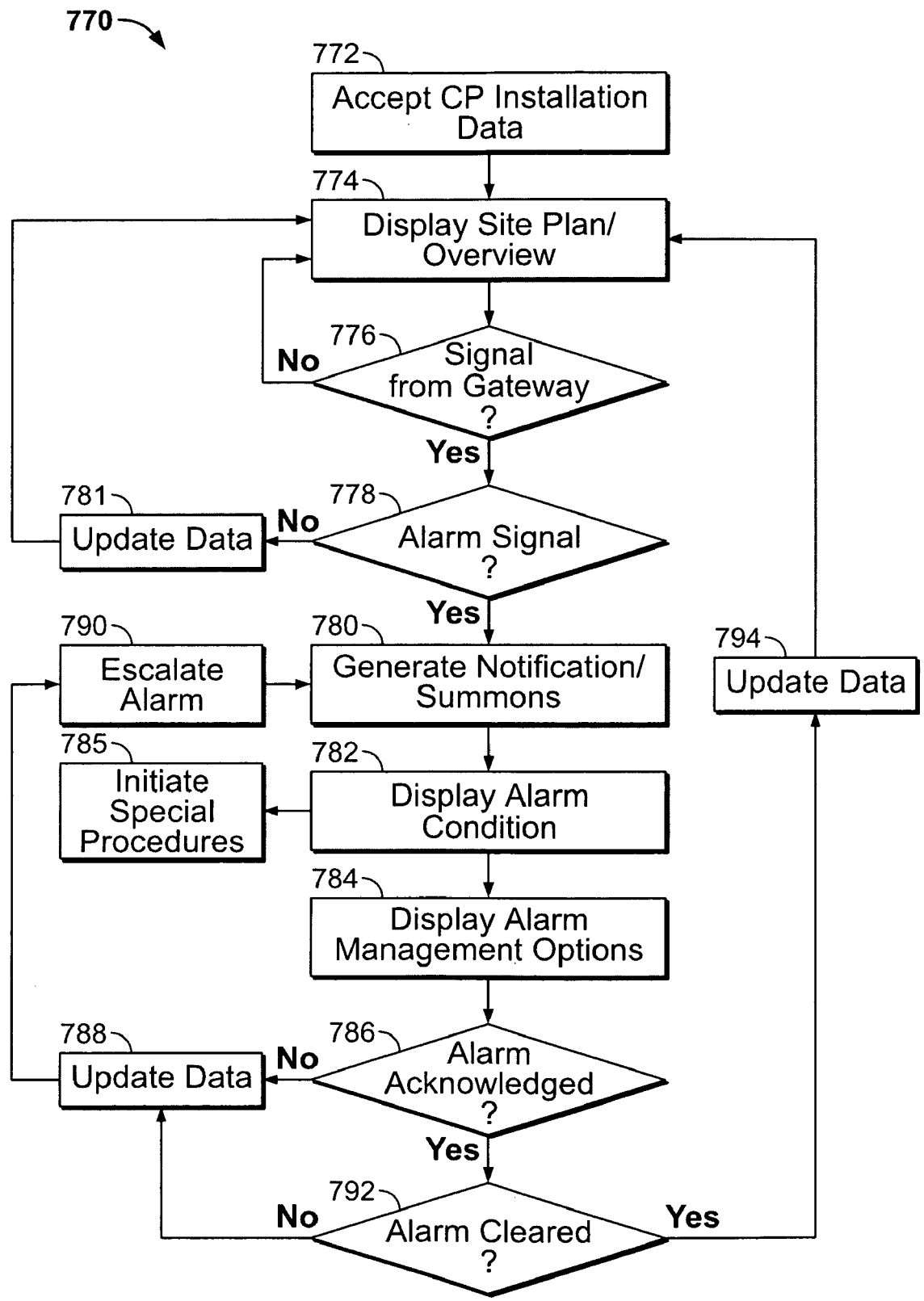
FIG. 32 is a flowchart illustrating exemplary processes utilized by the overview and response dispatch system shown in FIGS. 30-32.

FIG. 32 is a flowchart illustrating an exemplary method or process 770 utilized by the overview and response dispatch system 118. The technical effect of the processes and systems described herein is achieved when installation information pertaining to the circuit protectors, status elements, and communication devices in the signal transmission system described above is entered, transmitted, downloaded or otherwise accepted 772 by the overview and response dispatch system. The information is stored in the aforementioned server system, and permits incoming data signals from the gateway device to be decoded, interpreted, or processed by the overview and response dispatch system 118 to convey information to end users as described below. In an exemplary embodiment, much of this information is supplied to the gateway configuration and monitoring algorithms 592 of the gateway device 584 described above, and then communicated to the overview and response dispatch system 118. It is understood, however, that the information could be supplied to the overview and response dispatch system 118 through any of the workstations connected to the server system.

In one embodiment, the information accepted 772 corresponds to the various codes and information described above that are used to generate the data packets and signal transmissions from the status elements to the gateway, and accordingly the accepted information includes for example, unique radio identifiers corresponding to each of the status element communications modules in the electrical system being monitored, serial numbers for the circuit protectors monitored by the status elements, device type codes for various types of circuit protectors, a location code for each circuit protector, wireless addresses for communication devices in the signal transmission system, an IP address for the gateway device, time/date stamps for incoming data signals from the gateway, a software revision code for the gateway application software and/or the communications application loaded on the gateway device, a hardware revision code for the gateway device, a data packet count for an incoming message, an error count for incoming data packets and messages, and error codes corresponding to different error conditions for the status elements, the signal transmission system, and/or the overview and response dispatch system. Information regarding the electrical system itself, including detailed site layout diagrams and schematics is also supplied and accepted 772 by the overview and response dispatch system. The information accepted 772 also includes customer identifiers and contact information for the automated alert notifications generated by the overview and response dispatch system.

Once the information circuit protector installation data is accepted 772, the overview and response dispatch system displays 774 a site plan and circuit protector overview for the electrical system being monitored. The site plan and circuit protector overview may include diagrammatic illustrations of the electrical system site and facilities where the electrical system is located, the circuit protectors associated with the electrical system and their relative location in the electrical system, circuitry and loads protected by the circuit protectors, and operating status of the circuit protectors. The circuit protectors may be grouped, categorized and presented to the user in menu-driven form illustrated in the examples below.

The overview and response dispatch system awaits the receipt 776 of data signals or messages from the gateway device, and if no messages are received 776, the overview and response dispatch system continues to display 774 the site plan and circuit protector overview.

If a message is received 776 from the gateway device, the overview and response dispatch system processes, decodes or interprets the message and determines 778 whether the message corresponds to an alarm condition, depending upon the contents of the message. If the overview and response dispatch system determines 778 that the message does not correspond to an alarm condition, the data from the message is updated 788 and the overview and response dispatch system returns to display 774 the site plan and circuit protector overview, including any new or updated information received in the message. For example, if the message from the gateway indicates that a new circuit protector, status element, or circuit protector has been installed, or the signal transmission system has been modified to include more or less repeater/router elements, the site plan and circuit protector overview reflects such changes for inspection by users of the overview and response dispatch system. As another example, when the status elements collect operating data such as voltage, current or temperature readings from the circuit protectors, and when such readings are included in the data messages from the gateway device, such data and information may be displayed in conjunction with the site plan and circuit protector overview.

If the overview and response dispatch system determines 778 that the message relates to an alarm condition, the overview and response dispatch system generates 780 a notification alert and directly summons and contacts designated personnel by any of the aforementioned methods so that affected circuitry may be quickly evaluated. Various alarm conditions may be provided, and may indicate fault conditions in the circuit protector monitoring and signal transmission components; threshold alarms when predetermined voltage, current or operating temperature conditions are approached; and opened circuitry alarms when the circuit protectors operate in use to isolate portions of the circuitry. The alarm conditions may be categorized and ranked in terms of severity or urgency, and the overview and response dispatch system may respond differently to the various levels of alarm conditions.

Once the data messages are interpreted as alarm conditions and notifications are generated 780, the overview and response dispatch system displays 782 the alarm condition so that interested system users may see the alarm condition detected in real time. If desired, and depending upon the severity of the alarm condition, the overview and response dispatch system may initiate 785 special procedures to shut down at risk systems, shut down certain machines, etc. as the alarm condition warrants. The special procedures may include activating auxiliary power to the affected loads corresponding to specific machines or equipment, shutting down at risk systems or loads corresponding to specific machines or equipment, saving key circuit data for analysis, etc. when the circuit protectors 108 operate to open portions of the electrical system 100, and communicating such undertakings and actions to designated personnel for further evaluation and response.

Initiation of the special procedures may entail communication with the gateway device that sent the alarm message to the overview and response dispatch system, and allowing the gateway device to perform the procedures at the electrical system site by communicating with, for example, a computerized maintenance management system, a supervisory control and data acquisition system, an industrial control and automation system, an enterprise resource planning system, an electronic data interchange system, a manufacturing resources planning system, a supply chain management system, automated disconnect switch controls, programmable logic controllers and the like that are operatively connected to auxiliary power supplies and power distribution equipment, and by other known control means familiar to those in the art. Alternatively, the initiation of special procedures could be implemented in the generation 780 of alarm notification wherein designated personnel are requested to take certain action to shut down specific equipment and loads, for example, until the alarm condition is rectified. Thus, in different embodiments, special procedures could be automatically undertaken by the gateway device and/or the overview and response dispatch system without human action, or the gateway device and/or the overview and response dispatch device may prompt a system user or system contact person to enact and perform the special procedures.

The overview and response dispatch system also displays 784 alarm management options to users logged on to the system. Using the alarm management options, users may acknowledge, clear, and annotate alarm events, as well as to review alarm summaries and histories for later study and analysis.

After the generation of notification and display of alarm conditions, the overview and response dispatch system awaits acknowledgment 786 of the alarm conditions by one or more users or responders. If the alarm notification is not acknowledged within a reasonable time frame, the overview and response dispatch system updates the alarm data 788, escalates 790 the alarm, and again generates another notification and summons to designated personnel. The time frame to await acknowledgment before escalating an alarm may be varied depending upon the severity of the alarm condition, and escalation of the alarm may be also be varied, or even eliminated, depending on the nature of the alarm condition. Escalation of alarms may result in additional or alternative persons or personnel being contacted and notified by the response dispatch system, a shortened time frame to acknowledge the alarm after additional notifications are sent, audio or visual alarm features to be activated at one or more locations, or other means to garner attention to the system from one or more users so that affected circuitry may be re-energized or issues may be promptly addressed. Proactive management of the electrical system in anticipation of circuit perturbations may be facilitated depending upon the sophistication of the alarm scheme used.

Once an alarm is acknowledged, the overview and response dispatch system awaits to see whether the alarm is cleared 792 by one or more persons responsible for the electrical system to let the overview and response dispatch system know that the alarm condition has been attended to and the alarm condition no longer exists. If the alarm is not cleared 792, the message data is updated 788 and the alarm escalated 790 prior to generating 780 another notification of alarm condition.

Once the alarm is cleared 792, the message data is updated 794 and the overview and response dispatch system returns to display the site plan and circuit protector overview until another signal is received 776 from the gateway device. Information regarding alarm events, including response times to acknowledge and clear the alarm conditions, are recorded by the overview and response dispatch system for study and analysis by facilities management. Reports may be compiled and generated relating to the performance of the electrical system, circuit protectors associated with the system, effectiveness of the status elements and signal transmission system, responsiveness of personnel to the system, and other information of interest.

FIGS. 33-42 illustrate exemplary displays of a user interface for the overview and response dispatch system 118 in an exemplary embodiment.

Figure 33:
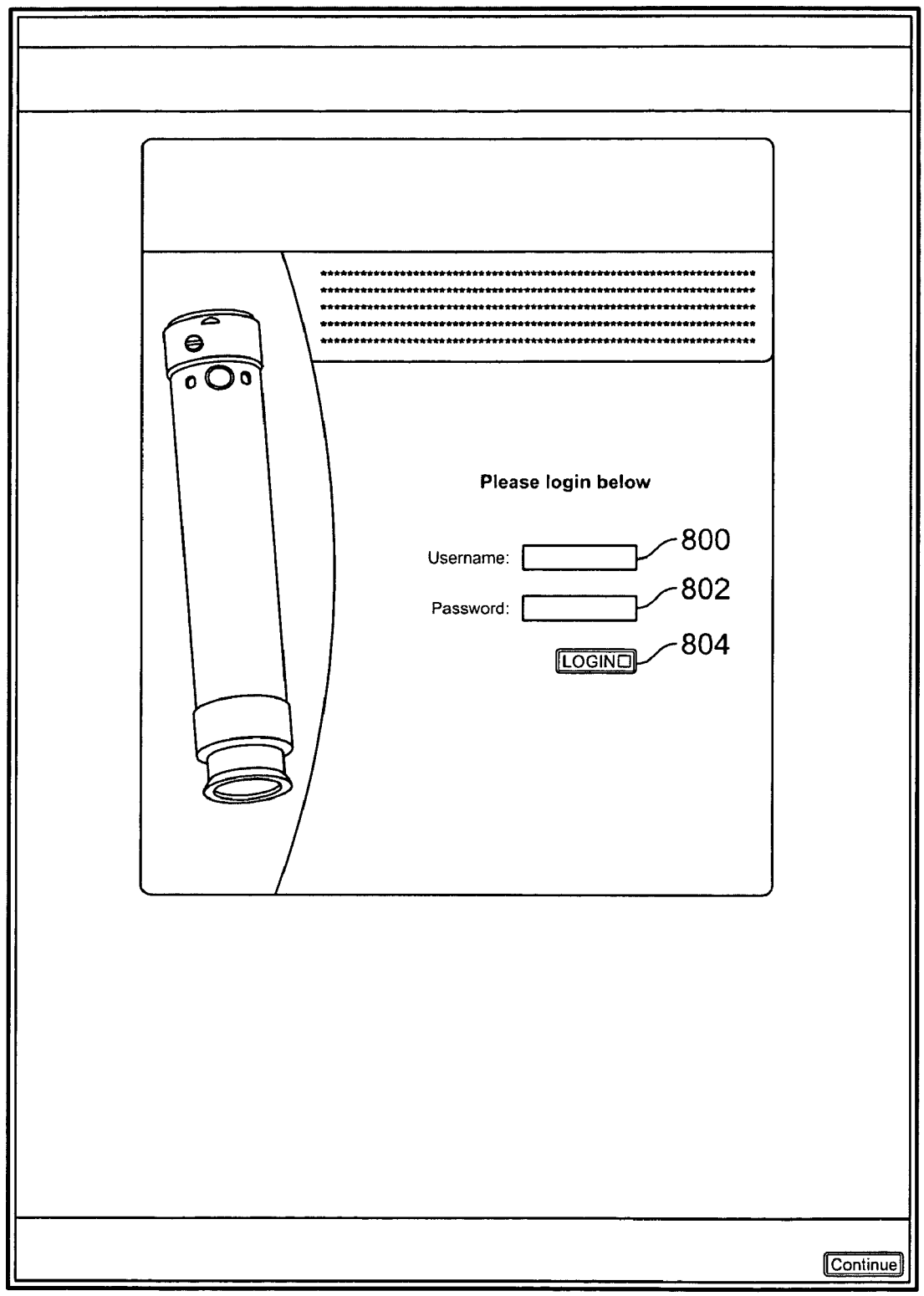
FIG. 33 is an example embodiment of a user interface displaying a logon screen for a user of the overview and response dispatch system.

FIG. 33 is an example embodiment of a user interface displaying a logon screen for a user of the overview and response dispatch system 118. Authorized system users may log onto the overview and response dispatch system 118 with a conventional username data field 800, password data field 802, and a login button 804. Unauthorized system users are prevented from entering or accessing the overview and response dispatch system 118.

Figure 34:
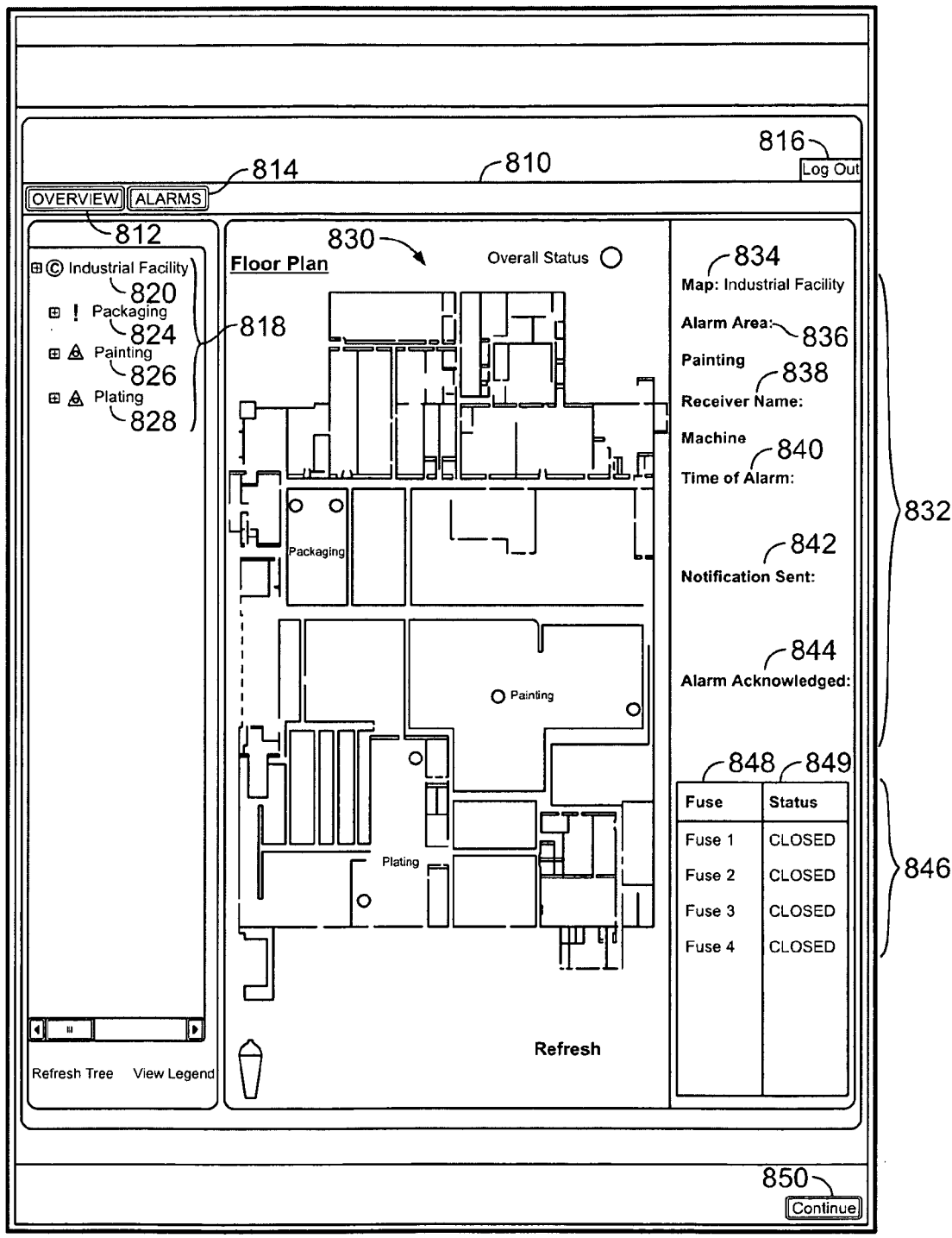
FIG. 34 is an example embodiment of a user interface displaying a circuit protector layout and overview.

FIG. 34 is an example embodiment of a user interface displaying a circuit protector layout and overview screen that is presented to the user after logging in. A navigation bar 810 is provided in the upper portion of the screen, and the navigation bar includes an overview link 812 and an alarms link 814. A logout link 816 is provided adjacent the navigation bar 810 for exiting the system.

A facility tree 818 is provided in one portion of the display and includes a facility link 820, and sub-facility links 824, 826 and 828 corresponding to different areas or portions of the larger facility. In the example shown, the larger facility is an industrial plant that is divided into three distinct operating areas, namely a packaging area, a painting area, and a plating area. The areas may be located in the same or different physical facility or building, and the user may see at a glance the facilities and sub-facilities being monitored.

A floor plan or site layout 830 is displayed for the selected facility link 820 or sub-facility links 824, 826 and 828. The site layout illustrates the physical facility being monitored so that the user may identify relative locations of circuit protectors and navigate through the facility to address alarm conditions with minimal delay. By selecting the facility or sub-facility links 822, 824, 826 and 828, the user may see the monitored electrical system at various levels of detail.

An alarm notification area 832 is provided in the site plan and circuit protector overview screen, and in an exemplary embodiment includes a map data field 834, an alarm area data field 836, a receiver name data field 838, a time of alarm data field 840, a notification sent data field 842, and an alarm acknowledged data field 844 so that the user may see an alarm condition and related information at a glance. The map data field 834 directs the user to the site layout 830 being displayed. The alarm data field 836 refers to the sub-facility link of interest. The receiver name data field 838 refers to the electrical load being monitored or affected within the alarm data field 836. Data fields 840, 842 and 844 notify the user of the respective times of the alarm condition's occurrence, notification of the alarm, and acknowledgment of the alarm by designated personnel.

A circuit protector summary 846 is also provided in the site plan and circuit protector overview screen. The circuit protector summary 846 is provided in tabular form in an exemplary embodiment and includes a fuse column 848 and a status column 849. Thus, in the example shown in FIG. 34, there are four fuses associated with a machine in the painting area of the industrial facility, and all four of the fuses are closed and operational. Accordingly, the electrical system is operating normally and the alarm data fields 840, 842 and 844 are empty.

A continue button 850 is provided to access more summary information, alarm conditions, site plans, etc. when the information may not be presented on a single page or screen.

Figure 35:
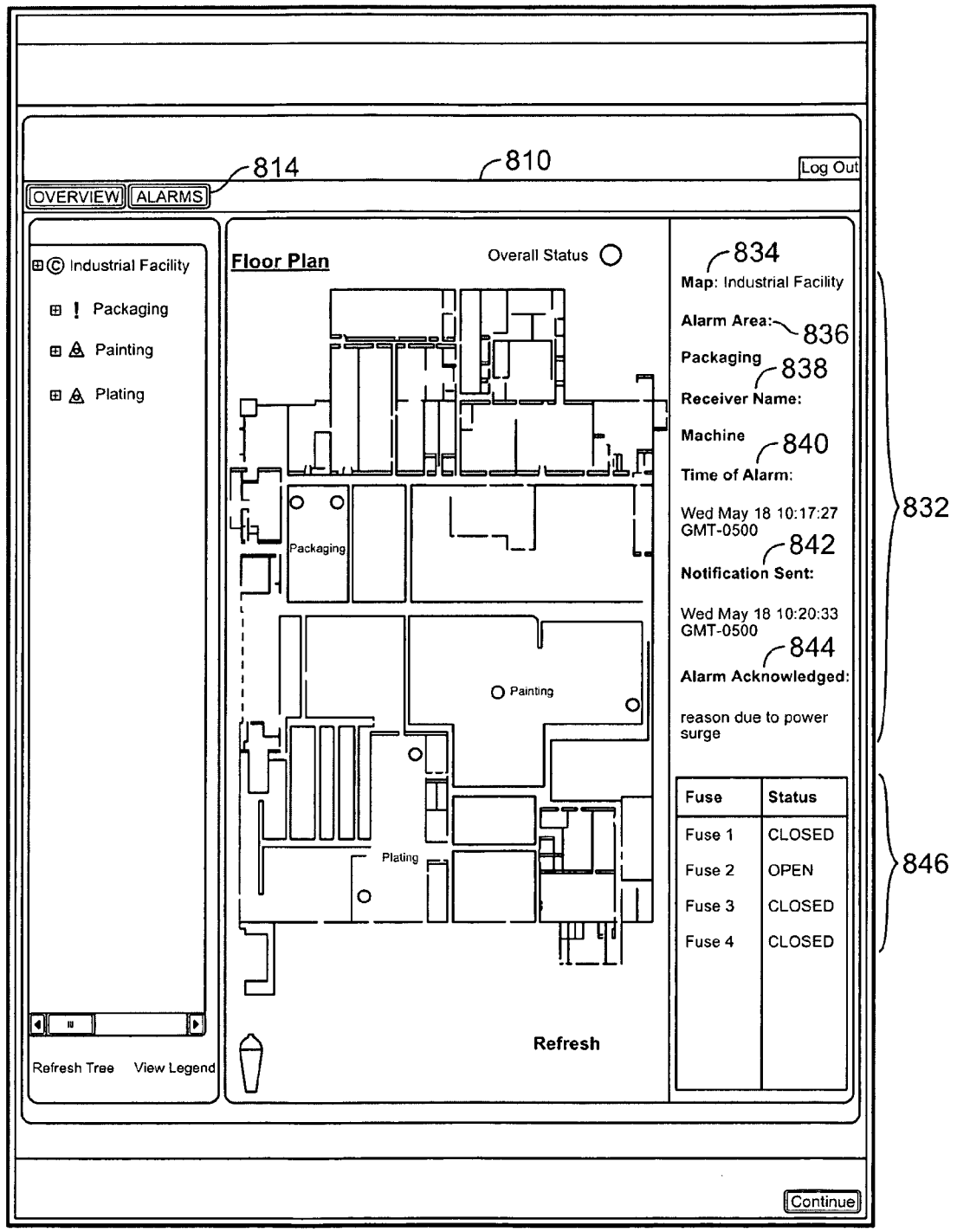
FIG. 35 is an example embodiment of a user interface displaying a circuit protector layout in an alarm condition.

FIG. 35 illustrates the circuit protector layout and overview screen after an alarm condition is indicated as the overview and response dispatch system has received an alarm signal message from the gateway device. The alarm notification area 832 now displays information relating to the alarm condition, and as shown in FIG. 35, the data fields 834, 836, 838, 840, 842 and 844 are populated or filled in by the overview and response dispatch system to denote the respective map, alarm area, and receiver name associated with the alarm, and the time of alarm, time of notification, and acknowledgment of the alarm. In addition, the circuit protector summary 846 summary now shows than one of the circuit protector fuses, namely fuse 2 in the illustrated example, has now opened and affected operation of the machine identified in the alarm notification area 832.

Figure 36:
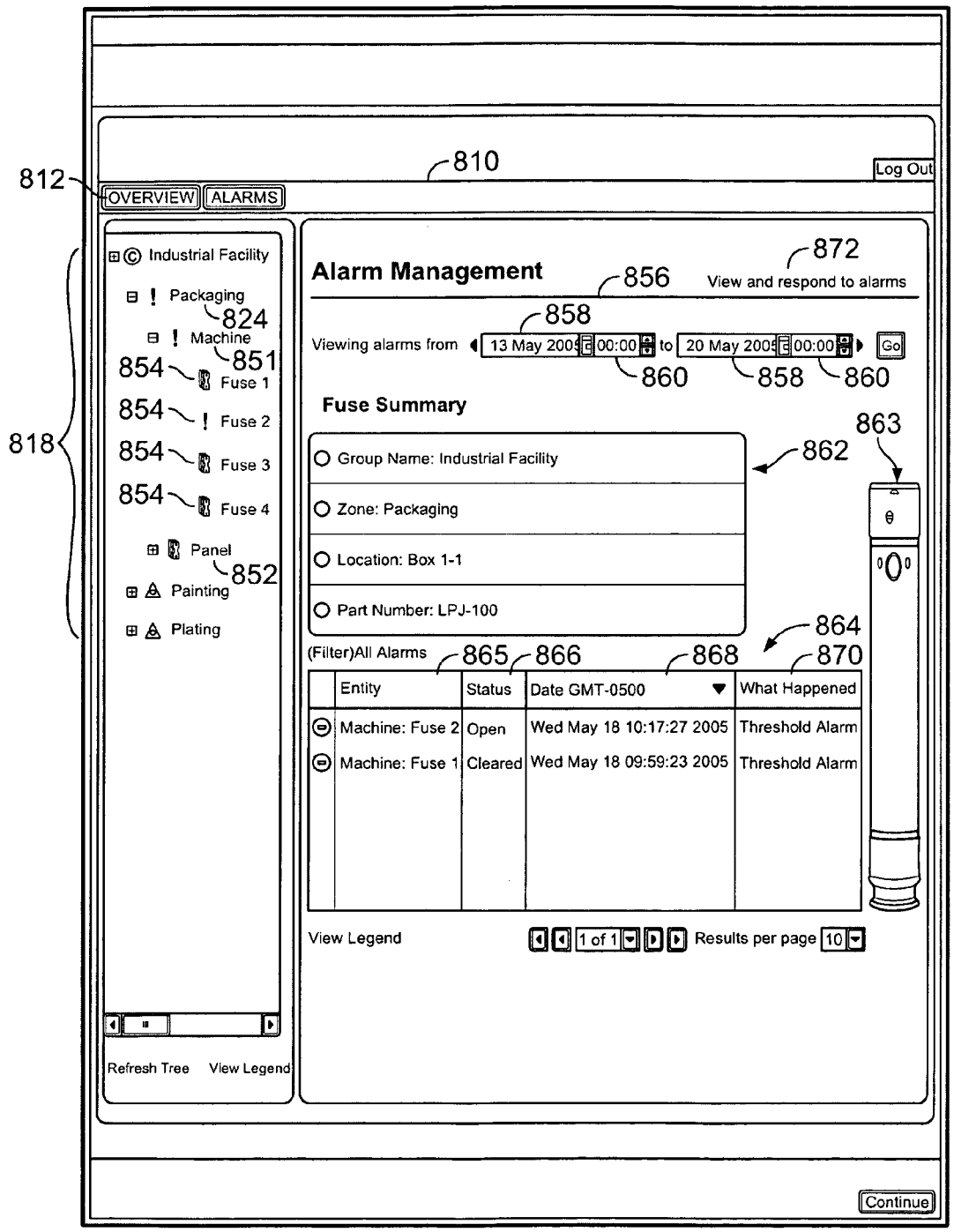
FIG. 36 is an example embodiment of a user interface displaying a circuit protector alarm management summary.

FIG. 36 is an example embodiment of a user interface displaying a circuit protector alarm management summary screen that may be accessed by the user, for example, by selecting the alarm link 814 in the navigation bar 810 in FIG. 35.

The circuit protector alarm management summary screen includes the navigation bar 810, and the facilities tree 818 described above. When the user selects the sub-facility links, the tree 818 is expanded to show the circuit protectors associated with the selected sub-facility. Thus, in the example shown, the packaging sub-facility link 824 is selected, and a machine link 851 and a panel link 852 are each presented as icons that correspond to a machine and a circuit protector panel located in the packing area. By selecting the machine or panel links 851 and 852, the user may see the circuit protectors associated with the machine and panel in the electrical system being monitored.

The machine link 851 has also been selected in the example shown in FIG. 36, and four circuit protectors 854 are shown graphically that are associated with the machine. The fuse 2, indicated as open in the summary area 846 in FIG. 35, has been selected on the circuit protector alarm management summary screen of FIG. 36, and an alarm management overview 856 is presented to the user with corresponding information for the opened circuit protector fuse 2 that has been identified.

The alarm management overview 856 includes date and time data fields 858 and 860 that may be used to view alarms generated for the selected circuit protector fuse 2 within specific time and date parameters. Thus, alarms may studied to diagnose and troubleshoot underlying issues in the electrical system that trigger the alarms. A fuse summary area 862 is provided to display, for example, a group name that the selected circuit protector belongs to, a zone name for an area of the electrical system or facility area of the selected circuit protector, a location for the selected circuit protector, and the part number for the circuit protector that identifies the type of the circuit protector that has operated. Thus, at a glance the user may learn the identity, location and type of circuit protector that has generated an alarm, and accordingly the user can quickly locate a replacement circuit protector, such as a fuse, and can efficiently locate the circuit protector, referring back to the site layout and circuit protector over screens if necessary by selecting the overview link 812 in the navigation bar 810. A picture 863 of the circuit protector type or model may be displayed to the user to assist in locating a replacement circuit protector.

A tabular alarm status area 864 is provided that in one embodiment includes an entity column 865, a status column 866, a time and date column 868, and an explanation column 870. Each of the columns 865, 866, 868 and 870 are populated by the overview and response dispatch system with information so that a user can quickly assess an alarm condition.

Figure 37:
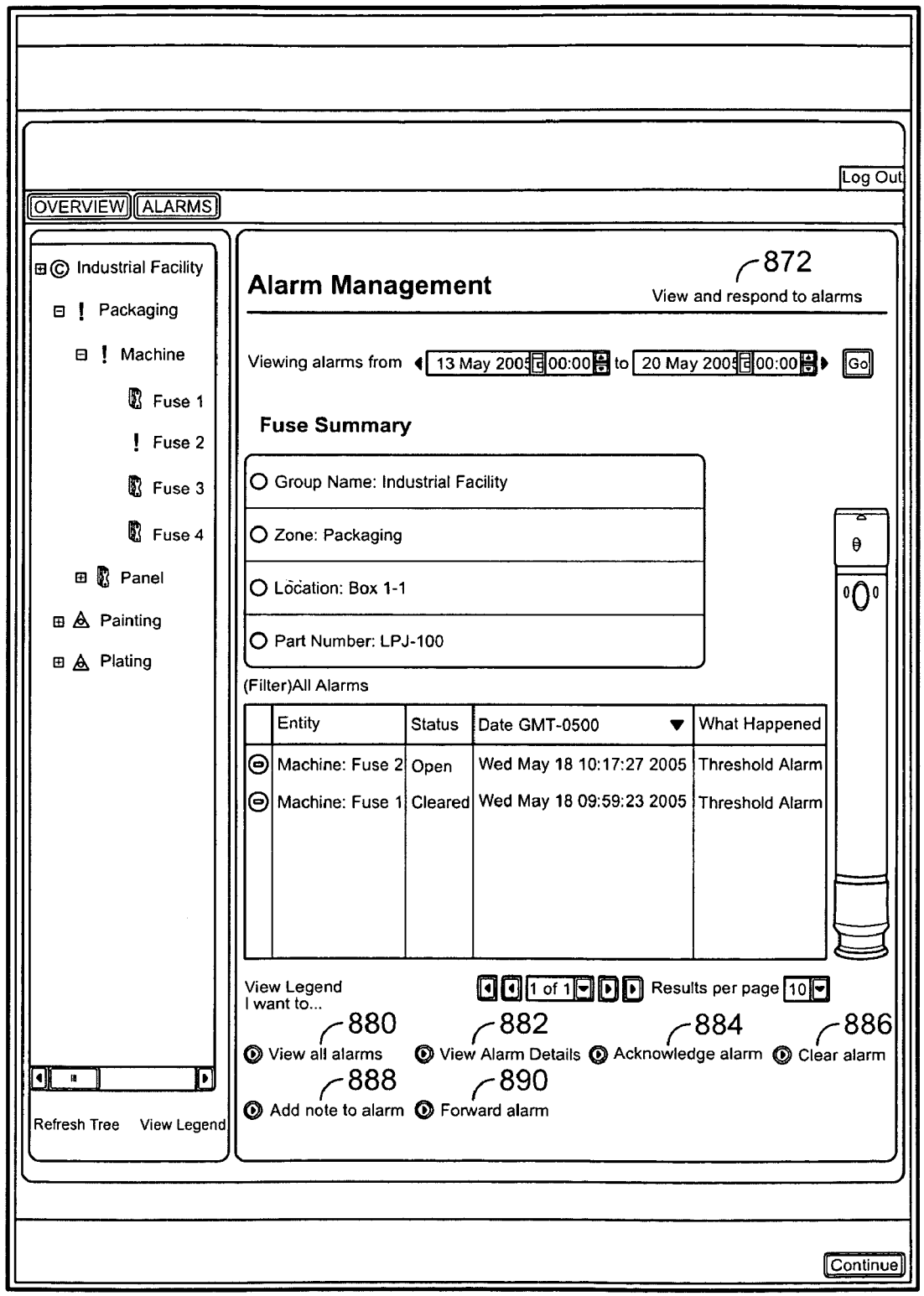
FIG. 37 is an example embodiment of a user interface displaying circuit protector alarm management options.

A view and respond to alarms link 872 is provided, and when the link 872 is selected, a circuit protector alarm management options screen is presented to the user as shown in FIG. 37. The alarm management options screen is similar to the alarm management overview screen shown in FIG. 36, but includes a view all alarms link 880, a view alarm details link 882, an acknowledge alarm link 884, a clear alarm link 886, an add note to alarm link 888, and a forward alarm link 890.

Figure 38:
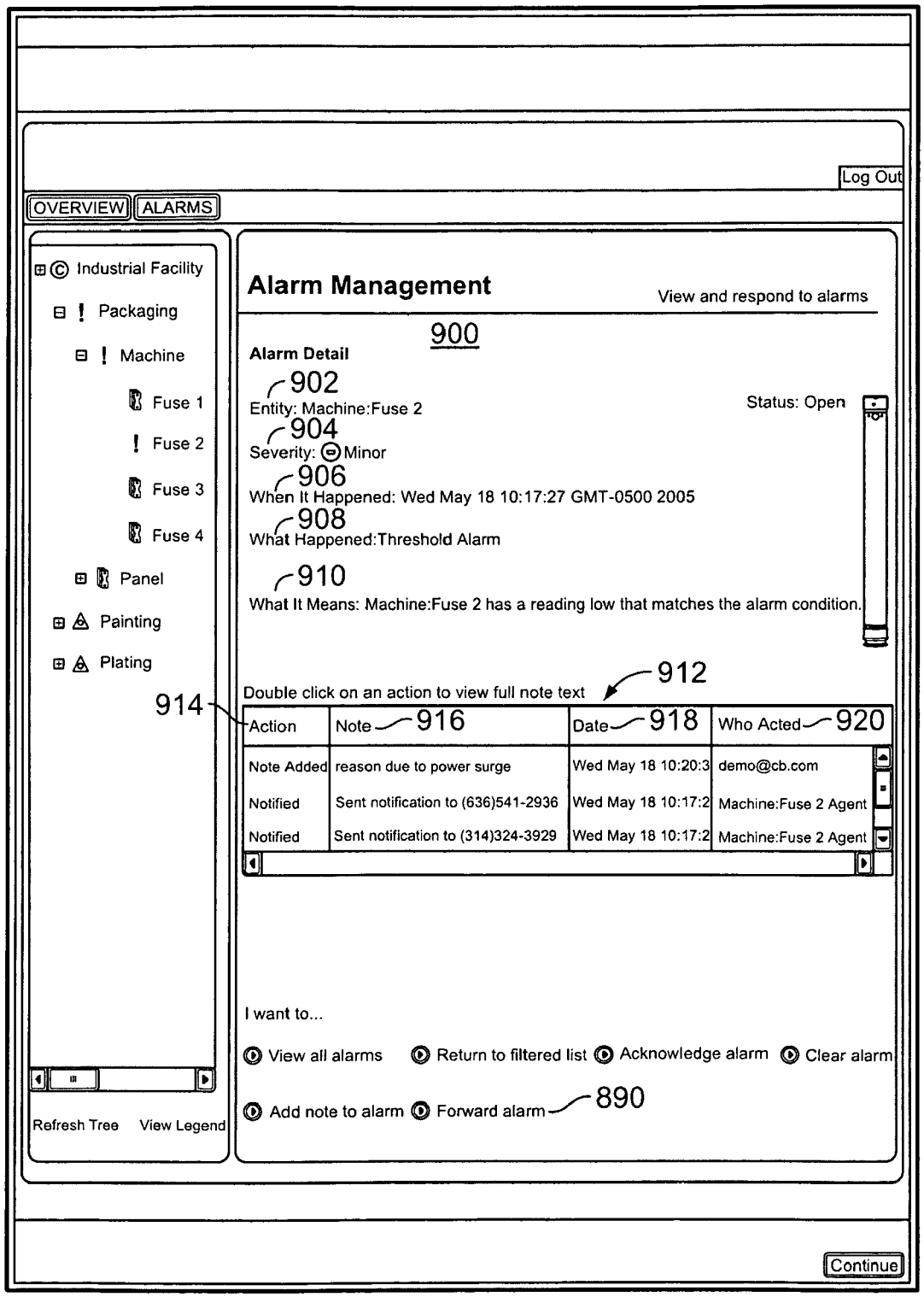
FIG. 38 is an example embodiment of a user interface displaying a circuit protector alarm detail.

FIG. 38 is an example embodiment of a circuit protector alarm detail screen that is accessible to a user by selecting the view alarm details link 882 in FIG. 37.

The circuit protector alarm detail screen includes a detail summary 900 including an entity data field 902 corresponding to the load associated with the circuit protector of interest, an alarm severity data field 904, a time and date data field 906 for the alarm, a brief explanation data field 908 for the alarm, and a detailed explanation data field 910 for the alarm so that the user may quickly learn key information regarding the alarm condition.

An alarm action table 912 is also provided and includes an action column 914, a note column 916, a date column 918, and a who acted column 920 to identify the persons or persons that responded to an alarm condition. Thus, the user may quickly assess any action being taken or that has been taken in response to an alarm. Notes can be automatically added by the overview and response dispatch system, or manually entered by responding personnel or system users to document circuit opening events or issues with the electrical system.

In an exemplary embodiment, the overview and response dispatch system is programmed to automatically notify and alert specific personnel, but a user may provide alert and notification to another person by selecting the forward alarm link 890 if desired.

Figure 39:
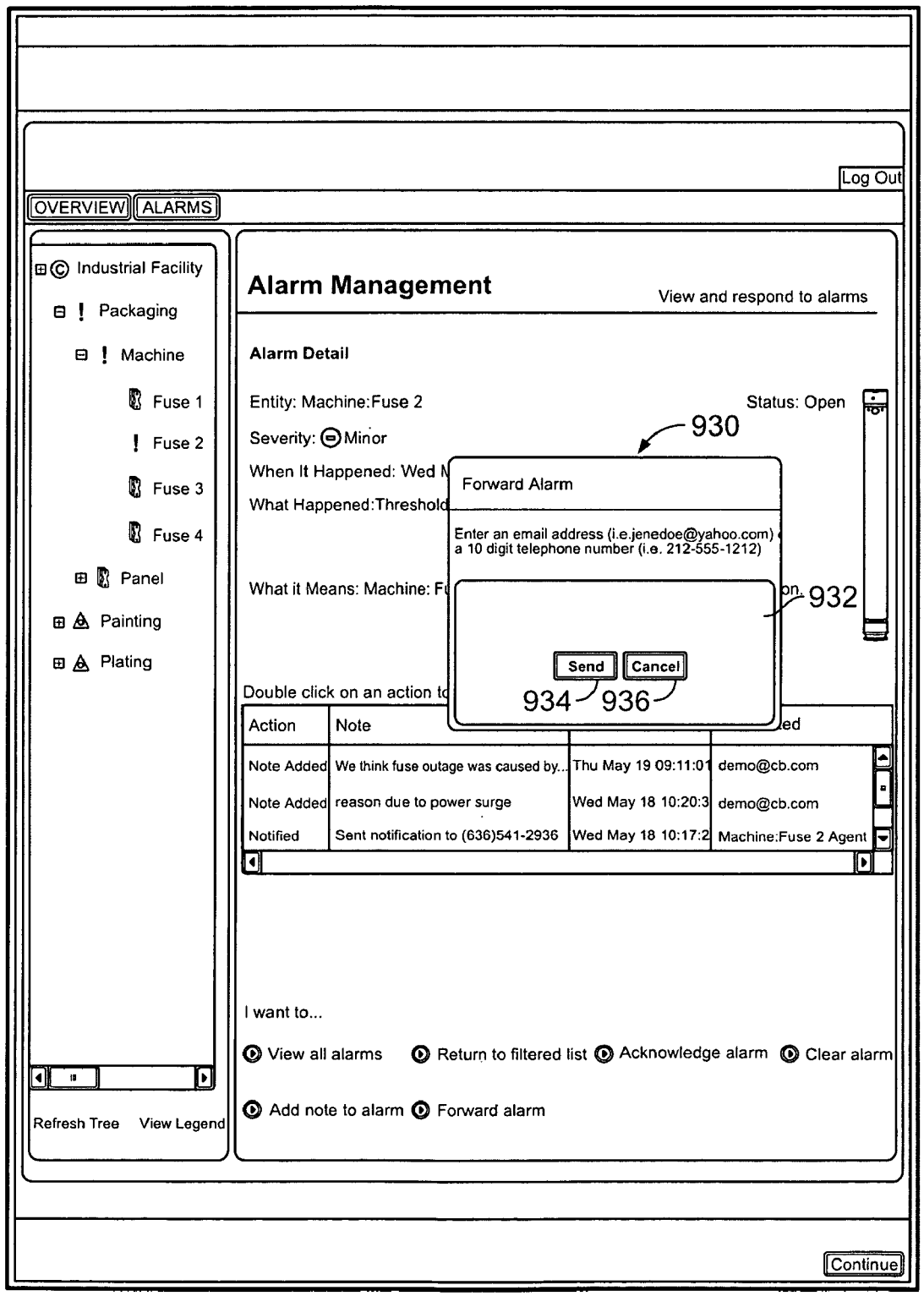
FIG. 39 is an example embodiment of a user interface displaying a circuit protector alarm forward.
Figure 40:
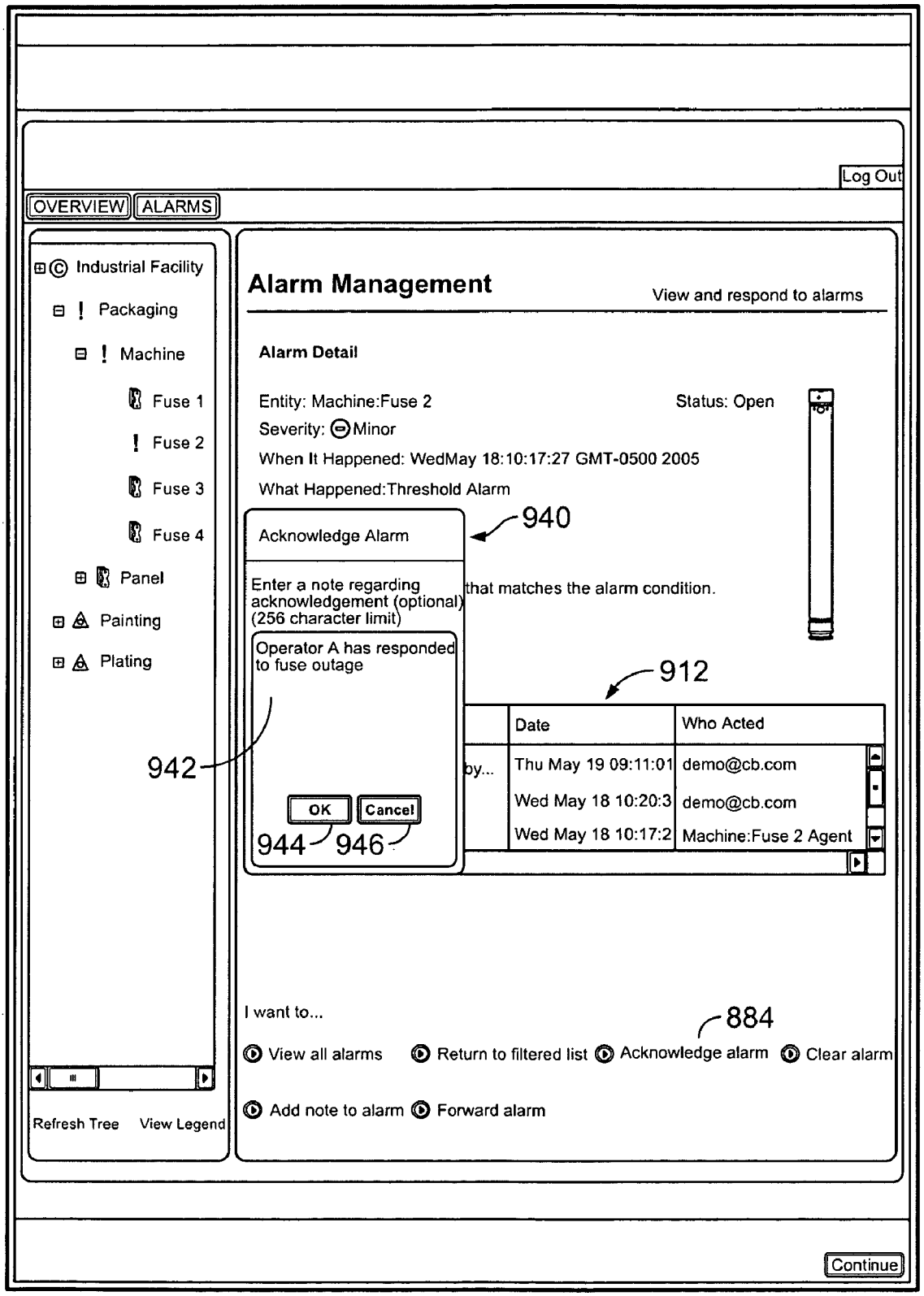
FIG. 40 is an example embodiment of a user interface displaying circuit protector alarm acknowledgement.

If the link 890 is selected, a circuit protector alarm forward window 930 is presented to the user as shown in FIG. 39. The forward window 930 includes a contact data field 932, a send button 934, and a cancel button 936. A phone number or email address may be typed into the contact data field 932, and the buttons 934 and 936 may be used to send or cancel a forwarded alarm. The window 930 may be used, for example, by a designated response person that is unable to respond to the alarm, and the designated person may forward the message to someone else who may respond. The overview and response dispatch system may store the information entered in the contact data field 932 for future use or an escalated alarm if the person associated with the contact information does not respond.

When a responder receives the message and is able to investigate the alarm condition, the responder may select the acknowledge alarm link 884, and if so selected, a circuit protector alarm acknowledgement window 940 is displayed. In the window 940, the responder may enter a note in a note data field 942 if desired, and complete or cancel the acknowledgment by selecting ok or cancel buttons 944 and 946. Any note entered by the responder is displayed in the alarm action table 912 of the alarm detail screen, and may also be displayed in the acknowledged data field 844 in the site plan and circuit protector overview screen shown in FIG. 35.

Figure 41:
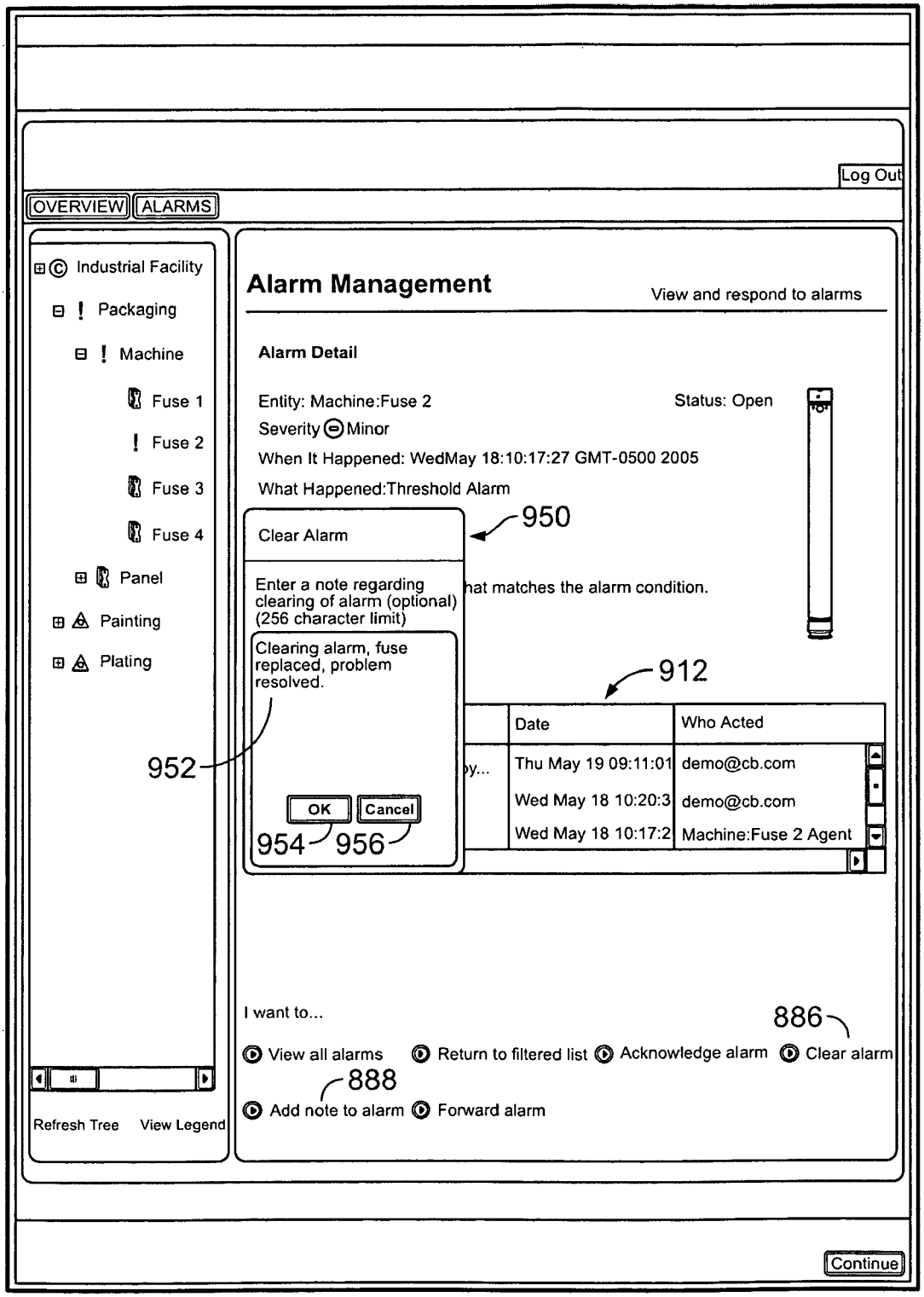
FIG. 41 is an example embodiment of a user interface displaying circuit protector alarm clearance.

The responder may clear the alarm by selecting the clear alarm link 886, and if so selected, an alarm clearance window 950 is presented to the user as shown in FIG. 41. The alarm clearance window 950 includes a note data field 952, and ok and cancel buttons 954 and 956 for entering or discarding the note into the overview and response dispatch system. The clearance note may be displayed to users in the alarm action table 912.

Figure 42:
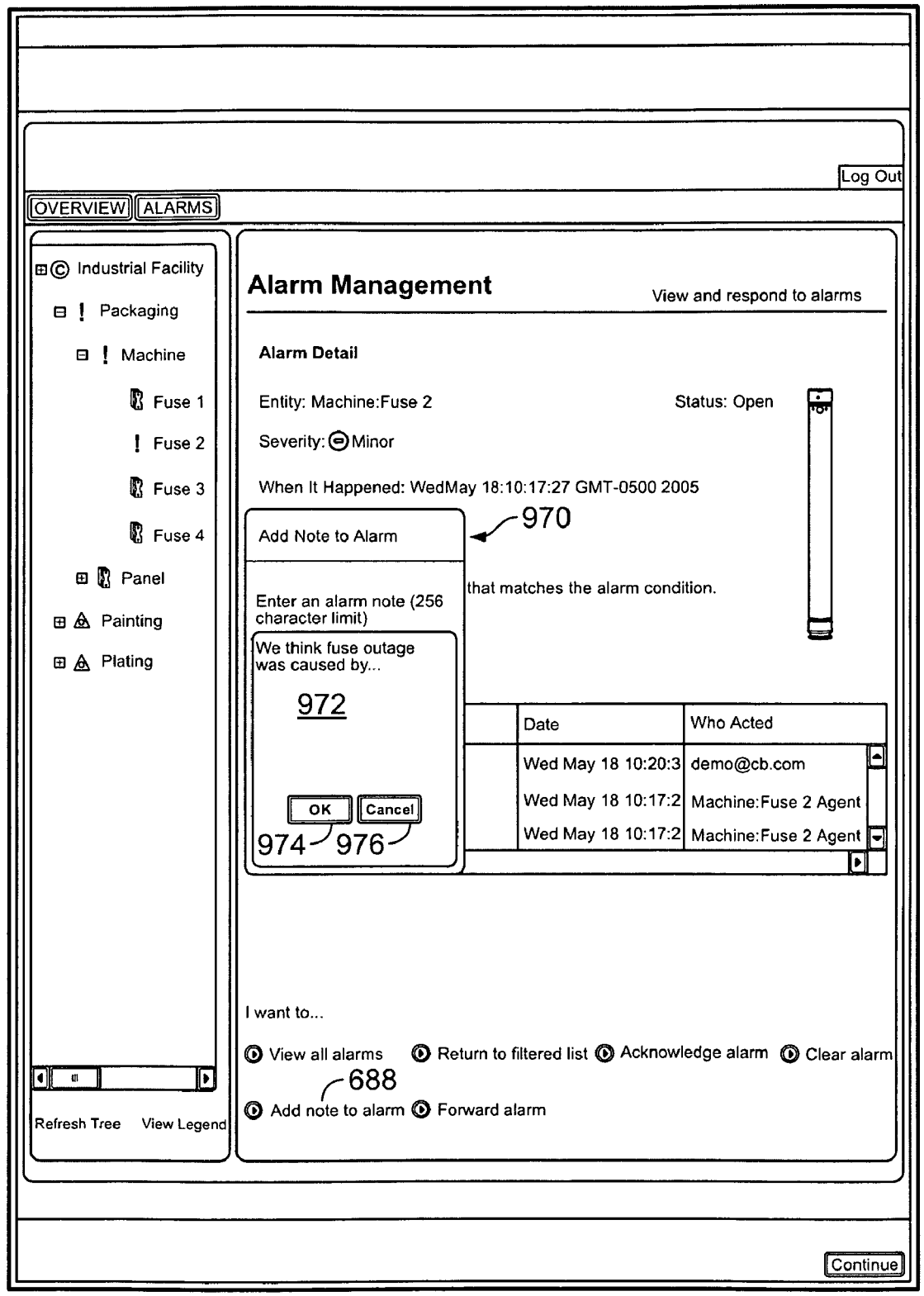
FIG. 42 is an example embodiment of a user interface displaying circuit protector alarm annotation.

A user, whether the responder or otherwise, may add a note to an alarm for future follow up or study by selecting the add note to alarm link 888, and if so selected, an alarm note window 970 is presented to the user as shown in FIG. 42. The alarm note window 970 includes a note data field 972, and ok and cancel buttons 974 and 976 for entering or discarding the note into the overview and response dispatch system. Any such notes may be displayed to users in the alarm action table 912.

FIGS. 43-46 illustrate another exemplary embodiment of user interface displays that may be implemented in the overview and response dispatch system.

Figure 43:
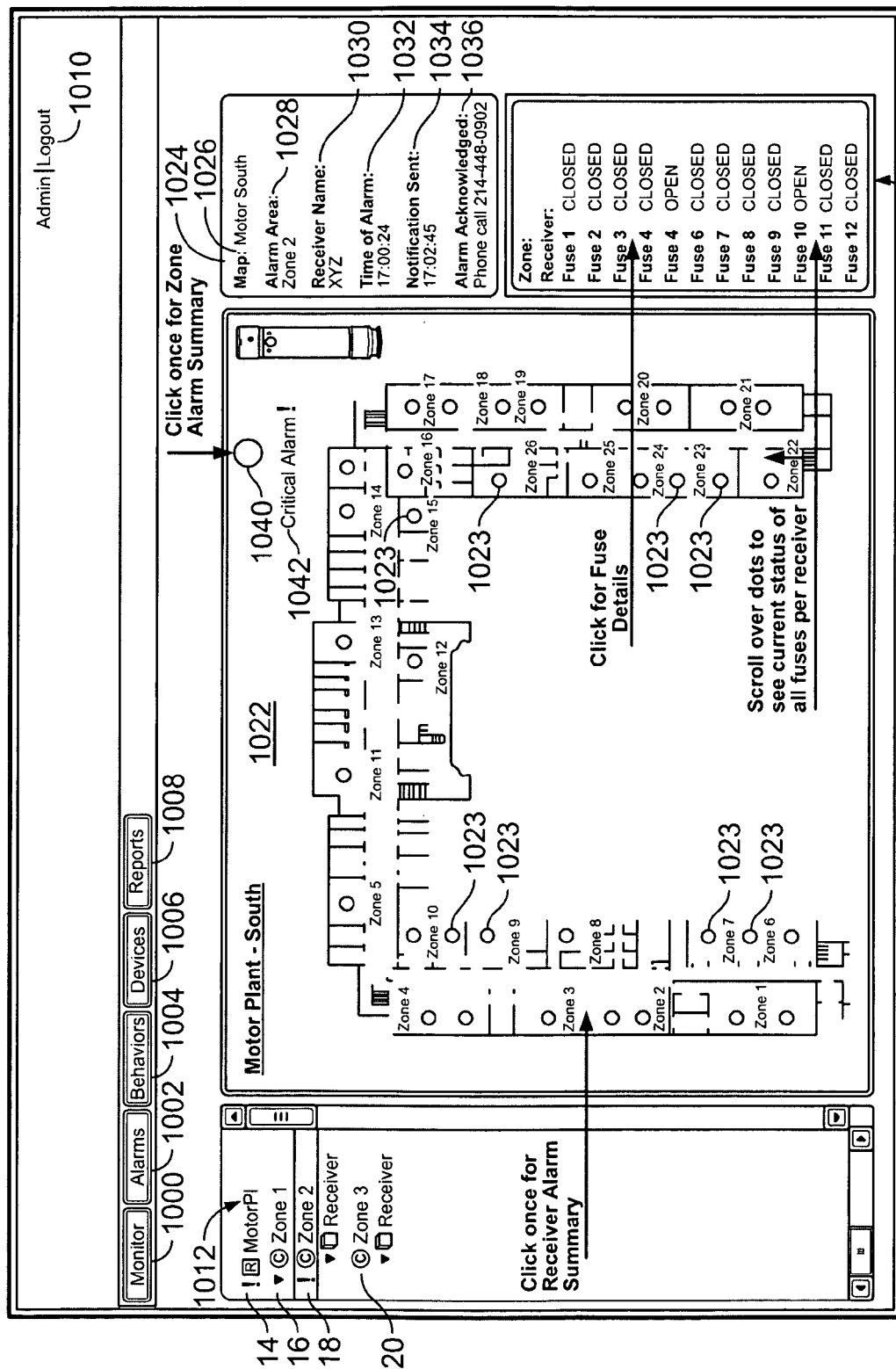
FIG. 43 is an second example embodiment of a user interface displaying a circuit protector layout and overview for a user of the overview and response dispatch system shown in FIGS. 30-32.

FIG. 43 is an embodiment of a circuit protector layout and overview display that is presented to the user after logging on to the server system. A navigation bar is provided in the upper portion of the screen, and the navigation bar includes a monitor link 1000, an alarms link 1002, a behaviors link 1004, a devices link 1006, and a reports link 1008. A logout link 1010 is provided for exiting the system.

The monitor link 1000, when selected, may be used to access electrical system overviews and monitoring status for circuit protectors. The alarms link 1002 may be selected to view archived alarm information. The behaviors link 1004 may be selected to access input screens and displays to configure alarm behavior options for the overview and response dispatch system, including selection of contact information and specific personnel to be contacted by the system, notification and alert preferences and forwarding options, alarm acknowledgment and clearance options, assignment of alarm severity levels, escalation options, and other user preferences for interacting with the overview and response dispatch system. The devices link 1006 may be selected to access circuit protector information, and the reports link 1008 may be selected by a user to enter report generation window, screens and displays wherein the user may select report parameters, select formation and preferences, etc.

A facility tree 1012 is provided in one portion of the display and includes a facility link 1014, and sub-facility or zone links 1016, 1018 and 1020 corresponding to different areas or portions of the larger facility. In the example shown, the larger facility is a motor plant, and three distinct operating areas, namely Zone 1, Zone 2, and Zone 3 of the motor plant are displayed. The areas or zones may be located in the same or different physical facility or building, and the user may see at a glance the facilities and sub-facilities being monitored.

A floor plan or site layout 1022 is displayed for the selected facility link 1014 or sub-facility links 1016, 1018 and 1020. The site layout illustrates the physical facility being monitored so that the user may identify relative locations of circuit protectors and navigate through the facility to address alarm conditions with minimal delay. Circuit protector links 1023 are provided in the site layout 1022, and the links 1023 may be selected by a user to see current status of circuit protectors corresponding to the links 1023 in the site plan 1022. By selecting the facility or sub-facility links 1014, 1016, 1018 and 1020 the user may see the monitored electrical system and circuit protectors at various levels of detail.

An alarm notification area 1024 is provided in the site plan and circuit protector overview screen, and in an exemplary embodiment includes a map data field 1026, an alarm area data field 1028, a receiver name data field 1030, a time of alarm data field 1032, a notification sent data field 1034, and an alarm acknowledged data field 1036 so that the user may see an alarm condition and related information at a glance. The map data field 1026 directs the user to the site layout 1022 being displayed. The alarm area data field 1028 refers to the sub-facility link of interest. The receiver name data field 1030 refers to the electrical load being monitored or affected within the alarm area data field 1028. Data fields 1032, 1034 and 1036 notify the user of the respective times of the alarm condition's occurrence, notification of the alarm, and acknowledgment of the alarm by designated personnel.

A circuit protector summary 1038 is also provided in the site plan and circuit protector overview screen. The circuit protector summary 1038 is provided in tabular form in an exemplary embodiment and includes, for example, a fuse column and a status column. Thus, in the example shown in FIG. 43, there are twelve Fuses associated with Zone 2 of the motor plant being monitored, and Fuses 1-4, 6-9 and 11 and 12 are closed and operational, while Fuses 5 and 10 are indicated as open. By selecting one of the fuses in the summary 1038, the alarm data fields 1032, 1034 and 1036 are populated in the alarm summary 1024 to provide information regarding alarm conditions.

A zone alarm summary link 1040 is provided and may be selected to view an alarm summary screen. An alarm severity data field 1042 is provided to quickly convey to the user the severity or urgency of an alarm state.

Figure 44:
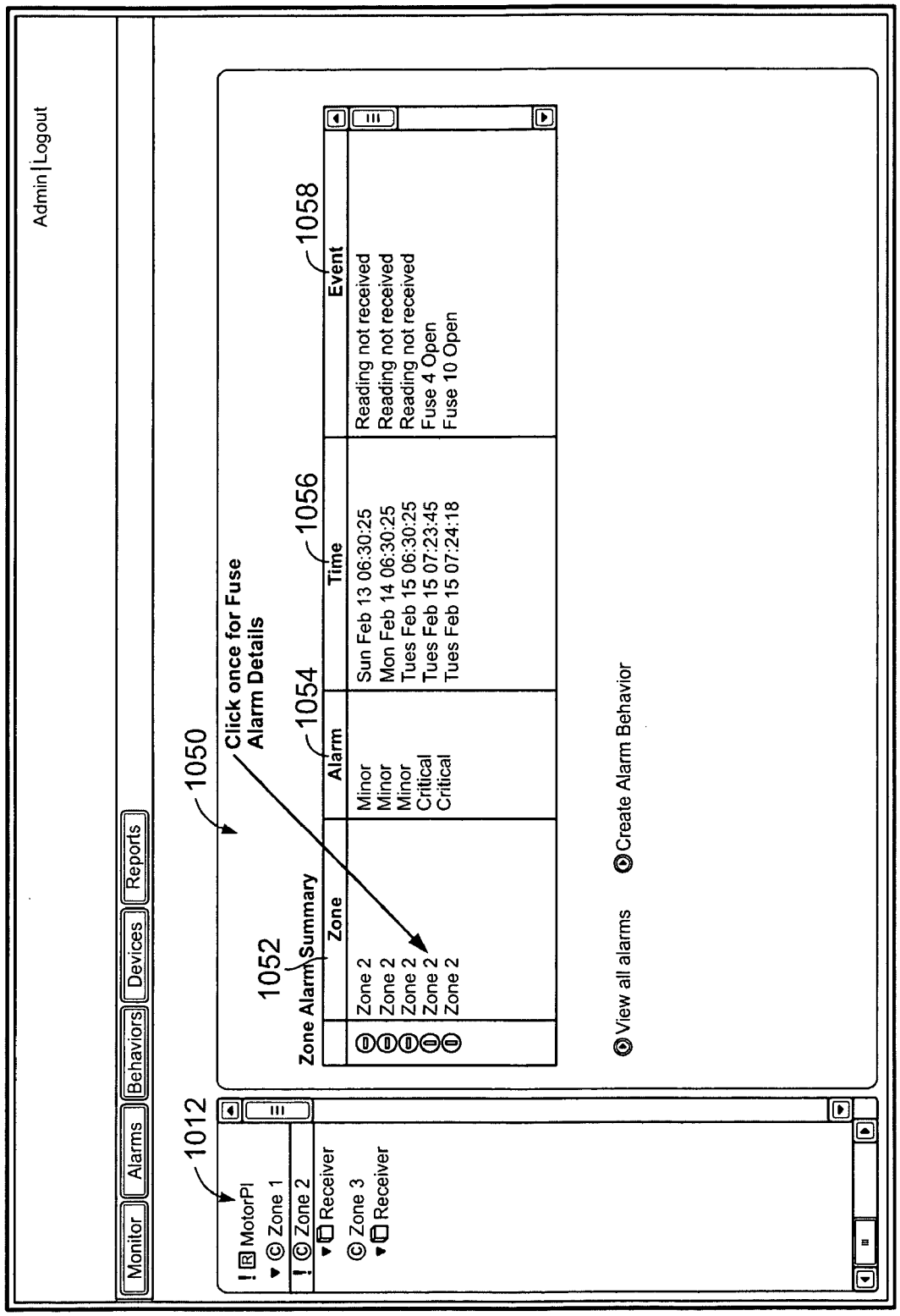
FIG. 44 is an example embodiment of a user interface displaying a zone alarm summary.

FIG. 44 is an example embodiment of a user interface displaying a circuit protector alarm management summary screen that may be accessed by the user, for example, by selecting the alarm summary link 1040 in FIG. 43.

The circuit protector alarm management summary screen includes the navigation bar as before, and the facilities tree 1012 described above. When the user selects the links in the tree 1012, the tree 1012 is expanded to show the circuit protectors associated with the selected link of the tree.

A tabular alarm status area 1050 is provided that in one embodiment includes a zone column 1052, an alarm column 1054, a time and date column 1056, and an event column 1058. Each of the columns 1052, 1054, 1056 and 1058 are populated by the overview and response dispatch system with information so that a user can quickly assess an alarm condition. In the exemplary embodiment, the zone column 1052 indicates the operation zones of the monitored facility where the alarm conditions occur, the alarm column 1054 indicates the severity of the alarm condition, and the event column 1058 includes a brief description of each alarm condition. The zone column 1052 is populated with links that may be selected so that the user may see more specific detail for one of the alarms.

Figure 45:
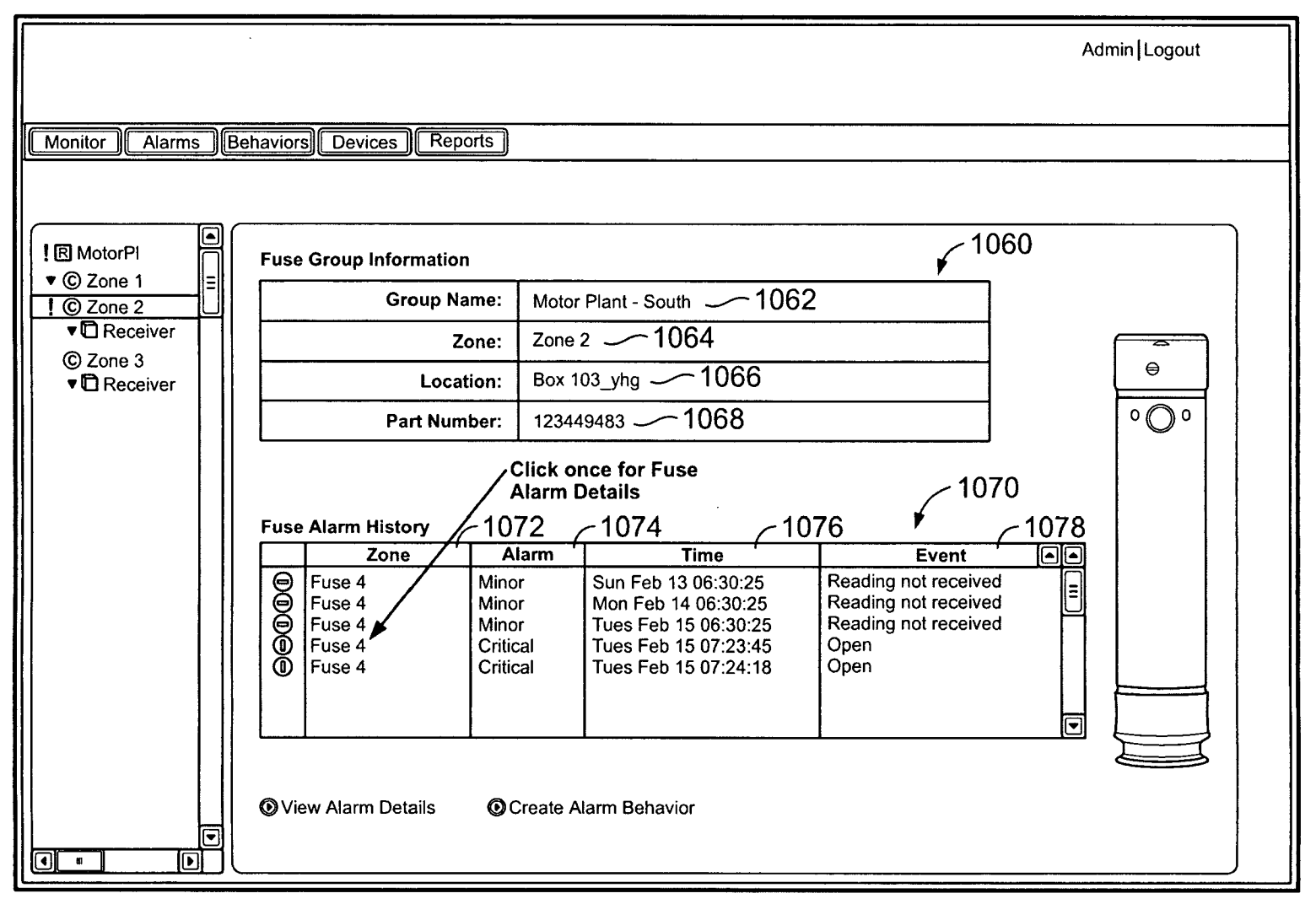

FIG. 45 is an example embodiment of a user interface displaying circuit protector group information that may be accessed, for example, by selecting one of the links in the zone column 1052 of the status area 1050 shown in FIG. 44. A group information summary area 1060 is provided that includes a group name data field 1062, a zone data field 1064, a circuit protector location data field 1066, and a part number data field 1068. The data fields 1062, 1064, 1066, and 1068 are populated by the overview and response dispatch system so that the user may quickly ascertain the identity and location of a circuit protector associated with an alarm condition.

A fuse alarm history table 1070 is also provided that in an exemplary embodiment includes a zone column 1072, an alarm column 1074, a time and date column 1076 and an event column 1078. Each of the columns 1072, 1074, 1076 and 1078 are populated by the overview and response dispatch system with information so that a user can quickly assess an alarm condition. In the exemplary embodiment, the zone column 1072 indicates the circuit protectors corresponding to the zone of interest in the monitored facility where the alarm conditions occur, the alarm column 1074 indicates the severity of the alarm condition, and the event column 1078 includes a brief description of each alarm condition. The zone column 1072 is populated with links that may be selected so that the user may see more specific detail for one of the circuit protectors.

Figure 46:
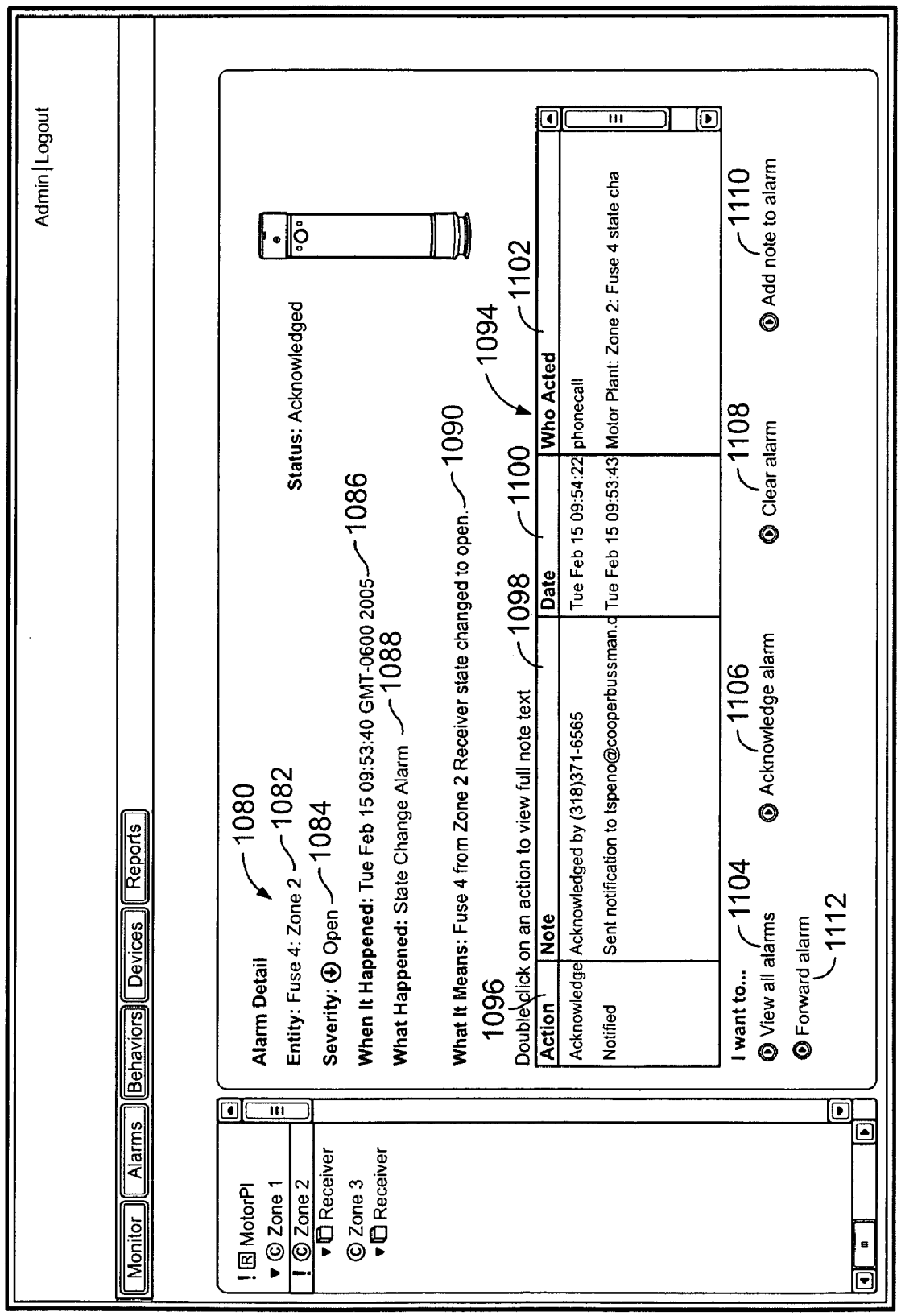
FIG. 46 is an example embodiment of a user interface displaying a circuit protector alarm detail.

FIG. 46 is an example embodiment of a user interface displaying a circuit protector alarm detail screen that may be accessed, for example, by selecting one of the links in the zone column 1072 of the alarm history table 1070 shown in FIG. 45. An alarm detail summary area 1080 is provided that includes an entity data field 1082, and severity data field 1084, a when it happened data field 1086, and a what it means data field 1088. The entity data field 1082 identifies the circuit protector and its location for the corresponding alarm, the severity data field 1084 indicates the severity of the alarm, the when it happened data field 1086 indicates the timing of the alarm, and the what it means data field 1088 provides a brief explanation of the alarm.

A fuse alarm action table 1094 is also provided that in an exemplary embodiment includes an action column 1096, a note column 1098, a time and date column 1100 and a who acted column 1102. Each of the columns 1096, 1098, 1100 and 1102 are populated by the overview and response dispatch system with information so that a user can quickly assess an alarm condition. Alarm options links are provided, including a view all alarms link 1104, an acknowledge alarm link 1106, a clear alarm link 1108, an add note to alarm link 1110, and a forward alarm link 1112. The alarm options links and associated functionality is described above.

The above described displays and screens shown in FIGS. 33-46 may be used with as many circuit protectors as the circuit protector monitoring and signal transmission systems can accommodate, and in some systems the circuit protectors may number in the thousands. The user interface displays and screens, however, capably present voluminous amounts of data and circuit protector status detail in easy to use, graphical and tabular forms with intuitive links to quickly hone in on desired information. The user interface displays may be implemented conventionally in a computer program embodied on a computer readable medium and having segments of code or instructions executed by a computer that correspond to the various functions and features described above for managing circuit protector information corresponding to electrical systems. Providers of software programming and code segments and instructions for such purposes include, for example, SensorLogic of Dallas, Tex., and Questra of Redwood, Calif.

It is understood that additional segments of code corresponding to additional displays, links, tables, graphics, information, and indicia may be provided in further embodiments, and further that not all of the exemplary information provided in the above-described displays and screens need be used in some embodiments of the invention. The user interface displays may be varied to suit the needs of specific electrical systems, facility managers, and for different types of circuit protectors. When the user interface displays are implemented on a network-based system as described above, the system may flexibly present information to multiple users simultaneously, and through menu-driven graphical displays and information links, system users may quickly access needed information to properly manage the electrical system, respond to alarm conditions with minimal delay, and access performance data and event histories for study and analysis.

While the user interface described above is illustrated in the context of overcurrent protection fuses and data therefore in an electrical system, the user interface may be adapted to include data fields, links, graphics, and tables for managing and responding to various operating conditions and issues for other types of overcurrent circuit protector systems such as circuit breakers and switches. For example, in a circuit breaker system, the overview and response dispatch system 118 could be employed to monitor and verify operating states of the breakers, maintenance activities for the breaker system, identification of tripped breakers and their location in the system, recording of event histories when the breakers are tripped, etc., and the user display may be present such information to a user in real time so that circuit breaker and electrical systems can be addressed promptly without having to gather information from various other sources.

F. A Multifunctional Response Tool

To further facilitate rapid response and attention to circuit protector alarm conditions and alerts and summons to investigate an issue identified by the management system 112, in one embodiment a multifunctional response tool is provided.

Figure 47:
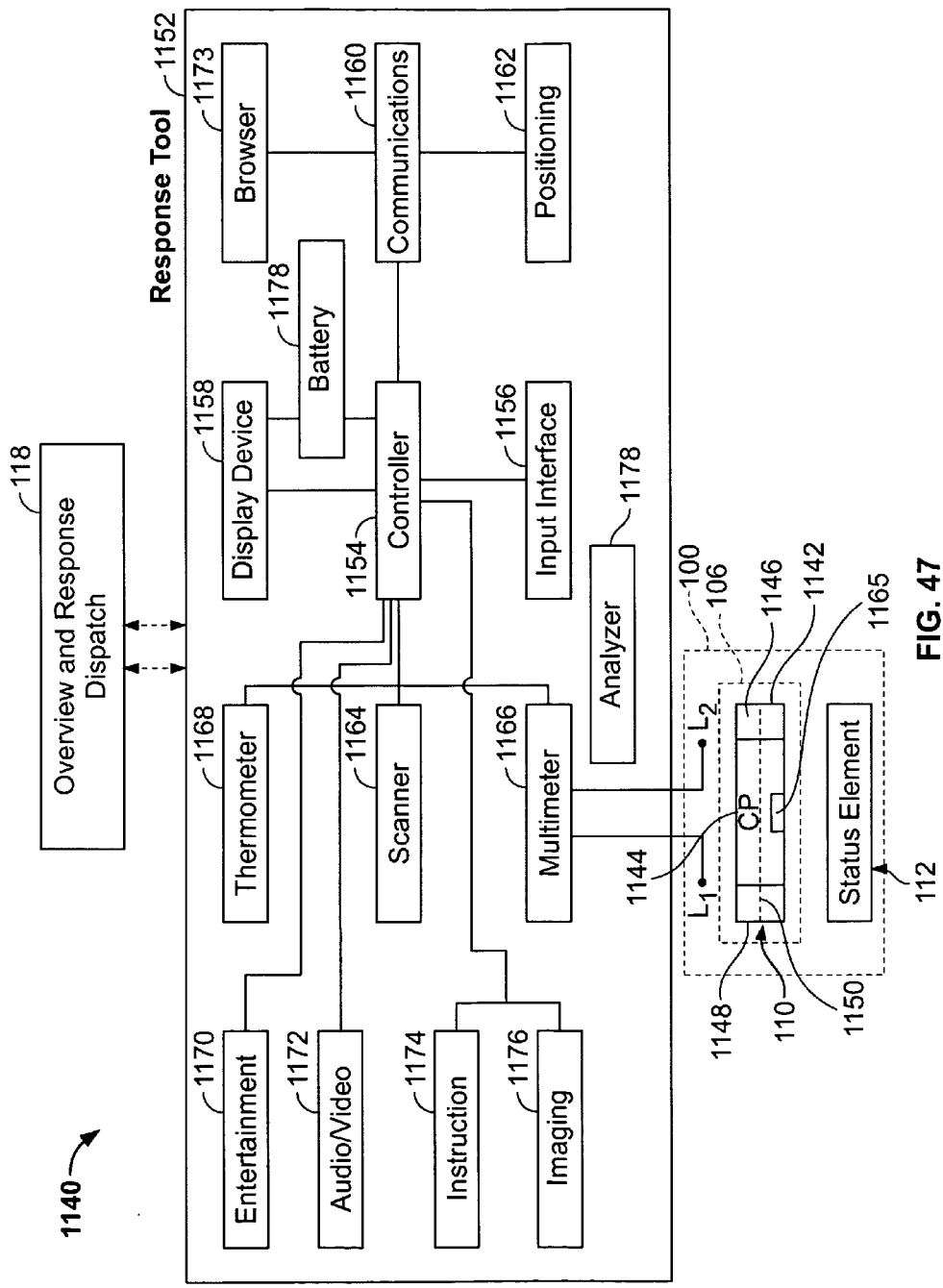
FIG. 47 is a schematic diagram of an exemplary circuit protector management system including a circuit protector response tool.

FIG. 47 is a schematic diagram of an exemplary circuit protector response tool 1140 that may be used with the overview and response dispatch system 118 to quickly investigate and restore affected circuitry due to operation of a circuit protector 108. The circuit protector in one example is a fuse 1142 having a fuse body 1144 located in a panel 104 in the electrical system 100. The fuse 1142 has end terminals 1146, 1148 and a primary fuse element 1150 extending therebetween and defining an interruptible current path to open the circuit through the fuse 1142 upon a specified current condition in the electrical system 100 and isolating a portion of the electrical system 100. A status element 110 is associated with the fuse 1142 and monitors an operational sate thereof, and when the primary fuse element 1150 has opened, the status element 110 signals the overview and response dispatch system 118 as described above. While one circuit protector 108 is shown in FIG. 47, it is appreciated that the tool 1140 may be used in conjunction with a plurality of circuit protectors 108 that are monitored by the overview and response dispatch system 118.

The tool 1140 may be used by maintenance personnel, electricians, technicians, and others that are called upon to respond to an alarm condition. The tool 1140, as explained below, alleviates difficulties such personnel face in transporting, accessing, and utilizing a variety of tools and documents conventionally needed to effectively respond to an electrical system disturbance.

For example, service technicians have conventionally needed, among other things, circuit schematics of the electrical system and site plans of a power distribution facility to orient himself or herself within the electrical system and locate specific circuit protectors and loads in the system, metering tools to check voltage and current readings at certain points in the electrical system, and communication devices to speak with other technicians and/or to communicate with components of the electrical systems when responding to an electrical system disturbance. Conventionally, the technician repeatedly handles such devices and documents when responding to a disturbance, together with a variety of other hand tools, and frequently must handle the devices in cramped or hard to reach areas in an electrical system. The devices and tools may be carried on a tool belt, but repeatedly deploying multiple devices from the tool belt and securing them to the tool belt when not in use, can be a time consuming and inconvenient task. Managing such a multiplicity of such tools, devices and documents often contributes to time delay in successfully responding to the disturbance and restoring or resetting the circuitry to normal operation. This is especially true when a single technician must respond to a disturbance.

To alleviate such difficulties, the tool 1140 is provided that facilitates navigation through a complex electrical system, checking of appropriate circuitry and confirming the identity of circuit protectors, communicating information to other responsible parties, and interaction with the overview and response dispatch system.

In an exemplary embodiment, the tool 1140 is a multifunctional electronic device and is provided in a compact protective housing 1152 that may be easily transported and carried by a user navigating through different portions of the electrical system being monitored to specific sites or locations of the circuit protectors installed in the electrical system. The housing 1152 may include, for example, a belt clip to attach the housing 1152 to a tool belt during periods of non-use. The housing 1152 surrounds, encloses and protects a plurality of sub-devices that in an exemplary embodiment include a controller device 1154, an input interface 1156, a display device 1158, a communications device 1160, a positioning device 1162, a scanner device 1164, a digital multimeter device 1166, a thermometer device 1168, an entertainment device 1170, an audio/video device 1172, an instruction device 1174, and an imaging device 1176. An on board power supply 1180, such as a rechargeable battery in one embodiment, powers the controller 1154 and the sub-devices 1156, 1158, 1160, 1162, 1164, 1166, 1168, 1170, 1172, 1174, 1176 and 1178. The sub-devices 1156, 1158, 1160, 1162, 1164, 1168, 1170, 1172, 1174, 1176 and 1178 are mounted to or secured within the housing 1152 so that the functions of the sub-devices are integrated into a single tool 1140, thereby avoiding transport and handling of multiple devices when working in the electrical system to troubleshoot circuit protectors and restore affected circuitry when they operate.

The controller 1154 may be a microcontroller having a microprocessor or equivalent electronic package that receives inputs and generates outputs to the various sub-devices 1156, 1158, 1160, 1162, 1164, 1166, 1168, 1170, 1172, 1174, 1176 and 1178 in use.

The input interface 1156 permits the user to select operating modes and user preferences or options for the tool 1140, and switching among the functions of the sub-devices 1156, 1158, 1160, 1162, 1164, 1168, 1170, 1172, 1174, 1176 and 1178 when using the tool 1140. The interface 1156 may include an alphanumeric keyboard and may be optimized for use with a minimal number of key strokes. For example, the interface 1156 may be a virtual keyboards or pen-based input system, a keyboard device that may be used substantially through the use of thumbs, or other equivalent interfaces common to hand-held personal digital assistant (PDA), personal information management (PIM) and other electronic organizers.

The display device 1158 may be for, example, a dot matrix liquid crystal display (LCD), a touch sensitive display, or other equivalent display for presenting information to the user. The display may present graphics, text, links and other indicia and information to the user in a known manner. Using the interface 1156 and the display 1158, the user may select operating modes of the tool 1140, enter data inputs, and select user preferences, options and features of the tool 1140.

The communications device 1160, may be a cellular phone or two way pager device providing voice or text messaging communication with, for example, the overview and response dispatch system 118. The tool 1140 may be a designated contact for receiving an automated alert and summons/alarm notification from the overview and response dispatch system 118. Thus, when a summons/alarms notification is received by the communications device 1160, circuit protector information such as location data corresponding to a circuit protector in the electrical system, and identification information corresponding to the circuit protector may be specifically presented to the user on the display 1158.

The tool 1140 may include a web browser 1173 so that, when a notification is received at the tool 1140, the user may log on to the overview and response dispatch system to view alarm details and other information, such as the site plans in the user interface described above to quickly respond to the notification. The communications device 1160 also facilitates communication between a user of the device and other persons, such as other site technicians, facilities management, or technical support of a circuit protector manufacturer.

In a further and/or alternative embodiment, the communications device 1160 may include a Bluetooth device or equivalent thereof that automatically communicates with nearby devices and systems according to known compatibility standards and technology. In such an embodiment, the communications device 1160 may automatically connect with nearby circuit protectors, appliances and equipment using modulated signals as the tool 1140 is moved through the electrical system, and the communications device may automatically request and receive associated data, and transmit such data to the overview and response dispatch system 118.

The positioning device 1162 may be a global positioning module that can direct the user to a specific site in the electrical system, and to pinpoint the exact location of the circuit protector 108 in the electrical system, as well as to pinpoint the user's relative location in the electrical system when operating the tool 1140. The position of the circuit protector of interest, and a responder's location relative to the circuit protector of interest, can be monitored and displayed by the overview and response dispatch system 118, and accessed by the user through the communications device 1160 and the display 1158. Other positioning and locating technologies could be used alternative embodiments to sense a user's position in the electrical system and to provide feedback to the user to assist in quickly locating circuit protectors identified by the overview and response dispatch system 118.

The scanner device 1164 may be provided to collect and confirm data and information for the overview and response dispatch system 118. For example, the scanner device 1164 may be a document scanning device that may scan, read and process documents for upload to the overview and response dispatch system or for electronic access by the user when working in the electrical system. Documents scanned may include procedure manual materials, site plan information, circuit protector information, information regarding the electrical system and its operating loads, employee contact information, calendar information, or other items of interest.

In a further and/or alternative embodiment, the scanner device may be a bar code scanner, an RFID scanner, or equivalent thereof that cooperates with a bar code label, RFID tag, or other information element 1165 associated with the circuit protector. The information element may include circuit protector information such as a circuit protector serial number provided by the manufacturer, a device type code for the circuit protector, a location or address code for the circuit protector, a power/control code for the status element, an equipment identification code for the electrical system load associated with the circuit protector, and state parameter codes such as testing codes, faults codes, and codes pertaining to operating conditions of the circuit protector and/or circuitry associated with the status elements. In such an embodiment the scanner device 1164 may be used to scan the circuit protector 108 once it is located in the electrical system, and the tool 1140 and/or the overview and response dispatch system 118 may confirm that the circuit protector 108 has been correctly identified. The scanner device 1164 may likewise be used to scan the information elements 1165 as information inputs to the overview and response dispatch system 118 or the associated gateway device 584 when existing equipment, for example, includes bar code labels and the like with circuit protector information.

The multimeter device 1166 is adapted for measuring a number of parameters generally needed for service, troubleshooting, and maintenance applications for the circuit protectors 108 and the electrical system 100. The parameters may include AC voltage and current, DC voltage and current, and resistance or continuity. Other parameters such as frequency, capacitance, temperature may be readily added to meet the requirements of the particular application.

In one embodiment, the multimeter device 1166 may be a general purpose multimeter device including an internal current shunt having a known resistance that is inserted in the current path of the circuit protector 108 with for example, leads or test probes $L_1$ and $L_2$. The voltage drop across the current shunt may be measured to determine the current. Alternatively, the multimeter device 1166 may be a clamp-on multimeter employing an integral current clamp which senses the current in the current path without having to cut or break the current-carrying path through the fuse. The current clamp may be closed around the circuit protector 108 or conductors, such as wires or bus bars connected to the circuit protector 108 to sense the magnetic field created by the current flow. The current clamp may provide a voltage signal for measurement by the multimeter device 1166 which calculates and displays the measured current level. The multimeter device may be configured or adapted to automatically select a proper measurement range for display to the user.

To facilitate multimeter functionality, the input interface 1156 includes selectors, buttons, keys or pads, and input terminals required to select and exercise the available features. For example, the input interface 1156 may include input selectors for different current measurement ranges, and input selectors for AC and DC voltage measurements. Two input connectors for current measurements in addition to the voltage measurement input and a common input may be provided. "Softkeys" and changing the legend on the display 1158 may reduce the number of buttons needed, wherein a new legend is displayed when the key function is to be changed.

The thermometer 1168 is a known temperature sensing device that may be used with the leads or test probes $L_1$ and $L_2$ to sense an operating temperature of the circuit protector 108 and evaluate its operating condition.

The entertainment device 1170 may be adapted to process compressed audio and/or video streams for example, and allow the user to listen to music, watch videos, play games, check news and sports updates, etc. in a known manner. Entertainment media may be downloaded to the device 1170 or provided on plug-in cards or disks.

The audio/video device 1172 may be adapted to record audio, still images, and/or video in a known manner. Camera technology and recording devices for such purposes are known and may be implemented in the module 1172. Recorded audio, still images, and video may be communicated to the remote operation dispatch system 118 for access by remote users, facilities managers, etc. for oversight purposes, or for diagnostics and assessment purposes after alarm conditions are rectified.

The instruction device 1174 may be provided for training purposes, for example, and may include procedure manuals, system manuals, audio and visual instruction and demonstration materials, and help functions for technicians when installing, troubleshooting or responding to the sensing and monitoring components, signal transmission components, the overview and response dispatch system 118, and various error conditions for system components. Media for the instruction device 1174 may be downloaded to the device 1174 or provided on plug-in cards or disks, and the media may be customized for particular electrical systems and personnel. Using the instruction device 1174, users of varying experience may be guided through proper installation and connection procedures, diagnostic procedures, and response procedures, and because the instruction device 1174 is local to the response tool 1140, the information may be accessed offline without requiring a connection to the overview and response dispatch system 118. The user is therefore not dependent upon access to the overview and response dispatch system 118 to complete necessary tasks.

The imaging device 1176 is adapted to provide, for example, thermal imaging for inspection of the electrical system in a known manner. Infrared techniques and equivalents thereof may be used, for example, to generate temperature profiles and data, and such may be useful to quickly assess operation conditions of circuitry and identify problem areas when personnel arrive on the scene in response to an alert notification from the overview and response dispatch system 118.

An analyzer device 1178 may be provided and accessed by the user to further evaluate alarm conditions or operating parameters of the electrical system and the circuit protectors. The analyzer device may be for example, a known spectrum analyzer device operable in a known manner.

While a variety of sub-devices 1156, 1158, 1160, 1162, 1164, 1166, 1168, 1170, 1172, 1174, 1176 and 1178 adapted for different functions of the response tool 1140 have been described, it is appreciated that not all of the sub-devices need be included in some embodiments. Rather, the sub-devices may be provided in desired combinations for specific users. Additional functions and sub-devices may likewise be included in further and/or alternative embodiments.

Figure 48:
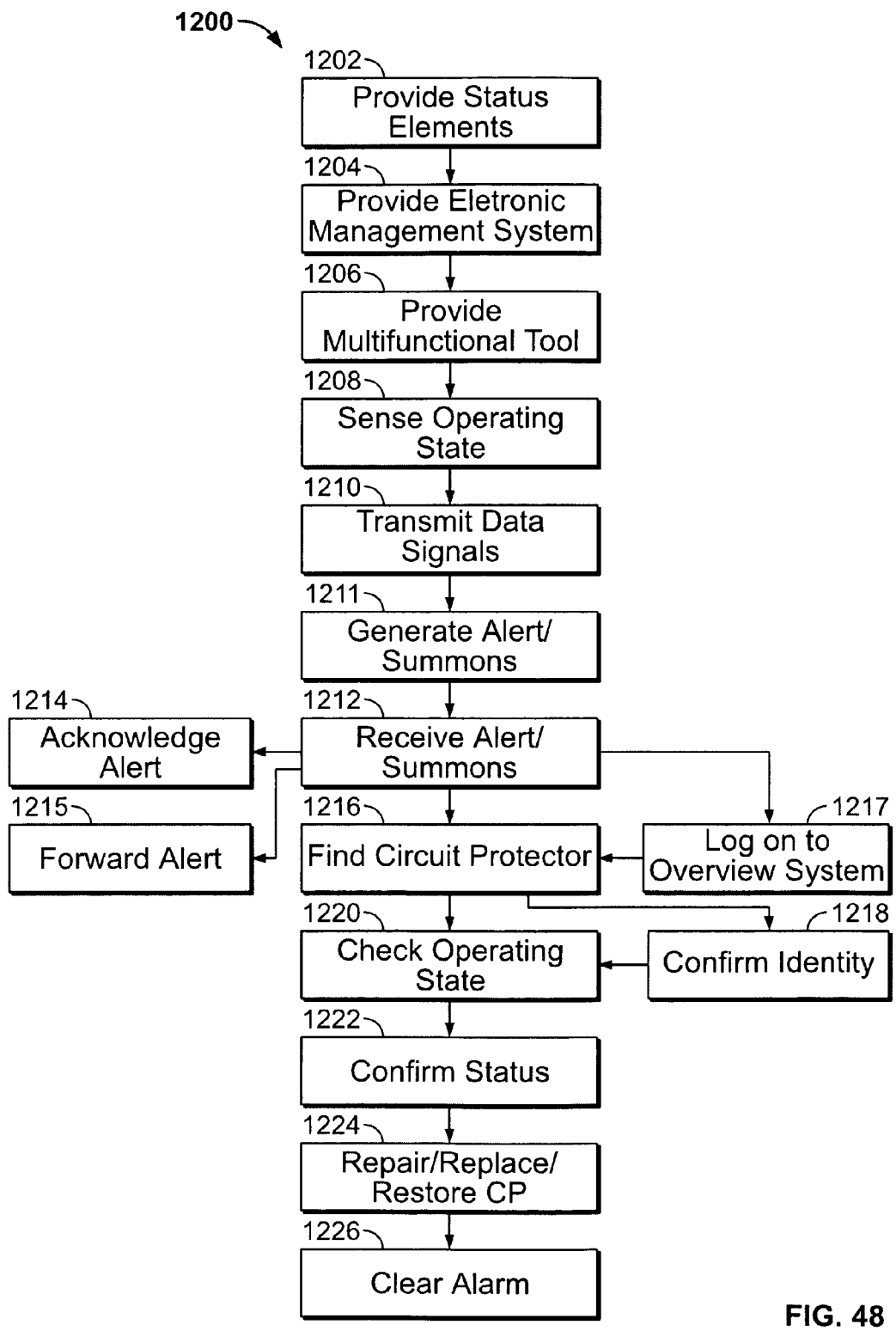
FIG. 48 is an exemplary method flowchart for responding to a circuit protector alert using the circuit protector management system tool shown in FIG. 47.

FIG. 48 is an exemplary flowchart for a method 1200 of responding to a circuit protector alert using the tool shown in FIG. 47. The method 1200 allows efficient re-energization of affected circuitry in an electrical system when a circuit protector operates to isolate one portion of an electrical system from another portion of the electrical system.

The method includes providing 1202 a status element proximate to the respective circuit protectors of interest in the electrical system, providing 1204 an electronic management system responsive to the status elements as explained above, and providing 1206 the multifunctional handheld response tool 1206. When the status elements are installed and the management system is operating, the operating states of the circuit protectors are monitored and sensed 1208 using any of the aforementioned status elements and monitoring techniques. Based upon the sensed state of the circuit protectors, a data signal is transmitted 1210 from at least one of the status elements to a remote location in any manner described above when one of the circuit protectors has operated to isolate a portion of the electrical system. The data signal includes at least an identification code and an address code to identify the location of the operated circuit protector.

In response to the transmitted signals, the management system generates 1211 an alert and summons to responsible personnel of the operated circuit protector and the location of the operated circuit protector. The alert and summons is received 1212 with the handheld, multifunctional response tool carried by the user responsible for responding to the alert. The user may acknowledge 1214 the alert and summons. If necessary, the user may forward 1215 the alert to another party for response.

Once the message is received 1212, the identity and location of the circuit protector associated with the alert is displayed to the user via the display of the tool, and the user may proceed to find 1216 the circuit protector in the electrical system and move to its physical location, or may proceed to log on 1217, also using the tool, to the overview and response dispatch system to obtain further detail and information regarding the circuit protector of interest. Once logged on, the user may obtain and review alarm condition information, including the alarm summary displays, alarm detail displays, and an alarm options displays described above. The user may additionally be presented with specific information regarding potential hazards in the location of the circuit protector, and be given information regarding precautions that should be taken and personal protection equipment that should be utilized when responding to an operated circuit protector. Alternatively, such information may be provided in the initial message received 1212 with the tool.

The positioning device of the tool may be consulted to find or locate the circuit protector in the electrical system and arrive at its physical location, or the maps, site plans and information may be obtained from the overview and response dispatch system to aid in finding the circuit protector. Once found, the identity of the circuit protector may be confirmed 1218 using the scanner device of the tool, or information obtained from the overview and response dispatch system.

After finding and/or confirming the identity of the circuit protector, the operating state thereof may be checked 1220 using the multimeter function of the tool, the tool thermometer 1168, the imaging device 1176 or the spectrum analyzer 1178 to verify or confirm 1222 the operating state of the circuit protector. The user may then proceed to rectify or repair the alert condition, replace the circuit protector or otherwise restore 1226 the circuit to its normal operating condition.

Using the tool 1140 and the method 1200, the user need not gather multiple devices and documents to take to the circuit protector installation site to investigate the alert or alarm conditions received. Rather, the user may simply proceed to accomplish the task at hand with the utmost expediency and with instant access to information needed to efficiently redress the alarm condition or alert. Multiple tools 1140 could be provided to perform the method 1200 for simultaneous response to multiple alarm conditions by different users, operators or responders.

G. System Adaptations

The systems and processes described above are not limited to the specific embodiments described herein. Components of each system and each process can be practiced independent and separate from other components and processes described herein. Each component and process also can be used in combination with other components, systems and processes.

For example, the foregoing circuit protector monitoring and management system 112 may be implemented in whole or in part to meet the needs of a particular electrical system 100 or for cost management reasons. In other words, the management system 112 may not include all of the described components, or perform all of the described functions set forth above. That is, the management system 112 may be configured or adapted, for example, to sense and record circuit protector operation and performance without communicating an operating state or condition of the circuit protector to a remote device for real time display of circuit protector operation. In such an embodiment, the circuit protector could be removed from the electrical system and information could be read from the circuit protector at another location, or a reader, transponder or communications device, such as the described response tool, could be brought to the location of the circuit protector to obtain information therefrom.

As another example, the management system 112 could identify and determine operational status and data regarding the circuit protector and circuitry and communicate and transmit data to the overview and response dispatch system 118, but not communicate with an inventory management system. Further, the management system 112 could be implemented to alert and dispatch response to circuit protector opening events, without enabling the diagnostic and troubleshooting aspects of the management system as described. Likewise, the tool can be provided with varying degrees of functionality for cost management reasons, and in certain installations and embodiments may be entirely omitted. It should now be apparent that the system components may be mixed and matched to generate varying systems which obtain the benefits of the present invention to varying degrees.

An embodiment of a circuit protector monitoring assembly is described herein. The assembly includes at least one overcurrent circuit protector defining an interruptible current path therethrough upon an occurrence of specified current conditions through the interruptible current path; and a status element associated with the circuit protector and adapted to communicate information regarding the operating state of the current path, the information comprising at least a status element identifier and a location identifier.

Optionally, the status element may be adapted to wirelessly communicate the information to a management system. The status element may include an RFID chip, a transmitter, a smart card, a mechanical actuator, or an optically activated indication circuit. The status element is internal to the circuit protector, and may be adapted to collect data regarding the operation of the circuit protector, and communicate the data to the management system. A communications link may interface the status element and a remote management system, and the communications link may be selected from the group of a hard-wired communications link, an optical communications link, a network communications link, a wireless communications link, a satellite communications link, a power line frequency carrier, and combinations thereof.

Optionally, the status element may be adapted to identify operation of the circuit protector via at least one of a polling method, current monitoring, voltage monitoring, temperature sensing, vibration and displacement sensing, mechanical stress and strain sensing, acoustical emission sensing, noise sensing, thermal imagery and thermalography, electrical resistance sensing, pressure sensing, humidity sensing and video surveillance. The status element may include a monitoring module mechanically and electrically connected to terminal elements of the circuit protector at a location exterior to the circuit protector, the module adapted for retrofit installation to the circuit protector, and the monitoring module may include a radio frequency (RF) transmitter. The circuit protector may include a fuse, and the status element may transmit data related to operation of the fuse, the data comprising a plurality of data bits selected from the group comprising a unique radio identifier, a manufacturer serial number for the status element, a device type code for the circuit protector, a location or address code for the circuit protector, a power/control code, an equipment identification code, a testing code, a fault code, a customer code, a temperature code, a vibration code, a displacement code, a mechanical stress code, a mechanical strain code, an acoustical emission code, a noise code, a thermal imagery code, an electrical resistance code, a pressure code, a humidity code and a video code.

An embodiment of a monitoring assembly for a circuit protector system is also described. The assembly includes a plurality of overcurrent circuit protectors, each of the overcurrent circuit protectors defining an interruptible current path therethrough upon an occurrence of specified current conditions through the interruptible current path; a modular status element associated with each of the circuit protectors, each of the status elements adapted to monitor an operating state of the respective current path, and a transmitter communicating with at least one of the modular status elements, the transmitter sending a wireless data signal to a remote location for identification of an operated circuit protector and the location of the operated circuit protector by an electronic management system.

Optionally, the transmitter is adapted to generate a digital radio frequency signal. The modular status element may include a monitoring module mechanically and electrically connected to terminal elements of the circuit protector at a location exterior to the circuit protector, the module adapted for snap-on installation to the circuit protector. The modular status element may include a voltage sensor detecting a voltage change across the circuit protector when the current path is interrupted, the voltage change triggering the sending of the wireless data signal. The transmitter may be provided in a communications module interconnected with at least one of the modular status elements, and the communications module may power other of the modular status elements.

An embodiment of a fuse monitoring assembly is described that includes an overcurrent protection fuse having a primary fuse element extending between first and second terminal elements, the primary fuse element defining an interruptible current path therethrough upon an occurrence of specified current conditions through the primary fuse element; and a monitoring module responsive to operation of the fuse; wherein the monitoring module comprises a housing, a mounting element adapted to attach the housing to an exterior surface of the circuit protector, and first and second conductive arms extending to the respective first and second terminal elements of the circuit protector; and a transmitter connected to the monitoring module and sending a data signal to a remote location for identification of an operated circuit protector and the location of the operated circuit protector.

Optionally, the housing comprises a voltage sensor connected to the conductive arms, and the transmitter comprises a low power radio frequency (RF) transmitter. The data signal may be a digital radio frequency signal, and the mounting element may comprise a mounting clip, the mounting clip engaging the exterior surface of the fuse with snap-fit engagement. A signal port may be exposed on a surface of the housing, and an interface plug for connecting the module to the transmitter may be provided.

A method of monitoring operation of a circuit protector in an electrical system is described. The circuit protector is operable to interrupt a conductive circuit path and isolate one portion of the electrical system from another portion of the electrical system. The method includes providing a status element proximate to the respective circuit protectors of interest, and a transmitter responsive to the status elements and generating a data signal to a remote location when one of the circuit protectors has operated to isolate a portion of the electrical system, the data signal comprising a plurality of data bits selected from the group comprising a manufacturer serial number for the status element, a device type code for the circuit protector, a location or address code for the circuit protector, a power/control code, an equipment identification code, a testing code, a fault code, a customer code, a temperature code, a vibration code, a displacement code, a mechanical stress code, a mechanical strain code, an acoustical emission code, a noise code, a thermal imagery code, an electrical resistance code, a pressure code, a humidity code and a video code; sensing, using the status elements, an operating state of the circuit protectors when installed in the electrical system; and based upon the sensed state of the circuit protectors, transmitting the data signal to a remote location.

A circuit protector monitoring assembly is also described. The assembly includes means for sensing an operating state of a plurality of circuit protectors in an electrical system; means for attaching the means for sensing to the circuit protectors without modifying the electrical system; and means for transmitting a data signal corresponding to a sensed operation of one or more of the circuit protectors, the data signal identifying a location of the operated fuse in the electrical system.

A fuse state monitoring kit for a fuse having a fuse body and first and second terminal elements connected to the body is also described. The kit includes a housing; a sensor in the housing; a mounting element dimensioned to engage an outer surface of the fuse body and affix the housing to the body; and first and second contact arms attachable to the housing and dimensioned to extend from the housing to the first and second terminal elements, respectively, the first and second contact arms being connected to the sensor.

Optionally, a signal port is connected to the sensor, and the kit further comprising an interface plug adapted to mate with the signal port. A power source may be provided and may be selected from the group of a battery, a power harvesting device, an energy storage element, a backup power supply, an auxiliary power supply, or a circuits of an electrical system being monitored. The contact arms may be adjustable to fit a variety of different fuses, and the mounting element is adjustable to fit a variety of different fuses. The housing may include multiple sensors for monitoring multiple fuses. Third and fourth contact arms may be attachable to the housing, and the first and second contact arms may be rotatable relative to the housing to mechanically and electrically engage a fuse alongside the housing. A removable battery access door may be attached to the housing.

While the invention has been described in terms of various specific embodiments, those skilled in the art will recognize that the invention can be practiced with modification within the spirit and scope of the claims.

What is claimed is:

1. A circuit protector monitoring system comprising:
   at least one circuit protector defining an interruptible current path therethrough upon an occurrence of a specified operating condition in a circuit; and
   a status element associated with the at least one circuit protector and adapted to detect and communicate a change in operating state of the interruptible current path from an uninterrupted state to an interrupted state as the specified operating condition in the circuit occurs; and
   a remotely located electronic management system in communication with the status element, the electronic management system configured to:
   determine, based on a communication from the status element, a physical location of the at least one circuit protector and the change in operating state of the interruptible current path without requiring physical inspection of the circuit protector; and
   automatically alert and summon responsible personnel to the physical location when the interruptible current path changes to the interrupted state.

2. The system of claim 1, wherein the status element is adapted to wirelessly communicate the change in operating state.

3. The system of claim 1, wherein the status element comprises an RFID chip.

4. The system of claim 1 wherein the status element comprises a transmitter.

5. The system of claim 1, wherein the status element comprises a smart card.

6. The system of claim 1, wherein the status element is mechanically actuated.

7. The system of claim 1, wherein the status element comprises an optically activated indication circuit.

8. The system of claim 1, wherein the status element is internal to the circuit protector.

9. The system of claim 1, wherein the status element is adapted to collect data regarding the operation of the interruptible current path.

10. The system of claim 1, further comprising a communications link interfacing the status element and the remotely located electronic management system, the communications link selected from the group of a hard-wired communications link, an optical communications link, a network communications link, a wireless communications link, a satellite communications link, a power line frequency carrier, and combinations thereof.

11. The system of claim 1, wherein the status element is adapted to identify the change in state of the interruptible current path via at least one of a polling method, current monitoring, voltage monitoring, temperature sensing, vibration and displacement sensing, mechanical stress and strain sensing, acoustical emission sensing, noise sensing, thermal imagery and thermalography, electrical resistance sensing, pressure sensing, humidity sensing and video surveillance.

12. The system of claim 1, wherein the status element comprises a monitoring module mechanically and electrically connected to terminal elements of the circuit protector at a location exterior to the circuit protector, the module adapted for retrofit installation to the circuit protector.

13. The system of claim 12, wherein the monitoring module comprises a radio frequency (RF) transmitter.

14. The system of claim 1, wherein the at least one circuit protector comprises a fuse, the status element transmitting data related to operation of the fuse, the data comprising a plurality of data bits selected from the group comprising a unique radio identifier, a manufacturer serial number for the status element, a device type code for the fuse, a location or address code for the fuse, a power/control code, an equipment identification code, a testing code, a fault code, a customer code, a temperature code, a vibration code, a displacement code, a mechanical stress code, a mechanical strain code, an acoustical emission code, a noise code, a thermal imagery code, an electrical resistance code, a pressure code, a humidity code and a video code.

15. A monitoring assembly for a circuit protector system, comprising:
 a plurality of circuit protectors, each of the circuit protectors defining an interruptible current path therethrough upon an occurrence of specified operating conditions in an electrical system;
 a modular status element associated with each of the circuit protectors, each of the status elements adapted to monitor an operating state of the respective current path, and
 a transmitter communicating with the modular status elements, the transmitter sending a wireless data signal to a remote location when any of the circuit paths in the plurality of circuit protectors is interrupted, the data signal including a unique identification code and a location code for the circuit protectors having the interrupted current path.

16. The assembly of claim 15, wherein the transmitter is adapted to generate a digital radio frequency signal.

17. The assembly of claim 15, wherein the modular status element comprises a monitoring module mechanically and electrically connected to terminal elements of the circuit protector at a location exterior to the circuit protector, the module adapted for snap-on installation to the circuit protector.

18. The assembly of claim 15, wherein the modular status element comprises a voltage sensor detecting a voltage change across the circuit protector when the current path is interrupted, the voltage change triggering the sending of the wireless data signal.

19. The assembly of claim 15, wherein at least one of the circuit protectors is a fuse, and the wireless signal comprises a plurality of data bits selected from the group comprising a unique radio identifier, a manufacturer serial number for the status element, a device type code for the circuit protector, a location or address code for the circuit protector, a power/control code, an equipment identification code, a testing code, a fault code, a customer code, a temperature code, a vibration code, a displacement code, a mechanical stress code, a mechanical strain code, an acoustical emission code, a noise code, a thermal imagery code, an electrical resistance code, a pressure code, a humidity code and a video code.

20. The assembly of claim 15, wherein the transmitter is provided in a communications module interconnected with at least one of the modular status elements.

21. The assembly of claim 15, wherein one of the modular status elements comprises a communications module, the communications module powering other of the modular status elements.

22. The assembly of claim 15, wherein the modular status elements comprise a plurality of sensor modules and at least one communications module interconnected with one another, each of the sensor modules transmitting a data signal to the communications module for sending the wireless data signal.

23. A fuse monitoring assembly comprising:
 an overcurrent protection fuse having a primary fuse element extending between first and second terminal elements, the primary fuse element defining an interruptible current path therethrough upon an occurrence of specified current conditions through the primary fuse element; and
 a monitoring module responsive to operation of the fuse;
 wherein the monitoring module comprises a housing, a mounting element adapted to attach the housing to an exterior surface of the fuse, and first and second conductive arms extending to the respective first and second terminal elements of the fuse; and
 a transmitter connected to the monitoring module and mounted at a location proximate the fuse, the transmitter sending a data signal to a remote location, the data signal including a unique identifier for the fuse and a location identifier for the fuse.

24. The assembly of claim 23, wherein the housing comprises a voltage sensor connected to the conductive arms.

25. The assembly of claim 23, wherein the transmitter comprises a low power radio frequency (RF) transmitter.

26. The assembly of claim 23, wherein the data signal is a digital radio frequency signal.

27. The assembly of claim 23, wherein the mounting element comprises a mounting clip, the mounting clip engaging the exterior surface of the fuse with snap-fit engagement.

28. The assembly of claim 23, wherein the data signal comprises a plurality of data bits selected from the group comprising a unique radio identifier, a manufacturer serial number for the status element, a device type code for the circuit protector, a location or address code for the circuit protector, a power/control code, an equipment identification code, a testing code, a fault code, a customer code, a temperature code, a vibration code, a displacement code, a mechanical stress code, a mechanical strain code, an acoustical emission code, a noise code, a thermal imagery code, an electrical resistance code, a pressure code, a humidity code and a video code.

29. The assembly of claim 23, further comprising a signal port exposed on a surface of the housing, and an interface plug for connecting the module to the transmitter.

30. A method of monitoring operation of a circuit protector in an electrical system, the circuit protector operable to interrupt a conductive circuit path and isolate one portion of the electrical system from another portion of the electrical system, the method comprising:
providing a status element proximate to the respective circuit protectors of interest, and a transmitter responsive to the status elements and generating a data signal to a remote location when any one of the circuit protectors has operated to isolate a portion of the electrical system, the data signal comprising a plurality of data bits selected from the group comprising a manufacturer serial number for the status element, a device type code for the circuit protector, a location or address code for the circuit protector, a power/control code, an equipment identification code, a testing code, a fault code, a customer code, a temperature code, a vibration code, a displacement code, a mechanical stress code, a mechanical strain code, an acoustical emission code, a noise code, a thermal imagery code, an electrical resistance code, a pressure code, a humidity code and a video code;
sensing, using the status elements, an operating state of the circuit protectors when installed in the electrical system; and
based upon the sensed state of the circuit protectors, transmitting the data signal to a remote location, wherein the data signal includes a unique identifier and a location identifier for an operated circuit protector.

31. The method of claim 30, wherein sensing an operating state of the circuit protectors comprises sensing a voltage drop across the circuit protectors.

32. The method of claim 30, wherein transmitting a data signal from at least one of the status elements comprises wirelessly transmitting the data signal.

33. The method of claim 30, wherein providing a status element proximate to the respective circuit protectors of interest comprises attaching a sensing module to an exterior surface of the circuit protectors of interest, thereby facilitating retrofit installation to existing fuses of an electrical system.

34. A circuit protector monitoring assembly comprising:
means for sensing an operating state of a plurality of circuit protectors in an electrical system;
means for attaching the means for sensing to the circuit protectors without modifying the electrical system; and
means for transmitting a data signal in response to a sensed change in operating state of any of the plurality of circuit protectors, the data signal corresponding to a sensed operation of one or more of the circuit protectors, the data signal uniquely identifying one or more operated circuit protectors and the locations of one or more operated circuit protectors in the electrical system.

35. The assembly of claim 34, wherein the means for transmitting comprises means for transmitting a low power wireless signal.

36. The system of claim 34, wherein the circuit protectors comprise fuses, the means for sensing an operating state comprising a voltage sensor.

37. The system of claim 34, wherein the means for attaching the means for sensing to the circuit protectors is adapted for snap-fit engagement with the circuit protector.

38. A fuse state monitoring kit for a fuse having a fuse body and first and second terminal elements connected to the body, the kit comprising:
a housing;
a sensor in the housing;
a mounting element dimensioned to engage an outer surface of the fuse body and affix the housing to the body; and
first and second contact arms attachable to the housing and dimensioned to extend from the housing to the first and second terminal elements, respectively, the first and second contact arms being connected to the sensor.

39. The kit of claim 38, wherein the housing comprises a signal port connected to the sensor, the kit further comprising an interface plug adapted to mate with the signal port.

40. The kit of claim 38, further comprising a wireless transmitter in the housing.

41. The kit of claim 38, wherein the sensor comprises a voltage sensor.

42. The kit of claim 38, further comprising a power source being selected from the group of a battery, a power harvesting device, an energy storage element, a backup power supply, an auxiliary power supply, or a circuits of an electrical system being monitored.

43. The kit of claim 38, wherein the mounting element engages the fuse body with snap-fit engagement.

44. The kit of claim 38, wherein the contact arms are adjustable to fit a variety of different fuses.

45. The kit of claim 38, wherein the mounting element is adjustable to fit a variety of different fuses.

46. The kit of claim 38, wherein the housing comprises multiple sensors for monitoring multiple fuses.

47. The kit of claim 38, further comprising third and fourth contact arms attachable to the housing.

48. The kit of claim 38, wherein the first and second contact arms are rotatable relative to the housing to mechanically and electrically engage a fuse alongside the housing.

49. The kit of claim 38, further comprising a removable battery access door attached to the housing.

50. The assembly of claim 34, wherein the means for sensing an operating state comprises one of a means for sensing an overcurrent condition, means for sensing an overload condition, means for sensing a short circuit condition, means for sensing an overvoltage condition, and means for sensing a temperature overlimit condition.

51. A circuit protector state monitoring assembly comprising:
a circuit protector comprising first and second terminal elements; and
a retrofit monitoring module coupled to an exterior surface of the circuit protector and mechanically and electrically engaged to the first and second terminal elements, the module adapted to determine an operating state of the circuit protector and communicate a unique identification code for the circuit protector and a location code for the circuit protector to a remote location when the operating state of the circuit protector changes.

* * * * *